US011860967B2

(12) United States Patent
Harding et al.

(10) Patent No.: US 11,860,967 B2
(45) Date of Patent: Jan. 2, 2024

(54) AUTOMATION SYSTEM AND METHOD

(71) Applicant: Grokit Data, Inc., Stuart, FL (US)

(72) Inventors: James A. Harding, Issaquah, WA (US);
Anthony J. Paquin, Stuart, FL (US);
Scott Thibault, Colchester, VT (US);
Jason A. Boatman, Charlottesville, VA (US)

(73) Assignee: THE IREMEDY HEALTHCARE COMPANIES, INC., Stuart, FL (US)

( * ) Notice: Subject to any disclaimer, the term of this patent is extended or adjusted under 35 U.S.C. 154(b) by 146 days.

(21) Appl. No.: 17/368,546

(22) Filed: Jul. 6, 2021

(65) Prior Publication Data

US 2022/0004576 A1   Jan. 6, 2022

Related U.S. Application Data

(60) Provisional application No. 63/048,598, filed on Jul. 6, 2020.

(51) Int. Cl.
*G06F 16/00* (2019.01)
*G06F 16/958* (2019.01)
(Continued)

(52) U.S. Cl.
CPC .......... *G06F 16/958* (2019.01); *G06F 3/0481* (2013.01); *G06F 9/485* (2013.01);
(Continued)

(58) Field of Classification Search
CPC .... G06F 16/958; G06F 3/0481; G06F 9/4806; G06F 9/4843; G06F 9/485; G06F 9/5066;
(Continued)

(56) References Cited

U.S. PATENT DOCUMENTS 3,736,409 A   5/1973   Boyan
5,826,258 A   10/1998  Gupta et al.
(Continued)

FOREIGN PATENT DOCUMENTS

CN   101957818 A1   1/2011
CN   109343939 A1   2/2019
(Continued)

OTHER PUBLICATIONS

International Search Report and Written Opinion issued in International Application No. PCT/US21/40437 dated Oct. 26, 2021.
(Continued)

*Primary Examiner* — Noosha Arjomandi
(74) *Attorney, Agent, or Firm* — Brian J. Colandreo; Heath M. Sargeant; Holland & Knight LLP

(57) ABSTRACT

A computer-implemented method, computer program product and computing system for normalizing descriptors within a master website dataset; comparing descriptors within a subordinate website dataset to descriptors within the master website dataset to define a similarity score for each descriptor within subordinate website dataset; and normalizing one or more descriptors of the subordinate website dataset if the similarity score is above a similarity threshold.

30 Claims, 18 Drawing Sheets

(51) Int. Cl.
| | |
|---|---|
| *G06N 20/00* | (2019.01) |
| *G06F 9/48* | (2006.01) |
| *G06N 5/02* | (2023.01) |
| *G06Q 30/0201* | (2023.01) |
| *G06F 16/955* | (2019.01) |
| *G06F 16/957* | (2019.01) |
| *G06F 16/951* | (2019.01) |
| *G06Q 30/0282* | (2023.01) |
| *G06Q 10/04* | (2023.01) |
| *G06Q 10/0631* | (2023.01) |
| *G06Q 10/0637* | (2023.01) |
| *G06Q 10/067* | (2023.01) |
| *G06F 11/36* | (2006.01) |
| *G06F 16/84* | (2019.01) |
| *G06F 9/50* | (2006.01) |
| *G06F 16/80* | (2019.01) |
| *G06F 40/14* | (2020.01) |
| *G06F 3/0481* | (2022.01) |
| *G06Q 30/0601* | (2023.01) |
| *G06F 9/54* | (2006.01) |
| *G06Q 10/0633* | (2023.01) |
| *G06F 18/214* | (2023.01) |
| *G06Q 10/0833* | (2023.01) |
| *G06Q 10/083* | (2023.01) |
| *G06Q 10/10* | (2023.01) |
| *G06Q 30/04* | (2012.01) |

(52) U.S. Cl.
CPC ......... *G06F 9/4806* (2013.01); *G06F 9/4843* (2013.01); *G06F 9/5066* (2013.01); *G06F 9/542* (2013.01); *G06F 9/547* (2013.01); *G06F 11/3612* (2013.01); *G06F 11/3616* (2013.01); *G06F 16/80* (2019.01); *G06F 16/84* (2019.01); *G06F 16/951* (2019.01); *G06F 16/955* (2019.01); *G06F 16/9577* (2019.01); *G06F 16/986* (2019.01); *G06F 18/214* (2023.01); *G06F 40/14* (2020.01); *G06N 5/027* (2013.01); *G06N 20/00* (2019.01); *G06Q 10/04* (2013.01); *G06Q 10/067* (2013.01); *G06Q 10/0633* (2013.01); *G06Q 10/06315* (2013.01); *G06Q 10/06375* (2013.01); *G06Q 30/0201* (2013.01); *G06Q 30/0282* (2013.01); *G06Q 30/0641* (2013.01); *G06Q 10/0833* (2013.01); *G06Q 10/0838* (2013.01); *G06Q 10/10* (2013.01); *G06Q 30/04* (2013.01)

(58) Field of Classification Search
CPC ...... G06F 9/542; G06F 9/547; G06F 11/3612; G06F 11/3616; G06F 16/80; G06F 16/84; G06F 16/951; G06F 16/955; G06F 16/9577; G06F 16/986; G06F 18/214; G06F 40/14; G06N 5/027; G06N 20/00; G06N 5/022; G06N 5/025; G06Q 10/04; G06Q 10/06315; G06Q 10/0633; G06Q 10/06375; G06Q 10/067; G06Q 30/0201; G06Q 30/0282; G06Q 30/0641; G06Q 10/0833; G06Q 10/0838; G06Q 10/10; G06Q 30/04
See application file for complete search history.

(56) References Cited

U.S. PATENT DOCUMENTS

| | | | |
|---|---|---|---|
| 6,343,275 B1 | 1/2002 | Wong | |
| 6,405,162 B1* | 6/2002 | Segond | G06F 40/30 |
| | | | 704/9 |
| 8,819,022 B1 | 8/2014 | Holsman et al. | |
| 9,361,069 B2 | 6/2016 | Martin | |
| 9,449,025 B1* | 9/2016 | Phung | G06F 16/532 |
| 10,096,040 B2 | 10/2018 | Subramanya | |
| 10,565,498 B1* | 2/2020 | Zhiyanov | G06N 3/045 |
| 10,838,585 B1 | 11/2020 | Douglas et al. | |
| 10,977,563 B2 | 4/2021 | Ajmera | |
| 10,990,645 B1 | 4/2021 | Shi | |
| 11,017,690 B1 | 5/2021 | Zia | |
| 11,151,174 B2 | 10/2021 | Denholm et al. | |
| 11,188,857 B1 | 11/2021 | Hill | |
| 11,409,520 B2* | 8/2022 | Kunamalla | G06Q 30/0202 |
| 11,481,310 B1 | 10/2022 | Panchev et al. | |
| 2001/0029604 A1 | 10/2001 | Dreyband | |
| 2003/0055742 A1 | 3/2003 | Hodl | |
| 2003/0135384 A1 | 7/2003 | Nguyen | |
| 2003/0145124 A1 | 7/2003 | Guyan | |
| 2004/0230647 A1 | 11/2004 | Dixon | |
| 2006/0162071 A1 | 7/2006 | Dixon | |
| 2007/0271287 A1* | 11/2007 | Acharya | G06F 16/285 |
| 2008/0098300 A1 | 4/2008 | Corrales | |
| 2009/0070773 A1 | 3/2009 | Depoutovitch | |
| 2009/0144240 A1* | 6/2009 | Singh | G06F 16/951 |
| 2009/0281792 A1* | 11/2009 | Green | G06F 16/24526 |
| | | | 707/E17.014 |
| 2011/0093467 A1* | 4/2011 | Sharp | G06F 16/2228 |
| | | | 707/E17.069 |
| 2012/0117569 A1 | 5/2012 | Fogel | |
| 2014/0222662 A1 | 8/2014 | Bierwas | |
| 2014/0344718 A1 | 11/2014 | Rapaport et al. | |
| 2014/0354657 A1 | 12/2014 | Gomba | |
| 2015/0006214 A1* | 1/2015 | Lavoie | G06Q 10/063118 |
| | | | 705/7.17 |
| 2015/0100869 A1 | 4/2015 | Sunshine et al. | |
| 2015/0269533 A1 | 9/2015 | Garg | |
| 2016/0162478 A1 | 6/2016 | Blassin | |
| 2017/0004422 A1 | 1/2017 | Todd | |
| 2017/0053295 A1 | 2/2017 | Tiell | |
| 2017/0163587 A1 | 6/2017 | Johnson | |
| 2017/0262185 A1* | 9/2017 | Long | G06F 3/067 |
| 2018/0152506 A1 | 5/2018 | Simo | |
| 2018/0181808 A1* | 6/2018 | Sridharan | G06V 30/19173 |
| 2018/0293517 A1 | 10/2018 | Boyan | |
| 2019/0026482 A1 | 1/2019 | Kenny | |
| 2019/0043107 A1 | 2/2019 | Brown | |
| 2019/0066018 A1 | 2/2019 | Sethi | |
| 2019/0228261 A1 | 7/2019 | Chan | |
| 2019/0244099 A1 | 8/2019 | Schaul | |
| 2019/0291277 A1 | 9/2019 | Oleynik | |
| 2019/0377713 A1* | 12/2019 | Lankford | G06F 16/2379 |
| 2019/0392019 A1 | 12/2019 | Brannon et al. | |
| 2020/0004740 A1 | 1/2020 | Alison | |
| 2020/0004798 A1 | 1/2020 | Weinert, Jr. et al. | |
| 2020/0133255 A1 | 4/2020 | Cella | |
| 2020/0185102 A1 | 6/2020 | Leventhal | |
| 2020/0210867 A1 | 7/2020 | Banis | |
| 2020/0319995 A1* | 10/2020 | Mitra | G06F 16/958 |
| 2020/0372294 A1* | 11/2020 | Koval | G06F 16/71 |
| 2021/0042724 A1 | 2/2021 | Rathod | |
| 2021/0055955 A1 | 2/2021 | Yankelevich | |
| 2021/0256076 A1 | 8/2021 | McMurray | |
| 2021/0271709 A1* | 9/2021 | Kazem | G06F 40/30 |
| 2021/0289031 A1 | 9/2021 | Eigarat | |
| 2021/0373943 A1 | 12/2021 | Sim | |
| 2022/0004576 A1* | 1/2022 | Harding | G06F 11/3612 |
| 2022/0237228 A1* | 7/2022 | Xu | G06F 16/2474 |

FOREIGN PATENT DOCUMENTS

| | | |
|---|---|---|
| WO | 2013010557 A1 | 1/2013 |
| WO | 2016145402 A1 | 6/2016 |

OTHER PUBLICATIONS

International Search Report and Written Opinion issued in International Application No. PCT/US2021/040475 dated Nov. 5, 2021.
International Search Report and Written Opinion issued in International Application No. PCT/US2021/040465 dated Oct. 5, 2021.

(56) References Cited

OTHER PUBLICATIONS

International Search Report and Written Opinion issued in International Application No. PCT/US2021/040440 dated Sep. 30, 2021.
International Search Report and Written Opinion issued in International Application No. PCT/US2021/040471 dated Oct. 20, 2021.
Non-Final Office Action issued in U.S. Appl. No. 17/368,325 dated Nov. 10, 2021.
Non-Final Office Action issued in U.S. Appl. No. 17/368,142 dated Nov. 12, 2021.
Raposo, "A Web Agent for Automating E-Commerce Operations," IEEE International Conference on E-Commerce, (2003).
Non-Final Office Action issued in U.S. Appl. No. 17/368,236 dated Nov. 26, 2021.
Non-Final Office Action issued in related U.S. Appl. No. 17/368,192 dated Aug. 1, 2022.
Non-Final Office Action issued in related U.S. Appl. No. 17/368,083 dated Sep. 2, 2022.
Notice of Allowance issued in related U.S. Appl. No. 17/368,325 dated Oct. 13, 2022.
Notice of Allowance issued in related U.S. Appl. No. 17/368,446 dated Oct. 27, 2022.
Final Office Action issued in U.S. Appl. No. 17/368,446 dated Mar. 10, 2022.
Non-Final Office Action issued in U.S. Appl. No. 17/368,446 dated Apr. 25, 2022.
Non-Final Office Action issued in U.S. Appl. No. 17/368,325 dated May 4, 2022.
Final Office Action issued in U.S. Appl. No. 17/368,236 dated May 10, 2022.
Non-Final Office Action issued in U.S. Appl. No. 17/268,465 dated Jun. 16, 2022.
Lutfi et al., "Towards Automated Optimization of Web Interfaces and Application to E-commerce." 2017 International Conference on Computer and Applications (ICCA). IEEE, (Year: 2017).
Castaneda et al., "Towards personalized web-tasking: Task simplification challenges." 2013 IEEE Ninth World Congress on Services. IEEE, (Year: 2013).
Non-Final Office Action issued in U.S. Appl. No. 17/368,192 dated Aug. 1, 2022.
International Preliminary Report issued on related Application Serial No. PCT/US2021/040437 dated Jan. 19, 2023.
International Preliminary Report issued on related Application Serial No. PCT/US2021/040440 dated Jan. 19, 2023.
International Preliminary Report issued on related Application Serial No. PCT/US2021/040465 dated Jan. 19, 2023.
International Preliminary Report issued on related Application Serial No. PCT/US2021/040471 dated Jan. 19, 2023.
International Preliminary Report issued on related Application Serial No. PCT/US2021/040475 dated Jan. 19, 2023.
Final Office Action issued in related U.S. Appl. No. 17/368,555 dated Jun. 20, 2023.
Final Office Action issued in related U.S. Appl. No. 17/368,192 dated Jun. 7, 2023.
Final Office Action issued in related U.S. Appl. No. 17/368,465 dated Mar. 30, 2023.
Final Office Action issued in related U.S. Appl. No. 17/368,083 dated Mar. 17, 2023.

* cited by examiner

AUTOMATION SYSTEM AND METHOD

RELATED APPLICATION(S)

This application claims the benefit of U.S. Provisional Application No. 63/048,598 filed on 6 Jul. 2020, the entire contents of which are incorporated herein by reference.

TECHNICAL FIELD

This disclosure relates to automation systems and methods and, more particularly, to automation systems and methods that automatically process online web resources.

BACKGROUND

Conventional machine-to-machine communication is generally defined by specific communication protocols across various application, transport, and Internet layers (e.g., Hypertext Transfer Protocol (HTTP), Transmission Control Protocol (TCP), Internet Protocol (IP), etc.). However, for online web resources, communication between machines is generally limited to application programming interfaces (APIs) preprogrammed for particular purposes, and the presentation of webpages on a browser designed for a human user to navigate and perform operations thereon. Unfortunately, APIs are not standardized and are human-designed/coded for particular purposes, and websites are written to display a browser for human interpretability; not machine interpretability. Accordingly, conventional approaches to processing web resources and APIs do not allow machines to "learn" how to communicate with one another without human intervention.

SUMMARY OF DISCLOSURE

Ontology:

In one implementation, a computer-implemented method is executed on a computing device and includes: normalizing descriptors within a master website dataset; comparing descriptors within a subordinate website dataset to descriptors within the master website dataset to define a similarity score for each descriptor within subordinate website dataset; and normalizing one or more descriptors of the subordinate website dataset if the similarity score is above a similarity threshold.

One or more of the following features may be included. The one or more descriptors may include one or more of: a property descriptor; an attribute descriptor; and a value descriptor. Comparing descriptors within a subordinate website dataset to descriptors within the master website dataset to define a similarity score for each descriptor within subordinate website dataset may include: determining a Cartesian product of descriptors within a subordinate website dataset and descriptors within the master website dataset to define the similarity score for each descriptor within subordinate website dataset. The descriptors within the master website dataset may be obtained via a description model. The descriptors within the subordinate website dataset may be obtained via the description model. The description model may include a data description model. The description model may include a function description model. The similarity score may be one or more of: a value set similarity score; a type similarity score; and a string similarity score. Normalizing one or more descriptors of the subordinate website dataset if the similarity score is above a similarity threshold may include: mapping the one or more descriptors of the subordinate website dataset to the one or more descriptors of the master website dataset. A plurality of mappings may be generated between one or more descriptors of a plurality of subordinate website datasets and the one or more descriptors of the master website dataset. The plurality of mappings between the one or more descriptors of a plurality of subordinate website datasets and the one or more descriptors of the master website dataset may be provided to a machine learning process. Target subordinate website data concerning a target subordinate website may be provided to the machine learning process. One or more descriptors of the target website data may be normalized to the master website dataset using the machine learning process.

In another implementation, a computer program product resides on a computer readable medium and has a plurality of instructions stored on it. When executed by a processor, the instructions cause the processor to perform operations including normalizing descriptors within a master website dataset; comparing descriptors within a subordinate website dataset to descriptors within the master website dataset to define a similarity score for each descriptor within subordinate website dataset; and normalizing one or more descriptors of the subordinate website dataset if the similarity score is above a similarity threshold.

One or more of the following features may be included. The one or more descriptors may include one or more of: a property descriptor; an attribute descriptor; and a value descriptor. Comparing descriptors within a subordinate website dataset to descriptors within the master website dataset to define a similarity score for each descriptor within subordinate website dataset may include: determining a Cartesian product of descriptors within a subordinate website dataset and descriptors within the master website dataset to define the similarity score for each descriptor within subordinate website dataset. The descriptors within the master website dataset may be obtained via a description model. The descriptors within the subordinate website dataset may be obtained via the description model. The description model may include a data description model. The description model may include a function description model. The similarity score may be one or more of: a value set similarity score; a type similarity score; and a string similarity score. Normalizing one or more descriptors of the subordinate website dataset if the similarity score is above a similarity threshold may include: mapping the one or more descriptors of the subordinate website dataset to the one or more descriptors of the master website dataset. A plurality of mappings may be generated between one or more descriptors of a plurality of subordinate website datasets and the one or more descriptors of the master website dataset. The plurality of mappings between the one or more descriptors of a plurality of subordinate website datasets and the one or more descriptors of the master website dataset may be provided to a machine learning process. Target subordinate website data concerning a target subordinate website may be provided to the machine learning process. One or more descriptors of the target website data may be normalized to the master website dataset using the machine learning process.

In another implementation, a computing system includes a processor and a memory system configured to perform operations including normalizing descriptors within a master website dataset; comparing descriptors within a subordinate website dataset to descriptors within the master website dataset to define a similarity score for each descriptor within subordinate website dataset; and normalizing one or more descriptors of the subordinate website dataset if the similarity score is above a similarity threshold.

One or more of the following features may be included. The one or more descriptors may include one or more of: a property descriptor; an attribute descriptor; and a value descriptor. Comparing descriptors within a subordinate website dataset to descriptors within the master website dataset to define a similarity score for each descriptor within subordinate website dataset may include: determining a Cartesian product of descriptors within a subordinate website dataset and descriptors within the master website dataset to define the similarity score for each descriptor within subordinate website dataset. The descriptors within the master website dataset may be obtained via a description model. The descriptors within the subordinate website dataset may be obtained via the description model. The description model may include a data description model. The description model may include a function description model. The similarity score may be one or more of: a value set similarity score; a type similarity score; and a string similarity score. Normalizing one or more descriptors of the subordinate website dataset if the similarity score is above a similarity threshold may include: mapping the one or more descriptors of the subordinate website dataset to the one or more descriptors of the master website dataset. A plurality of mappings may be generated between one or more descriptors of a plurality of subordinate website datasets and the one or more descriptors of the master website dataset. The plurality of mappings between the one or more descriptors of a plurality of subordinate website datasets and the one or more descriptors of the master website dataset may be provided to a machine learning process. Target subordinate website data concerning a target subordinate website may be provided to the machine learning process. One or more descriptors of the target website data may be normalized to the master website dataset using the machine learning process.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
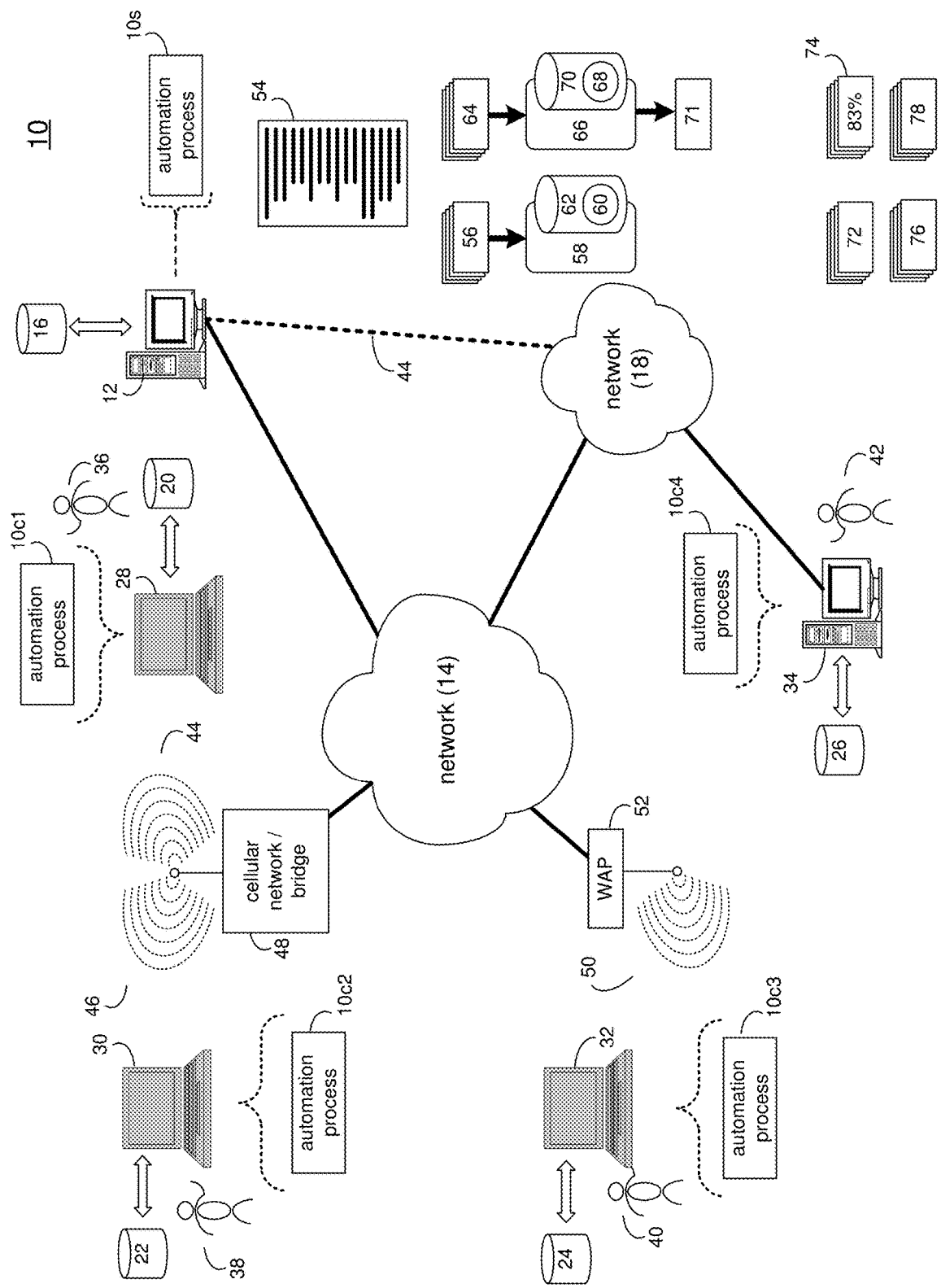
FIG. 1 is a diagrammatic view of a distributed computing network including a computing device that executes an automation process according to an embodiment of the present disclosure.

Referring to FIG. 1, there is shown automation process 10. Automation process 10 may be implemented as a server-side process, a client-side process, or a hybrid server-side/client-side process. For example, automation process 10 may be implemented as a purely server-side process via automation process 10s. Alternatively, automation process 10 may be implemented as a purely client-side process via one or more of automation process 10c1, automation process 10c2, automation process 10c3, and automation process 10c4. Alternatively still, automation process 10 may be implemented as a hybrid server-side/client-side process via automation process 10s in combination with one or more of automation process 10c1, automation process 10c2, automation process 10c3, and automation process 10c4. Accordingly, automation process 10 as used in this disclosure may include any combination of automation process 10s, automation process 10c1, automation process 10c2, automation process 10c3, and automation process 10c4.

Automation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, a smartphone, or a cloud-based computing platform.

The instruction sets and subroutines of automation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of automation processes 10c1, 10c2, 10c3, 10c4 may include but are not limited to a web browser, a game console user interface, a mobile device user interface, or a specialized application (e.g., an application running on e.g., the Android" platform, the iOS™ platform, the Windows™ platform, the Linux™ platform or the UNIX™ platform). The instruction sets and subroutines of automation processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to, a smartphone (not shown), a personal digital assistant (not shown), a tablet computer (not shown), laptop computers 28, 30, 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, iOS™, Linux™, or a custom operating system.

Users 36, 38, 40, 42 may access automation process 10 directly through network 14 or through secondary network 18. Further, automation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, laptop computer 28 and laptop computer 30 are shown wirelessly coupled to network 14 via wireless communication channels 44, 46 (respectively) established between laptop computers 28, 30 (respectively) and cellular network/bridge 48, which is shown directly coupled to network 14. Further, laptop computer 32 is shown wirelessly coupled to network 14 via wireless communication channel 50 established between laptop computer 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between laptop computer 32 and WAP 52. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

Automation Process Overview

As will be discussed below in greater detail, automation process 10 may be configured to allow for the automated processing of websites (generally) and ecommerce websites (specifically) so that these websites may effectuate the functionality of a database with respect to the products/services that are available for purchase through these websites. By enabling such functionality, complex tasks may be automatically effectuated at a holistic level, thus allowing automated searching to occur across multiple websites so that the purchases effectuated across these multiple websites may cumulatively satisfy the complex task.

Figure 2:
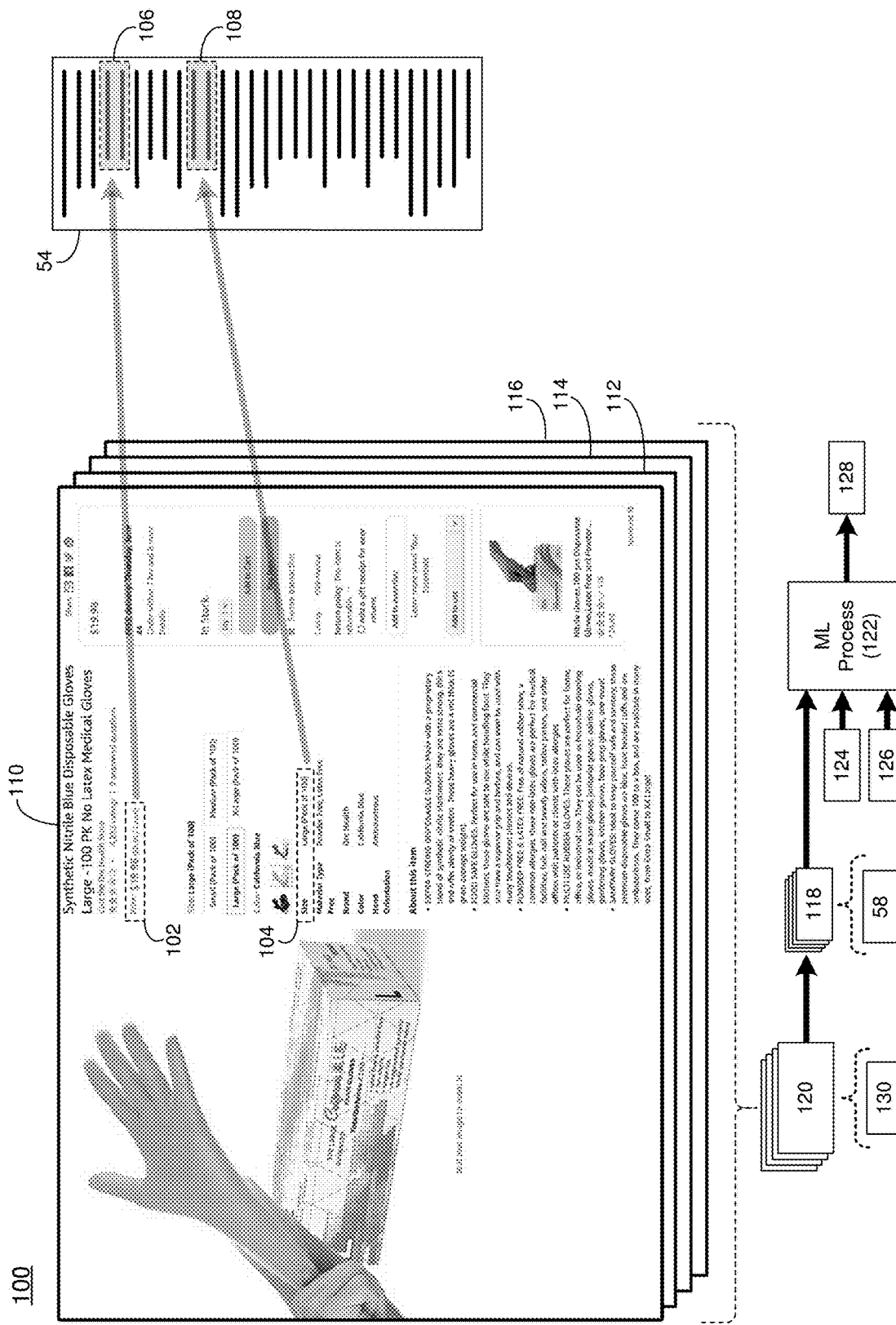
FIG. 2 is a diagrammatic view of a website for processing by the automation process of FIG. 1 according to an embodiment of the present disclosure.
Figure 3:
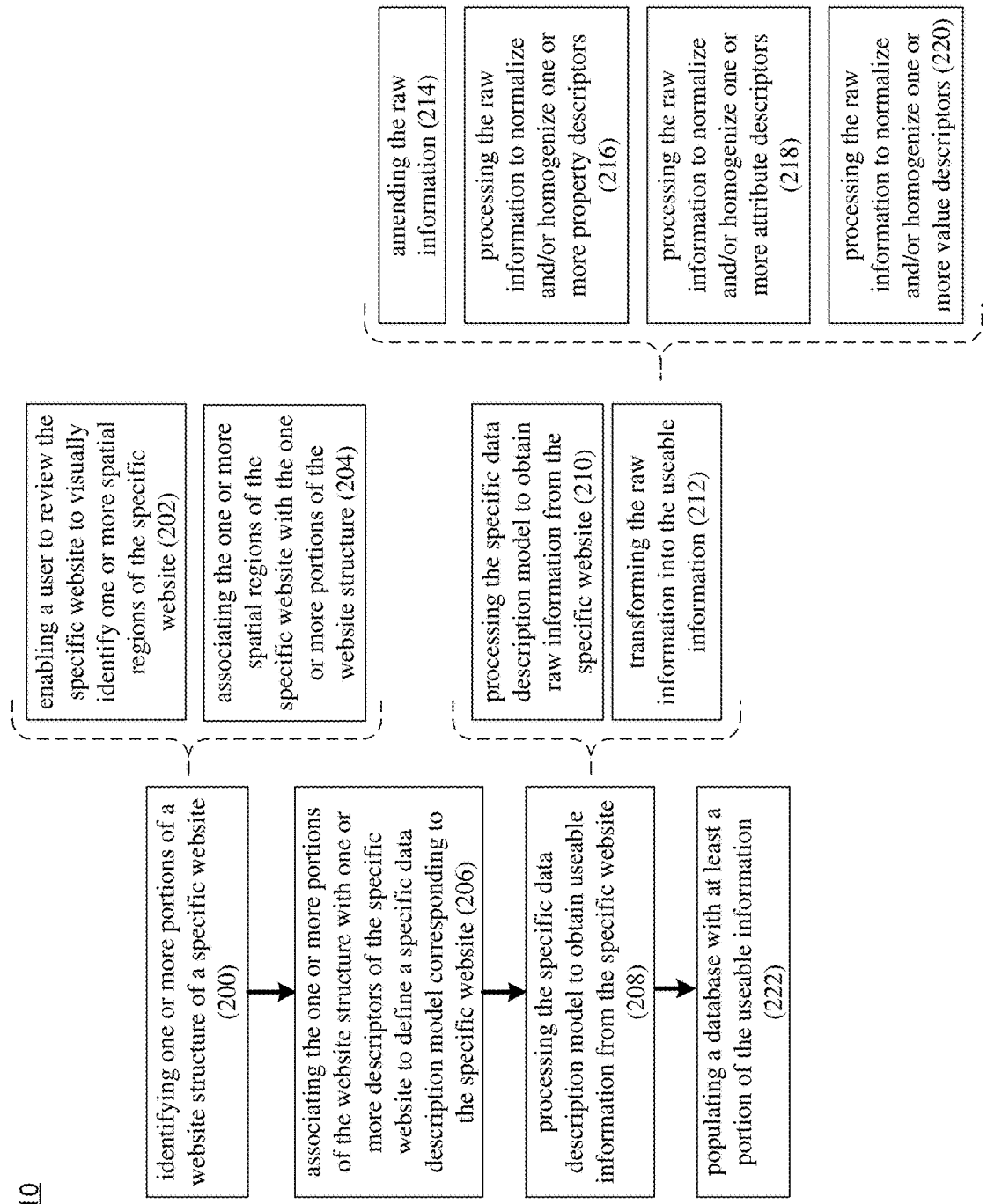
FIG. 3 is a flowchart of the automation process of FIG. 1 according to an embodiment of the present disclosure.

DataFi (General):

Referring also to FIGS. 2-3 and in order to enable such automated processing of websites, automation process 10 may enable a user (e.g., user 36) to review various websites (e.g., website 100), examples of which may include but are not limited to ecommerce websites that enable users to purchase various products/services.

For example, automation process 10 may identify 200 one or more portions of a website structure (e.g., website structure 54) of a specific website (e.g., website 100). Examples of such a website structure (e.g., website structure 54) may include one or more of: a HTML website structure; a javascript website structure; and a CSS website structure.

HTML Website Structure: The HyperText Markup Language (i.e., HTML) is the standard markup language for documents designed to be displayed in a web browser. It may be assisted by technologies such as Cascading Style Sheets (CS S) and scripting languages. Web browsers may receive HTML documents from a web server or from local storage and render the documents into multimedia web pages. HTML may describe the structure of a web page semantically and originally included cues for the appearance of the document. HTML elements may be the building blocks of HTML pages. With HTML constructs, images and other objects such as interactive forms may be embedded into the rendered page. HTML may provide a means to create structured documents by denoting structural semantics for text such as headings, paragraphs, lists, links, quotes and other items. HTML elements may be delineated by tags, written using angle brackets. Tags such as <img /> and <input /> directly introduce content into the page. Other tags such as <p> may surround and provide information about document text and may include other tags as sub-elements. Browsers do not display the HTML tags, but use them to interpret the content of the page.

Javascript Website Structure: JavaScript (JS) is a programming language that conforms to the ECMAScript specification. JavaScript is high-level, often just-in-time compiled, and multi-paradigm. It may have curly-bracket syntax, dynamic typing, prototype-based object-orientation, and first-class functions. Alongside HTML and CSS, JavaScript is one of the core technologies of the World Wide Web. Over 97% of websites use it client-side for web page behavior, often incorporating third-party libraries. All major web browsers have a dedicated JavaScript engine to execute the code on the user's device. As a multi-paradigm language, JavaScript may support event-driven, functional, and imperative programming styles. It may have application programming interfaces (APIs) for working with text, dates, regular expressions, standard data structures, and the Document Object Model (DOM). DOM is a programming API for HTML and XML documents that defines the logical structure of documents and the way a document is accessed and manipulated. For example, DOM may treat an HTML or XML document as a tree structure where each node is an object representing a part of the document.

CSS Website Structure: Cascading Style Sheets (CSS) is a style sheet language used for describing the presentation of a document written in a markup language such as HTML. CSS is a cornerstone technology of the World Wide Web, alongside HTML and JavaScript. CSS is designed to enable the separation of presentation and content, including layout, colors, and fonts. This separation can improve content accessibility, provide more flexibility and control in the specification of presentation characteristics, enable multiple web pages to share formatting by specifying the relevant CSS in a separate .css file which reduces complexity and repetition in the structural content as well as enabling the .css file to be cached to improve the page load speed between the pages that share the file and its formatting. Separation of formatting and content may make it feasible to present the same markup page in different styles for different rendering methods, such as on-screen, in print, by voice (via speech-based browser or screen reader), and on Braille-based tactile devices. CSS may also have rules for alternate formatting if the content is accessed on a mobile device.

When identifying 200 one or more portions of a website structure (e.g., website structure 54) of a specific website (e.g., website 100), automation process 10 may: enable 202 a user (e.g., user 36) to review the specific website (e.g., website 100) to visually identify one or more spatial regions of the specific website (e.g., website 100); and associate 204 the one or more spatial regions of the specific website (e.g., website 100) with the one or more portions of the website structure (e.g., website structure 54). For example, automation process 10 may enable 202 user 36 to review website 100 to visually identify spatial regions 102, 104 of website 100 (via selection with a mouse, not shown) and associate 204 spatial regions 102, 104 of website 100 with structure portions 106, 108 (respectively) of website structure 54. Specifically, when user 36 visually identifies a spatial region (e.g., one of spatial regions 102, 104) of website 100, automation process 10 may automatically associate 204 the identified spatial region (e.g., one of spatial regions 102, 104) with the corresponding portion (e.g., one of structure portions 106, 108 respectively) of the website structure (e.g., website structure 54) of the specific website (e.g., website 100).

Automation process 10 may associate 206 the one or more portions (e.g., structure portions 106, 108) of the website structure (e.g., website structure 54) with one or more descriptors (e.g., descriptors 56) of the specific website (e.g., website 100) to define a specific data description model (e.g., specific data description model 58) corresponding to the specific website (e.g., website 100).

The one or more descriptors (e.g., descriptors 56) may include one or more:

Property Descriptors: A property descriptor may identify the field/area/region name of highly pertinent portion of a website, wherein these fields/areas/regions are common on a particular type of website. Accordingly, if website 100 is an ecommerce website, examples of such property descriptors may include but are not limited to: a title field/area/region; a picture field/area/region; a description field/area/region; and a price field/area/region. A property descriptor may be user-defined and/or automatically defined for a particular domain. For example, a domain may generally describe a type of website. Examples of domains may include but are not limited to: ecommerce websites; news websites; social media websites; and information websites. The property descriptor may be domain-specific such that each domain may include one or more property descriptors that represent highly pertinent portions of the website for that domain. The property descriptors for each domain may be defined in a domain ontology.

Attribute Descriptors: An attribute descriptor may identify the field/area/region name of supplemental portion of a website, wherein these fields/areas/regions supplement the above-described property descriptors. Accordingly, if website 100 is an ecommerce website, examples of such attribute descriptors may include but are not limited to: a size field/area/region; a color field/area/region; a material field/area/region; and a brand field/area/region.

Value Descriptors: A value descriptor may identify a value for one of the above-described property descriptors and/or attribute descriptors. For example and with respect to website 100, the value descriptor for the "size" attribute descriptor may be "Large"; the value descriptor for the "color" attribute descriptor may be "California Blue"; the value descriptor for the "price" property descriptor may be "$19.98"; and the value descriptor for the "title" property descriptor may be "Synthetic Nitrile Blue Disposable Gloves".

Automation process 10 may provide a user interface or overlay on a web browser as user 36 interacts with website 100. For example, the user interface may be an extension of a web browser, built-into a web browser, and/or may be executed separately from a web browser that provides the ability to access websites. When identifying 200 one or more portions of website structure 54 of website 100, the domain associated with website 100 may be determined. For example, a user 36 may provide (e.g., using the user interface) an indication or selection of the domain for website 100. In another example, the domain may be automatically defined by automation process 10 e.g., when loading website 100. In this example, suppose website 100 is an ecommerce website. Accordingly, website 100 may be associated with the ecommerce domain and automated process 10 may provide (e.g., within the user interface) a list of one or more property descriptors specific to the ecommerce domain for the user to visually identify within website 100.

Associating 206 the structure portions 106, 108 of website structure 54 with descriptors 56 of website 100 to define a specific data description model may include defining, using the user interface, descriptors for structure portion corresponding to the identified spatial regions. For example, automation process 10 may provide, using the user interface, user 36 with the ability to define or select a descriptor type (e.g., a property descriptor, an attribute descriptor, or a value descriptor) for each structure portion corresponding to the identified spatial region(s). For example, automation process 10 may associate 206 structure portion 106 of website structure 54 with a price property descriptor and may associate 206 structure portion 108 of website structure 54 with a size attribute descriptor. In this manner, automation process 10 may define or generate the specific data description model for website 100 by associating or mapping particular specific structure portions of the website structure with one or more descriptors of the data description model corresponding to website 100.

Associating 206 the structure portions 106, 108 of website structure 54 with descriptors 56 of website 100 to define a specific data description model may include defining, within the data description model, how to navigate between particular portions of the specific website (e.g., webpages of the specific website). For example and when defining specific data description model 58 corresponding to website 100, automation process 10 may define a "home" webpage to initialize processing of website 100. Suppose the home webpage of website 100 includes a list of webpages organized into a plurality of categories (i.e., on a category page). In this example, suppose the category page includes one or more links or other references to particular webpages based upon the category of each webpage. Automation process 10 may enable 202 a user to visually select the one or more spatial regions of the category page including the one or more links. Automation process 10 may associate 204 the selected spatial regions with the one or more corresponding portions of the webpage structure for the category page with the one or more links. Automation process 10 may associate 206 particular structure portions of the category page with one or more descriptors for the one or more links of the category webpage. The processing of a category page as described above may be repeated recursively for a plurality of category pages with links to each webpage of a website. Accordingly, defining the specific data description model with one or more category webpages may allow a computing device to navigate and process each webpage of website 100. As will be discussed in greater detail below, automation process 10 may record the user's interactions within the website to define a functional description model configured to navigate and process webpages without human intervention.

When identifying 200 the one or more portions of the website structure of a specific website, the one or more portions (e.g., structure portions 106, 108) of website structure (e.g., website structure 54) may be generated or exposed in response to a user's interactions with the website (e.g., website 100). For example and as is known in the art, some websites may include portions of website structure or code that are generated dynamically as a user interacts with the website. Accordingly, automation process 10 may enable 202 a user (e.g., user 36) to interact with a website (e.g., website 100) to visually identify spatial regions of website 100 and associate 204 the spatial regions with the portions of webpage structure generated or exposed in response to user 36's interaction with website 100. Accordingly, automation process 10 may associate 206 the generated or exposed structure portions of the website structure with one or more descriptors of website 100 to define a specific data description model. As will be discussed in greater detail below, automation process 10 may define a function description model based, at least in part, upon the user's interactions with the website that result in the dynamic generation of website structure.

The specific data description model (e.g., specific data description model 58) corresponding to the specific website (e.g., website 100) may be configured to allow for the above-described automated accessing of (in this example) website 100. For example and as discussed above, since specific data description model 58 locates the various data-related portions (e.g., structure portions 106, 108) within the website structure (e.g., website structure 54) of the specific website (e.g., website 100), the specific website (e.g., website 100) may be accessed and utilized in an automated fashion (since specific data description model 58 eliminates the need for a human being to visually-navigate website 100).

Once the user (e.g., user 36) and automation process 10 processes (in this example) webpage 110 of website 100, the user (e.g., user 36) and automation process 10 may process (in this example) additional webpages (e.g., webpages 112, 114, 116) of website 100 to obtain additional data for inclusion within (and further refinement of) data description model 58. For example, automation process 10 may enable 202 user 36 to review additional webpages (e.g., webpages 112, 114, 116) of website 100 to visually identify one or more spatial regions of these webpages (e.g., webpages 112, 114, 116) and associate 204 these spatial regions with one or more portions of the website structure (e.g., website structure 54) to obtain additional data for inclusion within (and further refinement of) the specific data description model (e.g., specific data description model 58) corresponding to the specific website (e.g., website 100).

When enabling 202 a user to review additional webpages, automation process 10 may provide, via the user interface, one or more suggestions for particular spatial regions of the additional webpages to identify as descriptors within the specific data description model. For example, suppose user 36 is reviewing webpage 112. In this example, as user 36 hovers a mouse (not shown) adjacent to the same spatial region (e.g., spatial region 102) that was associated with e.g., a price property descriptor for webpage 110, the user interface may display a hint or suggestion to associate 204 the same spatial region of webpage 112 with the structure portion of webpage 112 and to associate 206 the structure portion with the e.g., price property descriptor. Similarly, as user 36 hovers a mouse (not shown) adjacent to the same spatial region (e.g., spatial region 104) that was associated with e.g., a size attribute descriptor for webpage 110, the user interface may display a hint or suggestion to associate 204 the same spatial region of webpage 112 with the structure portion of webpage 112 and to associate 206 the structure portion with the e.g., size attribute descriptor. In this manner, automation process 10 may provide automated suggestions for defining specific data description model 58 based, at least in part, upon a user's interactions with the webpages of website 100.

Once a sufficient quantity of webpages (e.g., webpages 110, 112, 114, 116) of website 100 are processed (e.g., ten or more), automation process 10 may process 208 the specific data description model (e.g., specific data description model 58) to obtain useable information from the specific website (e.g., website 100). For example and when processing 208 the specific data description model (e.g., specific data description model 58) to obtain useable information from the specific website (e.g., website 100), automation process 10 may process 210 the specific data description model (e.g., specific data description model 58) to obtain raw information from the specific website (e.g., website 100); and transform 212 the raw information into the useable information.

As discussed above, automation process 10 may associate 206 the one or more portions (e.g., structure portions 106, 108) of the website structure (e.g., website structure 54) with one or more descriptors (e.g., descriptors 56) of the specific website (e.g., website 100) to define a specific data description model (e.g., specific data description model 58) corresponding to the specific website (e.g., website 100), wherein these descriptors (e.g., descriptors 56) may include property descriptors, attribute descriptors and value descriptors. As could be imagined, it is foreseeable that different webpages within a website may use different descriptors (e.g., descriptors 56). For example, some webpages within website 100 may use Small/Medium/Large, while other webpages within website 100 may use S/M/L. Further, some webpages within website 100 may use "Quantity", while other webpages within website 100 may use "Count". Additionally, some webpages within website 100 may use "Material", while other webpages within website 100 may use "Construction". Further still, some webpages within website 100 may use "Manufacturer", while other webpages within website 100 may use "Brand".

In order to properly utilize such data (e.g., descriptors 56), automation process 10 may process this data to transform 212 it from raw information (e.g., descriptors 56 in their original disjointed form) into useable information 60 (as will be described below). When transforming 212 the raw information (e.g., descriptors 56) into useable information 60, automation process 10 may: amend 214 the raw information (e.g., descriptors 56); process 216 the raw information (e.g., descriptors 56) to normalize and/or homogenize one or more property descriptors; process 218 the raw information (e.g., descriptors 56) to normalize and/or homogenize one or more attribute descriptors; and/or process 220 the raw information (e.g., descriptors 56) to normalize and/or homogenize one or more value descriptors.

Amend the Raw Information: Since it is foreseeable that different webpages within a website (e.g., website 100) may use data that is formatted differently, automation process 10 may amend such raw information (e.g., descriptors 56). For example, some webpages within website 100 may use data that has e.g., filler spaces inserted before a value, while other webpages within website 100 may not use such filler spaces. Accordingly, automation process 10 may amend this raw information (e.g., descriptors 56) so that e.g., all information defined within data description model 58 does not use filler spaces, thus generating useable information 60.

Normalize/Homogenize the Property Descriptors: Since it is foreseeable that different webpages within a website (e.g., website 100) may use different property descriptors, automation process 10 may normalize/homogenize such property descriptors. For example, some webpages within website 100 may use the term "description" while other webpages within website 100 may use the term "details". Accordingly, automation process 10 may normalize/homogenize this raw information (e.g., descriptors 56) such that e.g., all webpages defined within data description model 58 use the term "description", thus generating useable information 60. As will be discussed in greater detail below, automation process 10 may normalize/homogenize this raw information (e.g., descriptors 56) using an ontology defined for the website, multiple websites, and/or a domain, thus generating useable information 60.

Normalize/Homogenize the Attribute Descriptors: Since it is foreseeable that different webpages within a website (e.g., website 100) may use different attribute descriptors, automation process 10 may normalize/homogenize such attribute descriptors. For example, some webpages within website 100 may use the term "Quantity" while other webpages within website 100 may use the term "Count". Accordingly, automation process 10 may normalize/homogenize this raw information (e.g., descriptors 56) such that e.g., all webpages defined within data description model 58 use the term "Quantity", thus generating useable information 60. As will be discussed in greater detail below, automation process 10 may normalize/homogenize this raw information (e.g., descriptors 56) using an ontology defined for the website, multiple websites, and/or a domain, thus generating useable information 60.

Normalize/Homogenize the Value Descriptors: Since it is foreseeable that different webpages within a website (e.g., website 100) may use different value descriptors, automation process 10 may normalize/homogenize such value descriptors. For example, some webpages within website 100 may use the terms "Small/Medium/Large" while other webpages within website 100 may use the term "S/M/L". Accordingly, automation process 10 may normalize/homogenize this raw information (e.g., descriptors 56) such that e.g., all webpages defined within data description model 58 use the term "Small/Medium/Large", thus generating useable information 60. As will be discussed in greater detail below, automation process 10 may normalize/homogenize this raw information (e.g., descriptors 56) using an ontology defined for the website, multiple websites, and/or a domain, thus generating useable information 60.

Once the raw information (e.g., the above-described property/attribute/value descriptors 56 in their original disjointed form) within data description model 58 are transformed 212 into useable information (i.e., useable information 60), automation process 10 may populate 222 a database (e.g., database 62) with at least a portion of this useable information (i.e., useable information 60), wherein database 62 may be included within and/or associated with data description model 58. Useable information 60 stored within database 60 may (generally speaking) function as a roadmap that allows for automated navigation of (in this example) website 100.

Continuing with the above-stated example, automation process 10 may utilize data description model 58 and useable information 60 to process additional webpages within website 100. As could be imagined, a website (especially an ecommerce website) may include hundreds of thousands of webpages that correspond to the hundreds of thousands of products they sell. Accordingly, automation process 10 may allow a user to manually identify 200 one or more portions of a website structure (e.g., website structure 54) of a specific website (e.g., website 100) to define specific data description model 58 (albeit it in a rudimentary form). Automation process 10 may then use specific data description model 58 to automatically process (in the fashion described above) the remaining webpages within website 100 to further refine specific data description model 58.

As discussed above and with specific data description model 58 defined for website 100, automation process 10 may process 208 specific data description model 58 to obtain useable information from website 100 and populate 222 a database (e.g., database 62) with at least a portion of this useable information (i.e., useable information 60). In an example where website 100 is an ecommerce website, website 100 may include hundreds of thousands of webpages to correspond to the hundreds of thousands of products they sell. As such, automation process 10 may populate 222 database 62 with useable information pertaining to the products from the hundreds of thousands of webpages by defining and executing specific data description model 58 on the webpages of website 100. In this manner, automation process 10 may allow for the generation or population of one or more databases representative of the useable information of the various webpages of a website. Accordingly, automation process 10 may automatically obtain useable information from a website and organize that information into a separate database utilizing the data description model without human intervention.

Automation process 10 may repeat the above described process for various other websites by defining data description models for respective websites, processing those data description models on the respective websites, and populating one or more databases with at least a portion of useable information from the respective websites. When processing each data description model, automation process 10 may populate the same database for each website, separate databases for each website, and/or certain databases for particular websites. For example, automation process 10 may populate one or more domain-specific databases based, at least in part, upon the domain of each data description model. However, it will be appreciated that information from any combination of websites may be used to populate any combination of databases within the scope of the present disclosure. In this manner, automation process 10 may process data description models for multiple websites to generate an aggregated database of information from each respective website.

Figure 4:
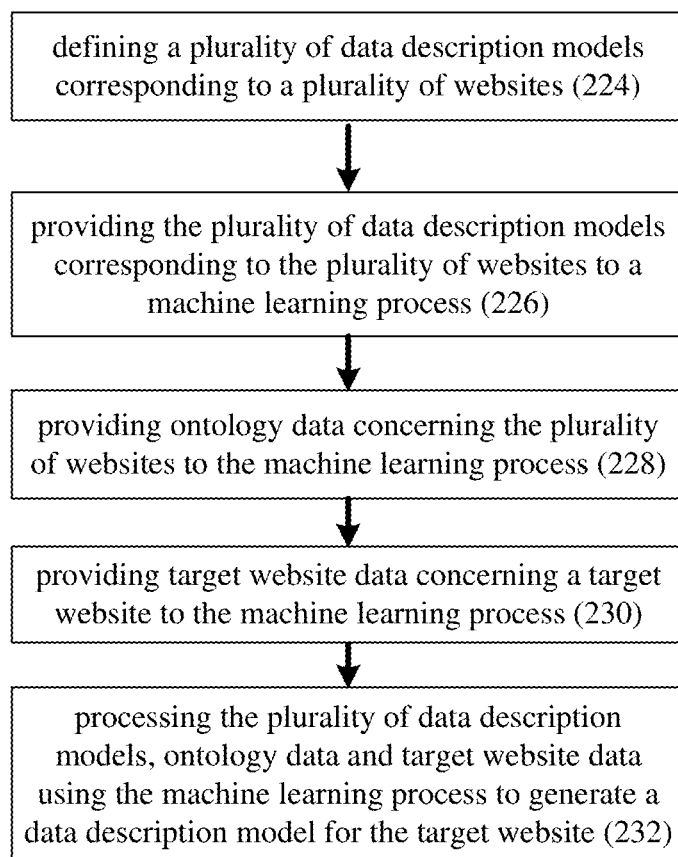
FIG. 4 is another flowchart of the automation process of FIG. 1 according to an embodiment of the present disclosure.

DataFi (Data Models Generating Data Models):

Referring also to FIG. 4 and once specific data description model 58 is completely defined (e.g., all of the webpages of website 100 have been processed), automation process 10 may define 224 a plurality of data description models (e.g., plurality of data description models 118) corresponding to a plurality of websites (e.g., plurality of websites 120), the plurality of data description models (e.g., plurality of data description models 118) including: the specific data description model (e.g., specific data description model 58) corresponding to the specific website (e.g., specific website 100), and one or more additional data description models corresponding to one or more additional websites.

Automation process 10 may provide 226 the plurality of data description models (e.g., plurality of data description models 118) corresponding to the plurality of websites (e.g., plurality of websites 120) to a machine learning (ML) process (e.g., machine learning process 122).

As is known in the art, machine learning (ML) is the study of computer algorithms that improve automatically through experience and by the use of data. It is seen as a part of artificial intelligence. Machine learning algorithms may build a model based on sample data (known as "training data") in order to make predictions or decisions without being explicitly programmed to do so. Machine learning algorithms may be used in a wide variety of applications, such as in medicine, email filtering, speech recognition, and computer vision, wherein it may be difficult or unfeasible to develop conventional algorithms to perform the needed tasks. Machine learning may involve computers discovering how they can perform tasks without being explicitly programmed to do so. It may involve computers learning from data provided so that they carry out certain tasks.

As discussed above, data description models locate the various data-related portions within a website structure of a website, thus eliminating the need for a human being to visually-navigate a website. Accordingly, machine learning process 122 may define data description models that represent a website in a machine-interpretable format. In this manner, computing devices may use the data description model defined for a website to navigate that website without human intervention. In this manner, machine learning process 122 may use the plurality of data description models (e.g., plurality of data description models 118) corresponding to the plurality of websites (e.g., plurality of websites 120) as training data to "learn" how to navigate other websites.

Additionally, automation process 10 may provide 228 ontology data (e.g., ontology data 124) concerning the plurality of websites (e.g., plurality of websites 120) to the machine learning process (e.g., machine learning process 122).

As will be discussed in greater detail below, in order to process different descriptors across different websites, automation process 10 may normalize descriptors (e.g., descriptors 56) within a master website dataset to generate ontology data 124. When generating a data description model for a target website (e.g., www.targetwebsite.com) using machine learning process 122, automation process 10 may utilize ontology data 124 to process the target website. For example, with ontology data 124, automation process 10 may determine that e.g., "Small", as shown on the target website, is a value descriptor of a "Size" attribute descriptor and/or e.g., "On hand", as shown on the target website, is an attribute descriptor indicative of a stock-level. In this manner, ontology data 124 may provide a "dictionary" of descriptors used across the target website and the plurality of websites (e.g., plurality of websites 120).

Accordingly, this ontology data (e.g., ontology data 124) may function as a roadmap that allows for automated navigation of (in this example) the plurality of websites (e.g., plurality of websites 120). Accordingly, machine learning process 122 may use ontology data 124 as training data to "learn" how to navigate these websites (e.g., plurality of websites 120).

Further, automation process 10 may provide 230 target website data (e.g., target website data 126) concerning a target website (e.g., www.targetwebsite.com) to the machine learning process (e.g., machine learning process 122). Accordingly and using plurality of data description models 118 and ontology data 124 as training data, automation process 10 may allow a user (e.g., user 36) to provide 230 target website data (e.g., target website data 126) that identifies a target website (e.g., www.targetwebsite.com) for automated processing by automation process 10.

Accordingly, automation process 10 may process 232 the plurality of data description models (e.g., plurality of data description models 118), ontology data (e.g., ontology data 124) and target website data (e.g., target website data 126) using the machine learning process (e.g., machine learning process 122) to generate a data description model (e.g., target data description model 128) for the target website (e.g., www.targetwebsite.com). For example, automation process 10 may automatically process webpages within www.targetwebsite.com to generate target data description model 128 (in the manner described above).

When processing 232 plurality of data description models 118, ontology data 124, and target website data 126 to generate target data description model 128, machine learning process 122 may identify spatial regions and structure portions of the target website that correspond to the one or more descriptors from plurality of data description models 118. For instance, machine learning process 122 may identify spatial regions and structure portions of the target website that correspond to one or more property descriptors and/or one or more attribute descriptors of plurality of data description models 118. Accordingly, machine learning process 122 may associate 406 one or more structure portions of the website structure of the target website with one or more descriptors to define target data description model 128 based, at least in part, upon plurality of data description models 118, ontology data 124, and target website data 126.

Once generated, target data description model 128 may be included within plurality of data description models 118 and ontology data 124 may be updated to homogenize the descriptors used within target data description model 128; thus enabling plurality of data description models 118 and ontology data 124 to be utilized by automation process 10 to automatically process additional target websites.

As discussed above, automation process 10 may process 208 the specific data description model (e.g., target data description model 128) to obtain useable information from the target website. For example, when processing 208 the specific data description model (e.g., target data description model 128) to obtain useable information from the specific website (e.g., website 100), automation process 10 may process 210 the specific data description model (e.g., target data description model 128) to obtain raw information from the target website; and transform 212 the raw information into the useable information.

As discussed above and once the raw information within target data description model 128 is transformed 212 into useable information, automation process 10 may populate 222 a database (e.g., database 62 or a separate database) with at least a portion of this useable information, where this may be included within and/or associated with data description model 128. Accordingly, useable information 60 may be aggregated with information from other websites stored within a database (i.e., the same database for each website, separate databases for each website, and/or certain databases for particular websites) using the data description models automatically generated by automation process 10 for those websites.

ParaLogue (General):

While the above-discussion concerned automation process 10 processing websites to define data description models (i.e., models concerning data within webpages/websites), automation process 10 may also effectuate similar processes to define function description models (i.e., models concerning functions within webpages/websites; as will be discussed below in greater detail).

Figure 5:
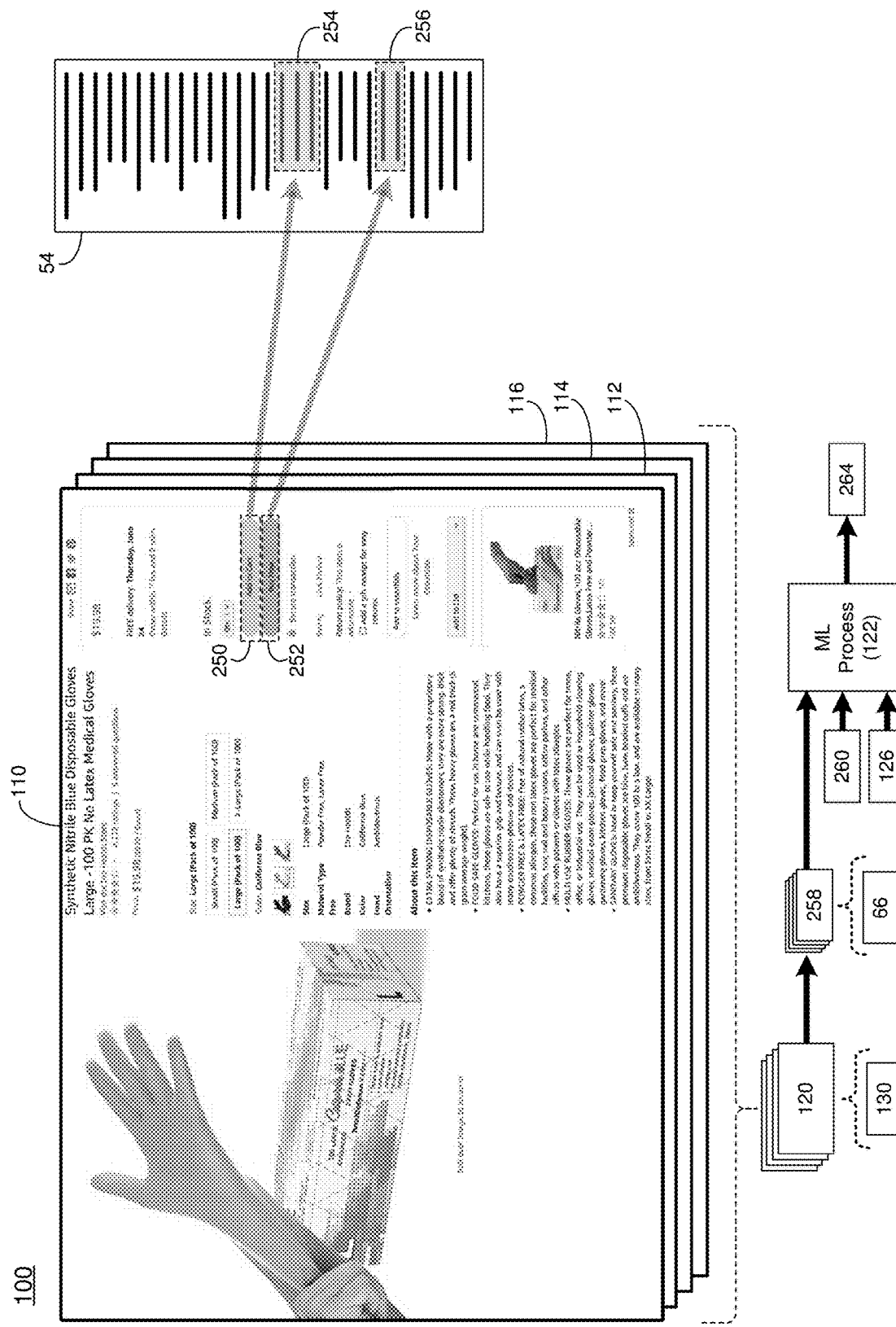
FIG. 5 is another diagrammatic view of a website for processing by the automation process of FIG. 1 according to an embodiment of the present disclosure.
Figure 6:
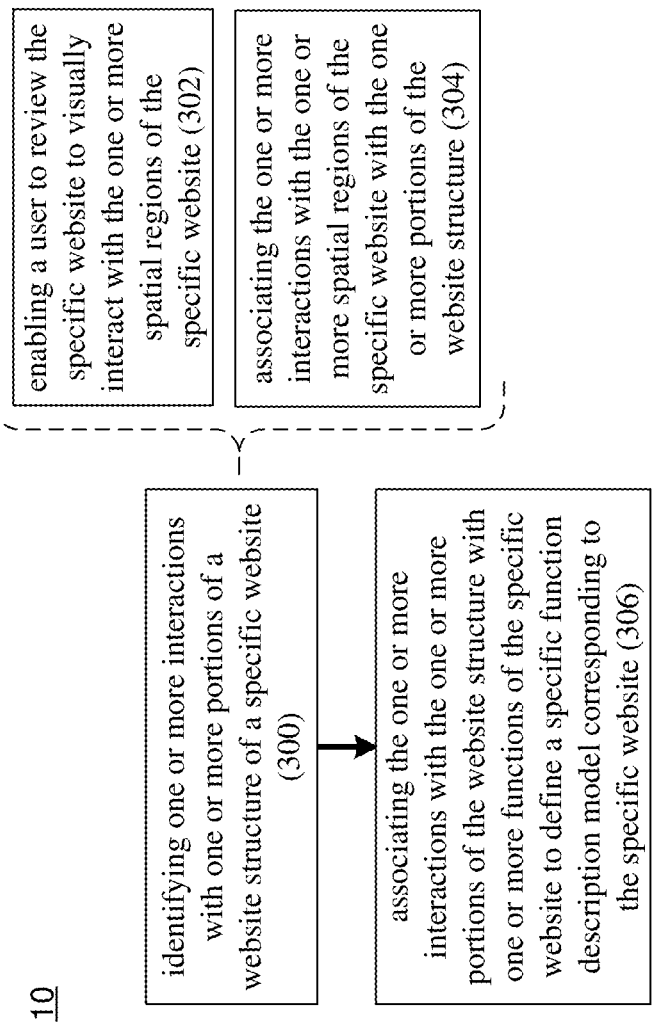
FIG. 6 is another flowchart of the automation process of FIG. 1 according to an embodiment of the present disclosure.

As discussed above, automation process 10 may enable a user (e.g., user 36) to review various websites (e.g., website 100). Referring also to FIGS. 5-6, automation process 10 may identify 300 one or more interactions with one or more portions of a website structure (e.g., website structure 54) of a specific website (e.g., website 100). For example, automation process 10 may identify 300 one or more actions performed on one or more portion of website structure 54 of website 100. As discussed above, examples of such a website structure (e.g., website structure 54) may include one or more of: a HTML website structure; a javascript website structure; and a CSS website structure.

When identifying 300 one or more interactions with one or more portions of a website structure (e.g., website structure 54) of a specific website (e.g., website 100), automation process 10 may: enable 302 a user (e.g., user 36) to review the specific website (e.g., website 100) to visually interact with one or more spatial regions of the specific website (e.g., website 100); and associate 304 one or more interactions with the one or more spatial regions of the specific website (e.g., website 100) with the one or more portions of the website structure (e.g., website structure 54). For example, automation process 10 may enable 302 user 36 to review website 100 to visually interact with spatial regions 250, 252 of website 100 (via selection with a mouse, not shown) and associate 304 the user's interactions with spatial regions 250, 252 of website 100 with structure portions 254, 256 (respectively) of website structure 54. Specifically, when user 36 visually interacts with a spatial region (e.g., one of spatial regions 250, 252) of website 100, automation process 10 may automatically associate 304 the identified interactions or actions performed on the spatial region (e.g., one of spatial regions 250, 252) with the corresponding portion (e.g., one of structure portions 254, 256 respectively) of the website structure (e.g., website structure 54) of the specific website (e.g., website 100).

Automation process 10 may associate 306 the one or more interactions with the one or more portions (e.g., structure portions 254, 256) of the website structure (e.g., website structure 54) with one or more functions (e.g., functions 64) of the specific website (e.g., website 100) to define a specific function description model (e.g., specific function description model 66) corresponding to the specific website (e.g., website 100).

Automation process 10 may provide a user interface or overlay on a web browser as user 36 interacts with website 100. For example, the user interface may be an extension of a web browser, built-into a web browser, and/or may be executed separately from a web browser that provides the ability to access websites. When identifying 300 one or more interactions with one or more portions of website structure 54 of website 100, the domain associated with website 100 may be determined. For example, a user 36 may provide (e.g., using the user interface) an indication or selection of the domain for website 100. In another example, the domain may be automatically defined by automation process 10 when loading website 100. In this example, suppose website 100 is an ecommerce website. Accordingly, website 100 may be associated with the ecommerce domain and automated process 10 may provide (e.g., within the user interface) a list of one or more functions (e.g., functions 64) specific to the ecommerce domain for the user to visually identify within website 100.

Enabling a user to review the specific website (e.g., website 100) to visually interact with the one or more spatial regions of the specific website (e.g., website 100) may include receiving one or more user interaction recordings or logs of one or more user interactions with the website. For example, automation process 10 may receive and process various clickstreams or other activity information indicating how the one or more users interact with the website (e.g., website 100). Automation process 10 may associate 306 the one or more interactions with the one or more portions (e.g., structure portions 254, 256) of the website structure (e.g., website structure 54) as defined in the one or more user interaction recordings with one or more functions (e.g., functions 64) of the specific website (e.g., website 100) to define a specific function description model (e.g., specific function description model 66) corresponding to the specific website (e.g., website 100). For example and as discussed above, automation process 10 may provide a list of one or more functions (e.g., functions 64) for the user to associate with the one or more interactions with the one or more portions (e.g., structure portions 254, 256) of the website structure (e.g., website structure 54) as defined in the one or more user interaction recordings.

The one or more functions (e.g., function 64) may include functionalities that are effectuated via (in this example) website 100. For example, a function (e.g., function 64) may include one or more actions that are performed on a website. Accordingly, function 64 may include any number of discrete actions. Examples of such functionality may include, in an ecommerce domain for example, but are not limited to:

Add to Cart Functionality: This functionality may add an item defined on the current webpage (e.g., webpage 110) to the shopping cart of this user (e.g., user 36), thus allowing the user (e.g., user 36) to continue shopping for additional products/services. This functionality may include specific actions corresponding to a user's interactions with webpage 110. For example, the "Add to Cart" function may include actions or interactions associated with: e.g., navigating to a webpage; clicking a quantity field; typing a quantity input; clicking a button to add the quantity of products to a cart; and/or waiting for the "add to cart" process to complete on webpage 110.

Buy Now Functionality: This functionality may enable the user (e.g., user 36) to immediately purchase the item defined on the current webpage (e.g., webpage 110), thus enabling the user (e.g., user 36) to bypass the shopping cart and make an immediate purchase. This functionality may include specific actions corresponding to a user's interactions with webpage 110 that enable the user to immediately purchase the item defined on the current webpage.

Quantity Selection Functionality: This functionality may enable the user (e.g., user 36) to select the quantity of the item defined on the current webpage (e.g., webpage 110) to be purchased, wherein selecting a quantity greater than one may result in the total cost being recalculated. This functionality may include specific actions corresponding to a user's interactions with webpage 110 that enable the user to select a quantity of items. For example, this function may include actions or interactions associated with: e.g., navigating to a webpage; clicking a quantity field; typing a quantity input; and/or checking for an updated quantity and price.

Associating 306 the interactions with structure portions 254, 256 of website structure 54 with functions 64 of website 100 to define a specific function description model may include defining, using the user interface, functions for structure portions corresponding to the identified spatial regions. For example, automation process 10 may provide, using the user interface, user 36 with the ability to define or select a function for each structure portion corresponding to the user's actions and identified spatial region(s). For example, automation process 10 may associate 306 user 36's interactions with structure portion 254 of website structure 54 with e.g., an "Add to Cart" function and may associate 306 user 36's interactions with structure portion 256 of website structure 54 with e.g., a "Buy Now" function. In this manner, automation process 10 may define or generate the specific function description model for website 100 by associating or mapping particular specific structure portions of the website structure with one or more functions of the function description model corresponding to website 100.

The specific function description model (e.g., specific function description model 66) corresponding to the specific website (e.g., website 100) may be configured to allow for the above-described automated accessing of (in this example) website 100. For example and as discussed above, since specific function description model 66 locates the various function-related portions (e.g., structure portions 254, 256) within the website structure (e.g., website structure 54) of the specific website (e.g., website 100), the specific website (e.g., website 100) may be accessed and utilized in an automated fashion (since specific function description model 66 eliminates the need for a human being to visually-navigate website 100). In this manner and with the specific function description model, automation process 10 may generate machine-readable or machine-executable application programming interfaces (APIs) directly from the above-described association of portions of website structure with one or more functions.

The specific function description model may be both machine-interpretable and human-interpretable. For example, with specific function description model 66 corresponding to website 100, automation process 10 may generate one or more machine-executable scripts capable of performing the one or more functions described above for website 100. In this manner, specific function description model 60 is machine interpretable. Additionally, with specific function description model 66 corresponding to website 100, automation process 10 may generate one or more natural language descriptions of the one or more functions described above. For example, automation process 10 may process specific function description model 66 corresponding to website 100 with one or more predefined translation rules to generate a natural language description of the one or more functions defined by specific function description model 66. For example, automation process 10 may use a translator (e.g., translator 71) to: translate the functions of the function description model to a natural language description; and to translate a natural language description of a function description model to a function description model. In this manner, a user (e.g., user 36) can interpret what functions that specific function description model 66 is capable of performing on website 100 and a machine can interpret a natural language description of a function for performing on website 100.

As discussed above, automation process 10 may identify 200 one or more portions of a website structure (e.g., website structure 54) of a specific website (e.g., website 100) and associate 206 the one or more portions (e.g., structure portions 106, 108) of the website structure (e.g., website structure 54) with one or more descriptors (e.g., descriptors 56) of the specific website (e.g., website 100) to define a specific data description model (e.g., specific data description model 58) corresponding to the specific website (e.g., website 100). When identifying 200 the one or more portions of the website structure of a specific website, the one or more portions (e.g., structure portions 106, 108) of website structure (e.g., website structure 54) may be generated or exposed in response to a user's interactions with the website (e.g., website 100). For example and as is known in the art, some websites may include portions of website structure or code that are generated dynamically as a user interacts with the website. Accordingly, automation process 10 may associate 306 the user's recorded interactions that generate the additional website structure (e.g., structure portions 106, 108) with one or more functions (e.g., functions 64) of the specific website (e.g., website 100). In this manner, specific function description model 66 may locate the various function-related portions within the website structure of the specific website (e.g., website 100) that generate or expose additional website structure. With a specific function description model that describes how to generate the additional website structure, the dynamically generated or dynamically accessible portions of the website may be identified and utilized in an automated fashion (since specific function description model 66 eliminates the need for a human being to visually-navigate website 100).

Once the user (e.g., user 36) and automation process 10 processes (in this example) webpage 110 of website 100, the user (e.g., user 36) and automation process 10 may process (in this example) additional webpages (e.g., webpages 112, 114, 116) of website 100 to obtain additional functions for inclusion within (and further refinement of) function description model 66. For example, automation process 10 may enable 302 user 36 to review additional webpages (e.g., webpages 112, 114, 116) of website 100 to visually interact with one or more spatial regions of these webpages (e.g., webpages 112, 114, 116) and associate 304 these interactions with the spatial regions with one or more portions of the website structure (e.g., website structure 54) to obtain additional functions for inclusion within (and further refinement of) the specific function description model (e.g., specific function description model 66) corresponding to the specific website (e.g., website 100).

Once a sufficient quantity of webpages (e.g., webpages 110, 112, 114, 116) of website 100 are processed (e.g., ten or more), automation process 10 may process the specific function description model (e.g., specific function description model 66) to obtain useable information from the specific website (e.g., website 100). For example and when processing the specific function description model (e.g., specific function description model 66) to obtain useable information from the specific website (e.g., website 100), automation process 10 may process the specific function description model (e.g., specific function description model 66) to obtain raw information from the specific website (e.g., website 100) and transform this raw information into useable information.

In another example, automation process 10 may process the specific function description model (e.g., specific function description model 66) to perform particular functions on the specific website (e.g., website 100). For example, suppose the specific function description model (e.g., specific function description model 66) includes e.g., adding a product to a shopping cart. In this example, automation process 10 may process specific function description model 66 to perform the one or more actions associated with the "Add to Cart" function (e.g., function 64). In this example, automation process 10 may perform the actions specified in the "Add to Cart" function to e.g., navigate to a webpage; click on a quantity field; type in a quantity input; click on a button to add the quantity of products to a shopping cart; and waiting for the products to be added to the shopping cart. As will discussed in greater detail below, with function description model 66 defined for website 100, automation process 10 may automatically perform various functions on website 100 without requiring human intervention.

As discussed above, automation process 10 may associate 306 the one or more interactions (e.g., user's 36 interactions on website 100) with the one or more portions (e.g., structure portions 254, 256) of the website structure (e.g., website structure 54) with one or more functions (e.g., functions 64) of the specific website (e.g., website 100) to define a specific function description model (e.g., specific function description model 66) corresponding to the specific website (e.g., website 100), wherein these functions (e.g., functions 64) may include functionalities that are effectuated via (in this example) website 100. As could be imagined, it is foreseeable that different webpages within a website may use different functions (e.g., functions 64). For example, some webpages within website 100 may use "Add to Cart" functionality, while other webpages within website 100 may use "Place in Cart" functionality. Further, some webpages within website 100 may use "Buy Now" functionality, while other webpages within website 100 may use "Check Out" functionality.

In order to properly utilize such functionality (e.g., functions 64), automation process 10 may process these functions to transform them from raw information (e.g., functions 64 in their original disjointed form) into useable information 68 (as will be described below). When transforming the raw information (e.g., functions 64) into useable information 68, automation process 10 may: amend/normalize/homogenize the raw information (e.g., functions 64). Specifically, since it is foreseeable that different webpages within a website (e.g., website 100) may use functions that are formatted differently, automation process 10 may amend/normalize/homogenize such raw information (e.g., functions 64) to standardize the formatting.

Once the raw information (e.g., the above-described functions 64 in their original disjointed form) within function description model 66 are transformed into useable information (i.e., useable information 68), automation process 10 may populate a database (e.g., database 70) with at least a portion of this useable information (i.e., useable information 68), wherein database 70 may be included within and/or associated with function description model 66. Useable information 68 stored within database 70 may (generally speaking) function as a roadmap that allows for automated navigation of (in this example) website 100.

Continuing with the above-stated example, automation process 10 may utilize function description model 66 and useable information 68 to process additional webpages within website 100. As could be imagined, a website (especially an ecommerce website) may include hundreds of thousands of webpages that correspond to the hundreds of thousands of products they sell. Accordingly, automation process 10 may allow a user to manually identify 300 one or more portions of a website structure (e.g., website structure 54) of a specific website (e.g., website 100) to define specific function description model 66 (albeit it in a rudimentary form). Automation process 10 may then use specific function description model 66 to automatically process (in the fashion described above) the remaining webpages within website 100 to further refine specific function description model 66.

Figure 7:
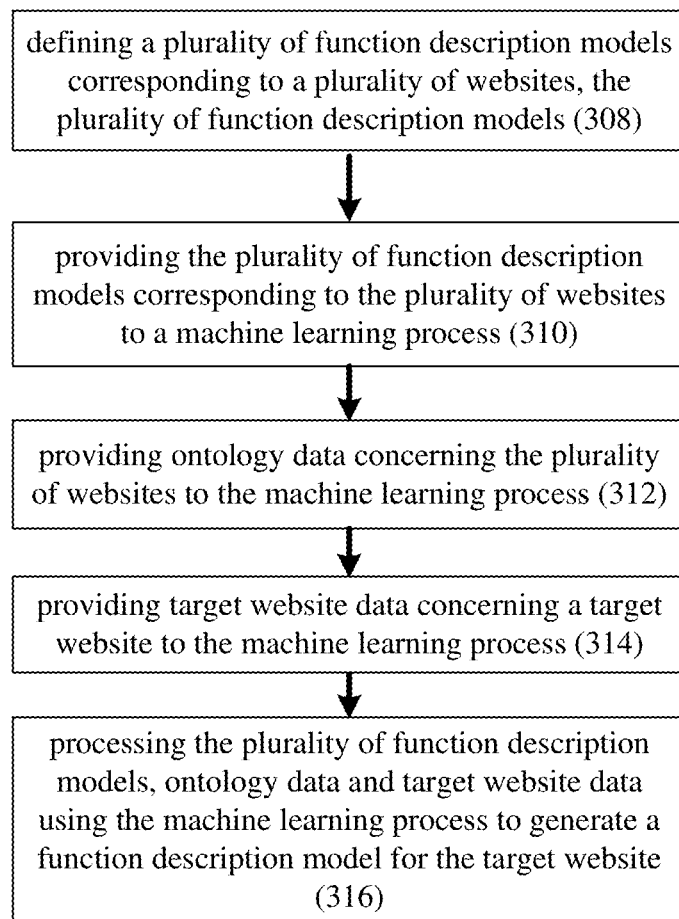
FIG. 7 is another flowchart of the automation process of FIG. 1 according to an embodiment of the present disclosure.

ParaLogue (Function Models Generating Function Models):

Referring also to FIG. 7 and once specific function description model 66 is completely defined (e.g., all of the webpages of website 100 have been processed), automation process 10 may define 308 a plurality of function description models (e.g., plurality of function description models 258) corresponding to a plurality of websites (e.g., plurality of websites 120), the plurality of function description models (e.g., plurality of function description models 258) including: the specific function description model (e.g., specific function description model 66) corresponding to the specific website (e.g., specific website 100), and one or more additional function description models corresponding to one or more additional websites.

Automation process 10 may provide 310 the plurality of function description models (e.g., plurality of function description models 258) corresponding to the plurality of websites (e.g., plurality of websites 120) to a machine learning (ML) process (e.g., machine learning process 122).

As discussed above, function description models locate the various function-related portions within a website structure of a website, thus eliminating the need for a human being to visually-navigate a website. Accordingly, machine learning process 122 may use the plurality of function description models (e.g., plurality of function description models 258) corresponding to the plurality of websites (e.g., plurality of websites 120) as training data to "learn" how to navigate other websites.

Additionally, automation process 10 may provide 312 ontology data (e.g., ontology data 260) concerning the plurality of websites (e.g., plurality of websites 120) to the machine learning process (e.g., machine learning process 122).

As discussed above, being different webpages within a website use different functions (e.g., functions 64), in order to properly utilize such functions (e.g., functions 64), automation process 10 processes these functions to transform them from raw information (e.g., functions 64 in their original disjointed form) into useable information 68 (in a normalized/homogenized form). As could be imagined, it is foreseeable that different websites may use different functions (e.g., functions 64) within their webpages. For example, a first website (www.abc.com) may define the function "Buy Now", while another website (www.xyz.com) may define the function "Check Out". Additionally, different websites may define functions with different sequences of actions. For example, one website (www.abc.com) may define a function for entering quantity information with a text box that can receive text while another website (www.xyz.com) may define the function for entering quantity information with a drop-down list with multiple values where selection of a value, inputs the value into a text field. Therefore and in order to properly utilize such functions (e.g., functions 64) across multiple websites (e.g., www.abc.com & www.xyz.com), automation process 10 may process these functions to transform them from their original disjointed form into useable (e.g., normalized/homogenized) information (e.g., ontology data 260). Accordingly and when generating ontology data 260, automation process 10 may process the useable information included within each of the plurality of function description models (e.g., plurality of function description models 258) to amend/normalize/homogenize this useable information across the plurality of websites (e.g., plurality of websites 120).

In a similar fashion, this ontology data (e.g., ontology data 260) may function as a roadmap that allows for automated navigation of (in this example) the plurality of websites (e.g., plurality of websites 120). Accordingly, machine learning process 122 may use ontology data 260 as training data to "learn" how to navigate these websites (e.g., plurality of websites 120).

Automation process 10 may also provide website data (e.g., website data 130) concerning the plurality of websites (e.g., plurality of websites 120) to the machine learning process (e.g., machine learning process 122). An example of website data 130 may include, but is not limited to, website usage data describing one or more user interactions with the plurality of websites. For example, website usage data may include one or more user interaction recordings or logs of one or more user interactions with plurality of websites 120. For example and as discussed above, website usage data may include various clickstreams or other activity information indicating how the one or more users interact with plurality of websites 120. Accordingly, automation process 10 may allow a user (e.g., user 36) to provide website data (e.g., website data 130) concerning plurality of websites 120 for automated processing of other websites by automation process 10.

Returning to the above example, suppose plurality of websites 120 includes one website (www.abc.com) that provides e.g., a text box that can receive text. As discussed above, while a user interacts with the text box on the website, automation process 10 may associate 306 the user's various interactions with the text box (e.g., click: text box, type: <quantity input>) with a text box interaction function.

On a different website (www.xyz.com), suppose that the website provides e.g., a drop-down list with values "1", "2", "3", "4", and "5+." Suppose the user selects (e.g., by clicking) the value "5+", the website creates a text input field. Accordingly, automation process 10 may associate 306 the user's various interactions with the drop-down list that creates a text input field (e.g., click: quantity_dropdown, click: quantity 5_plus, click: quantity_box, type: <quantity input>) with a text box interaction function. Accordingly, automation process 10 may provide website data (e.g., website data 130) concerning the plurality of websites (e.g., plurality of websites 120) to the machine learning process (e.g., machine learning process 122) for automated processing of other websites by automation process 10.

Further, automation process 10 may provide 314 target website data (e.g., target website data 126) concerning a target website (e.g., www.targetwebsite.com) to the machine learning process (e.g., machine learning process 122). An example of target website data 126 may include, but is not limited to, target website usage data describing one or more user interactions with the target website. For example, target website usage data may include one or more user interaction recordings or logs of one or more user interactions with the target website. For example and as discussed above, target website usage data may include various clickstreams or other activity information indicating how the one or more users interact with the target website. Accordingly and using plurality of function description models 258 and ontology data 260 as training data, automation process 10 may allow a user (e.g., user 36) to provide 314 target website data (e.g., target website data 126) concerning a target website (e.g., www.targetwebsite.com) for automated processing by automation process 10.

Accordingly, automation process 10 may process 316 the plurality of function description models (e.g., plurality of function description models 258), ontology data (e.g., ontology data 260) and target website data (e.g., target website data 126) using the machine learning process (e.g., machine learning process 122) to generate a function description model (e.g., target function description model 264) for the target website (e.g., www.targetwebsite.com). For example, automation process 10 may automatically process webpages within www.targetwebsite.com to generate target function description model 264 (in the manner described above). Once generated, target function description model 264 may be included within plurality of function description models 258 and ontology data 260 may be updated to homogenize the functions used within target function description model 264; thus enabling plurality of function description models 258 and ontology data 260 to be utilized by automation process 10 to automatically process additional target websites.

ParaFlow:

As discussed above, through the use of a data description model (e.g., data description model 58) and a function description model (e.g., function description model 66), a website (e.g., website 100) may be navigated without human intervention. Specifically and as discussed above, a data description model (e.g., data description model 58) may define the data defined within a website (e.g., website 100), while a function description model (e.g., function description model 66) may define the functions available via the website (e.g., website 100).

Figure 8:
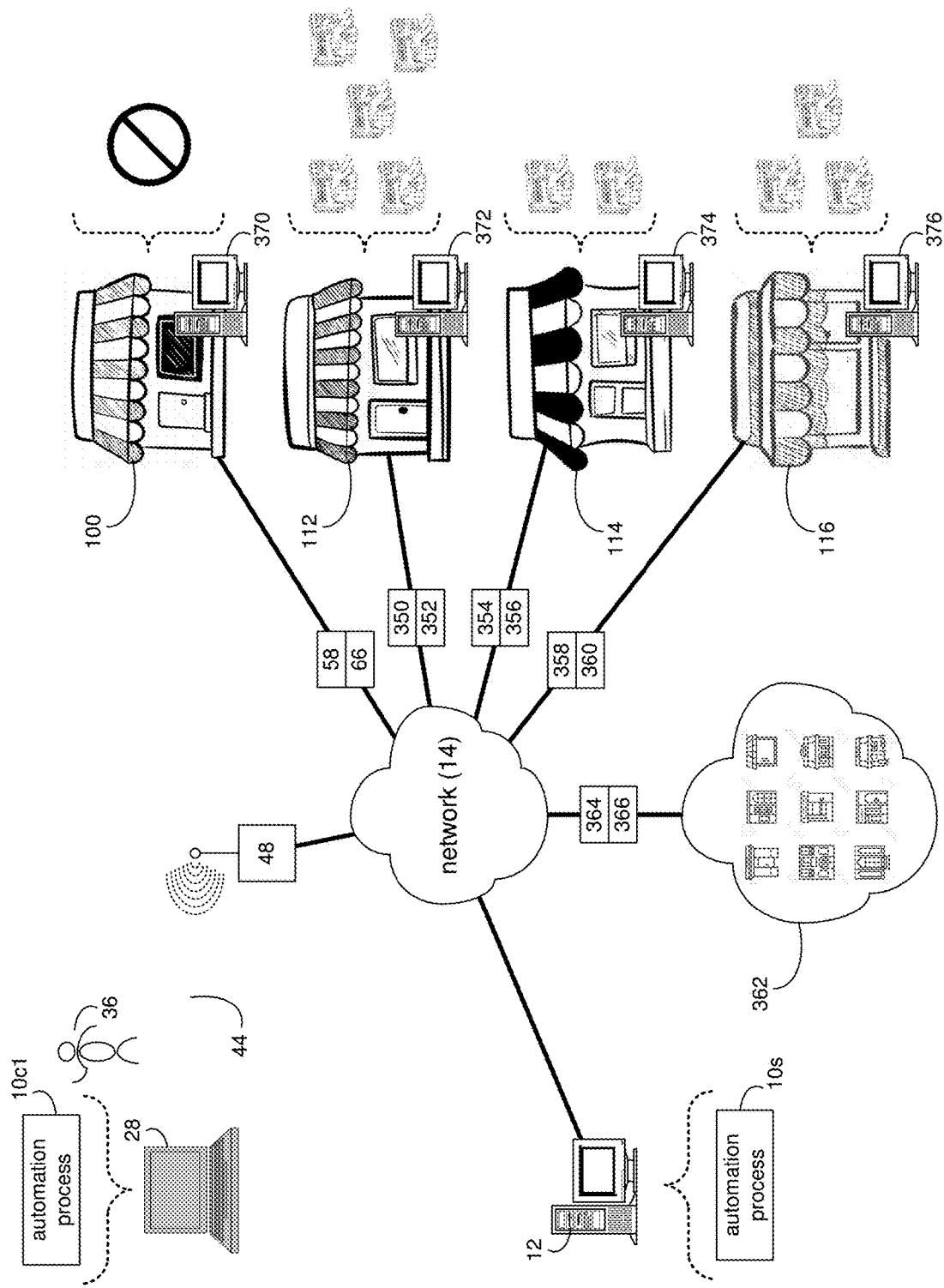
FIG. 8 is a diagrammatic view of a plurality of websites for processing by the automation process of FIG. 1 according to an embodiment of the present disclosure.

Referring also to FIG. 8, automation process 10 may be capable of navigating and/or effectuating the functionality of a plurality of websites through the use of such data description models and function description models. For the following example, assume that:

- Since data description model 58 and function description model 66 were defined for website 100, automation process 10 may navigate and/or effectuate the functionality of website 100. Accordingly and in the event that website 100 is an ecommerce website, automation process 10 may e.g., access website 100, locate one or more products/services available via website 100, and effectuate the purchase of the same.
- Since data description model 350 and function description model 352 were defined for website 112, automation process 10 may navigate and/or effectuate the functionality of website 112. Accordingly and in the event that website 112 is an ecommerce website, automation process 10 may e.g., access website 112, locate one or more products/services available via website 112, and effectuate the purchase of the same.
- Since data description model 354 and function description model 356 were defined for website 114, automation process 10 may navigate and/or effectuate the functionality of website 114. Accordingly and in the event that website 114 is an ecommerce website, automation process 10 may e.g., access website 114, locate one or more products/services available via website 114, and effectuate the purchase of the same.
- Since data description model 358 and function description model 360 were defined for website 116, automation process 10 may navigate and/or effectuate the functionality of website 116. Accordingly and in the event that website 116 is an ecommerce website, automation process 10 may e.g., access website 116, locate one or more products/services available via website 116, and effectuate the purchase of the same.

While in this example, automation process 10 is shown to be capable of navigating and/or effectuating the functionality of four websites (e.g., websites 100, 112, 114, 116), this is for illustrative purposes only and is not intended to be a limitation of this disclosure, as other configurations are possible and are considered to be within the scope of this disclosure. For example, automation process 10 may be capable of navigating and/or effectuating the functionality of many additional websites (e.g., additional websites 362) provided the appropriate data description model(s) (e.g., data description model 364) and a function description model(s) (e.g., function description model 366) are defined.

Figure 9:
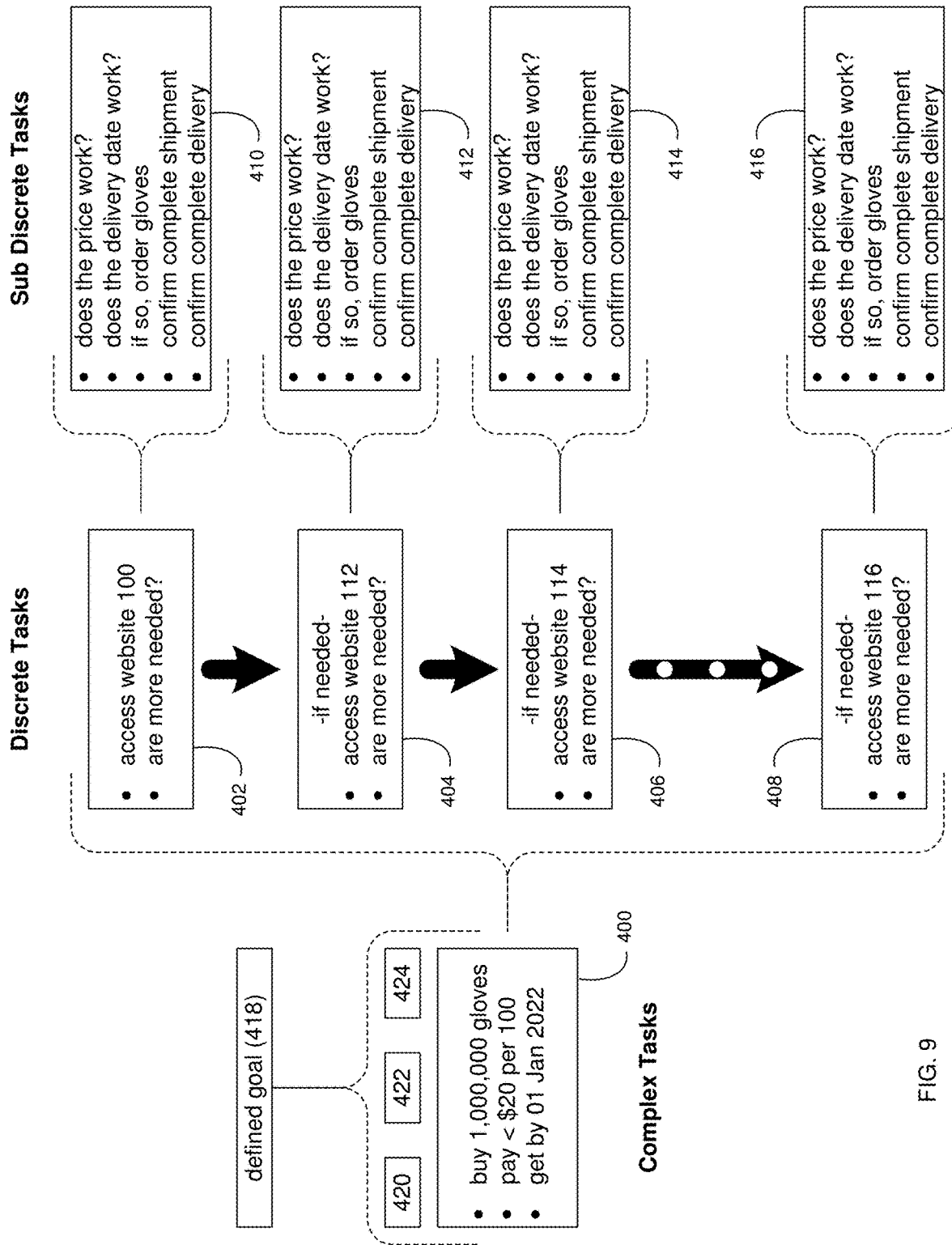
FIG. 9 is a diagrammatic view of a complex task for processing by the automation process of FIG. 1 according to an embodiment of the present disclosure.

Referring also to FIG. 9, automation process 10 may be configured to process complex tasks (e.g., complex task 400). Complex task 400 may include a plurality of discrete tasks, such as discrete tasks 402, 404, 406, 408, wherein each of these discrete tasks (e.g., discrete tasks 402, 404, 406, 408) may include a plurality of sub-discrete tasks. For example: discrete task 402 may include sub-discrete tasks 410; discrete task 404 may include sub-discrete tasks 412; discrete task 406 may include sub-discrete tasks 414; and discrete task 408 may include sub-discrete tasks 416. Each of these sub-discrete tasks (e.g., sub-discrete tasks 410, 412, 414, 416) may define discrete requirements for the related subtask that concern e.g., price, delivery data, tracking of shipping and tracking of delivery.

Generally speaking, a complex task (e.g., complex task 400) may be a task that is traditionally executed across multiple websites (e.g., websites 100, 112, 114, 116). For example, complex task 400 may be the task of planning a vacation that includes multiple subtasks, such as: arranging air travel to a destination, booking a hotel at the destination, arranging car travel from a destination airport to the hotel, arranging car travel from the hotel to the destination airport, and arranging air travel from the destination. Additionally, a complex task (e.g., complex task 400) may be a task that is traditionally executed on a single website (e.g., website 100), but ends up being executed across one or more additional websites (e.g., websites 112, 114, 116) due to the scope of the complex task (e.g., complex task 400). Complex task 400 may be user-defined (e.g., by user 36) or automatically generated (e.g., by a machine). For example, automation process 10 may provide a user interface for a user to provide complex task 400. Additionally, complex task 400 may be defined by one or more computing devices. In this manner, it will be appreciated that complex task 400 may be received from various sources.

For example, assume that a user (e.g., user 42) wishes to purchase 1,000,000 pair of surgical gloves, wherein the purchase price of these surgical gloves must be less than $20 per hundred pair. Additionally, these surgical gloves need to be received by 1 Jan. 2022.

This complex task (e.g., complex task 400) may be a portion of an overarching defined goal (e.g., define goal 418), wherein defined goal 418 may include a plurality of complex tasks (e.g., complex tasks 400, 420, 422, 424). For example, defined goal 418 may be the outfitting of a new hospital in West Virginia, wherein complex task 400 may be configured to obtain surgical gloves, complex task 420 may be configured to obtain syringes, complex task 422 may be configured to obtain pharmaceuticals, and complex task 424 may be configured to obtain surgical instruments/supplies.

Figure 10:
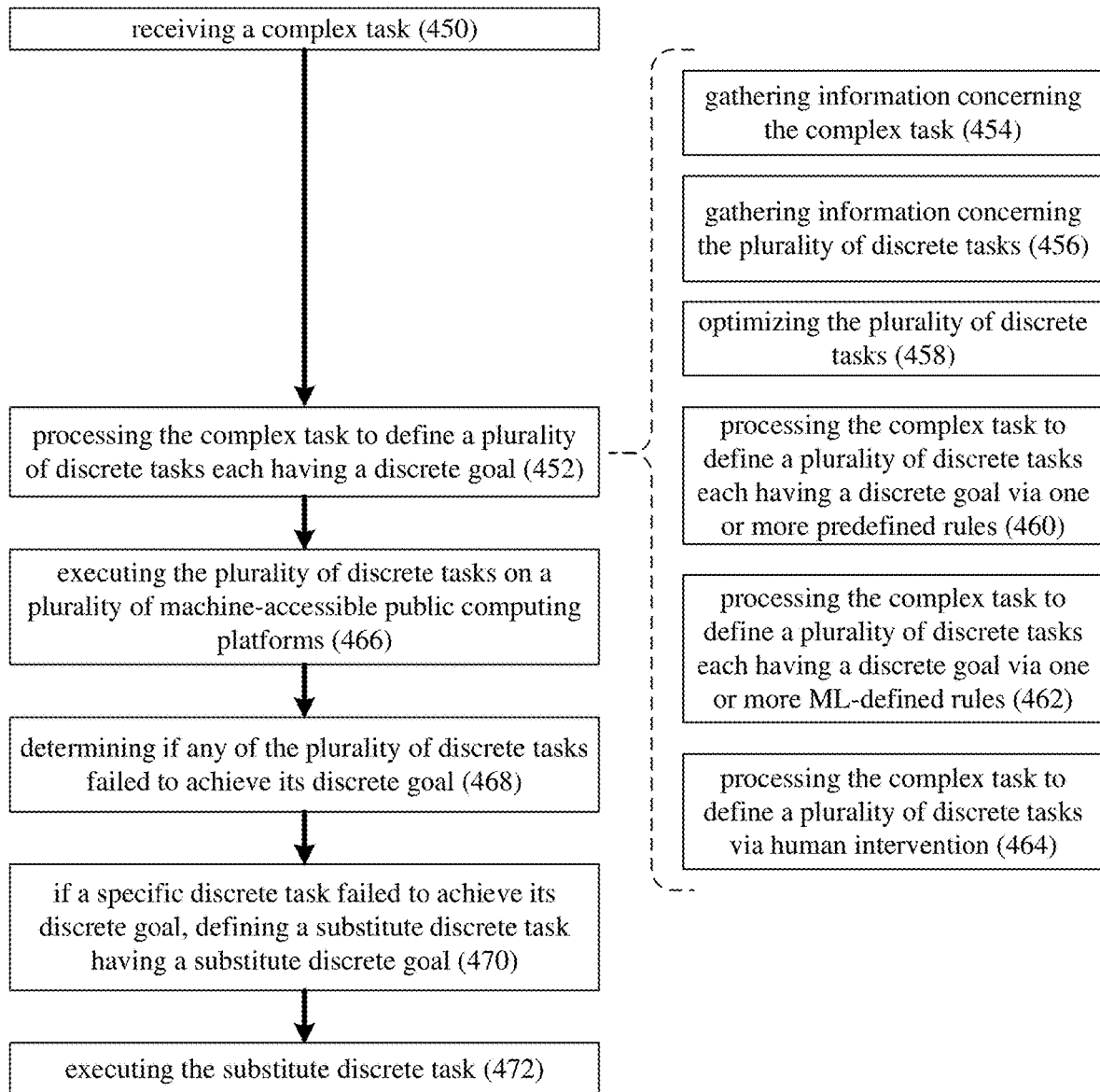
FIG. 10 is another flowchart of the automation process of FIG. 1 according to an embodiment of the present disclosure.

Referring also to FIG. 10, automation process 10 may receive 450 a complex task (e.g., complex task 400). As discussed above, the complex task (e.g., complex task 400) in this illustrative example concerns the purchase of 1,000,000 pair of surgical gloves that need to be received by 1 Jan. 2022 and must cost less than $20 per hundred pair. Automation process 10 may process 452 the complex task (e.g., complex task 400) to define a plurality of discrete tasks (e.g., discrete tasks 402, 404, 406, 408) each having a discrete goal. In this example, the plurality of discrete tasks (e.g., discrete tasks 402, 404, 406, 408) concern the purchasing of the same product from multiple websites, wherein additional surgical gloves are purchased from additional websites until a total of 1,000,000 pair of surgical gloves are purchased. However, it is understood that the plurality of discrete tasks (e.g., discrete tasks 402, 404, 406, 408) may concern the purchasing of different products/services from different websites (e.g., purchasing air travel from an airline website and purchasing hotel lodging from a hotel website).

The plurality of discrete tasks may be formed from one or more functions defined in one or more function description models as described above. Returning to the above example, discrete tasks 402, 404, 406, 408 may be formed from one or more functions of respective function description models (e.g., function description models 66, 352, 356, 360) defined for various websites (e.g., websites 100, 112, 114, 116). Automation process 10 may utilize a predefined label associated with a function to form the plurality of discrete tasks. For example, suppose one or more functions are labeled as e.g., "Add product to Cart". In this example, automation process 10 may process the label for the function to define which functions are capable of performing discrete tasks 402, 404, 406, 408. Accordingly, when processing 452 complex task 400 to define plurality of discrete tasks 402, 404, 406, 408, automation process 10 may identify one or more functions from function description models 66, 352, 356, 360 defined for websites 100, 112, 114, 116 that perform at least a portion of complex task 400.

Additionally, automation process 10 may form the plurality of discrete tasks from one or more application programming interfaces (APIs) predefined for one or more websites. For example, automation process 10 may have access to one or more APIs predefined for a respective website (e.g., websites 100, 112, 114, 116) and may define discrete tasks 402, 404, 406, 408 using the one or more APIs. Accordingly, automation process 10 may form the plurality of discrete tasks from any combination of one or more functions from one or more function description models defined for one or more websites, and one or more application programming interfaces (APIs) predefined for the one or more websites.

Concerning the plurality of discrete tasks (e.g., discrete tasks 402, 404, 406, 408) included within complex task 400, these discrete tasks 402, 404, 406, 408 (and their related discrete goals) may be conditional in nature and may generally mimic that of a workflow. Generally speaking:

Discrete task 402 may concern accessing website 100 to purchase surgical gloves, wherein the discrete goal of discrete task 402 is the purchase 1,000,000 pair of surgical gloves that need to be received by 1 Jan. 2022 and must cost less than $20 per hundred pair.

Discrete task 404 may be conditional in nature. Specifically, if 1,000,000 pair of surgical gloves were already obtained, discrete task 404 may not be needed. However and assuming that it is needed, discrete task 404 may concern accessing website 112 to purchase surgical gloves, wherein the discrete goal of discrete task 404 is the purchase of whatever surgical gloves are still needed to satisfy complex task 400 (i.e., the purchase of 1,000,000 pair of surgical gloves that need to be received by 1 Jan. 2022 and must cost less than $20 per hundred pair).

Discrete task 406 may be conditional in nature. Specifically, if 1,000,000 pair of surgical gloves were already obtained, discrete task 406 may not be needed. However and assuming that it is needed, discrete task 406 may concern accessing website 114 to purchase surgical gloves, wherein the discrete goal of discrete task 406 is the purchase of whatever surgical gloves are still needed to satisfy complex task 400 (i.e., the purchase of 1,000,000 pair of surgical gloves that need to be received by 1 Jan. 2022 and must cost less than $20 per hundred pair).

Discrete task 408 may be conditional in nature. Specifically, if 1,000,000 pair of surgical gloves were already obtained, discrete task 408 may not be needed. However and assuming that it is needed, discrete task 408 may concern accessing website 116 to purchase surgical gloves, wherein the discrete goal of discrete task 408 is the purchase of whatever surgical gloves are still needed to satisfy complex task 400 (i.e., the purchase of 1,000,000 pair of surgical gloves that need to be received by 1 Jan. 2022 and must cost less than $20 per hundred pair).

While four discrete tasks (e.g., discrete tasks 402, 404, 406, 408) are shown, this is for illustrative purposes only and is not intended to be a limitation of this disclosure, as it is understood that the quantity of discrete tasks (e.g., discrete tasks 402, 404, 406, 408) may be increased or decreased as needed.

When processing 452 the complex task (e.g., complex task 400) to define a plurality of discrete tasks (e.g., discrete tasks 402, 404, 406, 408) each having a discrete goal, automation process 10 may gather 454 information concerning the complex task (e.g., complex task 400). As stated above, complex task 400 defines a maximum purchase price of $20 per hundred pair and a delivery date of no later than 1 Jan. 2022. Accordingly, automation process 10 may inquire from an actor (e.g., a user and/or a machine) as to whether there are any additional task-based restrictions/requirements (e.g., country of manufacture, sustainability, material, color, packaging) to gather 454 information concerning the complex task (e.g., complex task 400). Additionally, while the four discrete tasks (e.g., discrete tasks 402, 404, 406, 408) are described as sequentially executed task, it will be appreciated that discrete tasks may be executed in parallel and/or based, at least in part, upon various conditions or information concerning the complex task and/or concerning the plurality of discrete tasks. Continuing with the above example, discrete tasks 402, 404, 406, 408 may execute in parallel with each task checking the availability and/or price of surgical gloves required by complex task 400 on each respective website. Automation process 10 may determine which discrete task to execute to purchase the surgical gloves based, at least in part, upon the availability and/or price information gathered from the plurality of websites.

In addition, gathering 454 information concerning the complex task (e.g., complex task 400) may include executing a description model (e.g., data description model 58 and/or function description model 66) on one or more websites. As discussed above and once fully defined, data description model 58 and/or function description model 66 may enable automation process 10 to autonomously navigate and/or effectuate the functionality of e.g., website 100 without any human intervention, as data description model 58 and/or function description model 66 may (generally speaking) function as a roadmap that allows for automated navigation of (in this example) website 100. Additionally, automation process 10 may execute data description model 58 and/or function description model 66 to populate one or more databases with at least a portion of data from a website. Accordingly, automation process 10 may execute data description model 58 and/or function description model 66 on one or more websites based, at least in part, upon the complex task (e.g., complex task 400). For example, automation process 10 may execute data description model 58 and/or function description model 66 on one or more websites to e.g., determine a product price and/or product availability from the one or more websites based, at least in part, upon the complex task.

Further and when processing 452 the complex task (e.g., complex task 400) to define a plurality of discrete tasks (e.g., discrete tasks 402, 404, 406, 408) each having a discrete goal, automation process 10 may gather 456 information concerning the plurality of discrete tasks (e.g., discrete tasks 402, 404, 406, 408). For example, automation process 10 may inquire from an actor (e.g., a user and/or a machine) as to whether there are subtask-based restrictions/requirements (e.g., prohibited websites, minimum shipment size, shipper location) to gather 456 information concerning the plurality of discrete tasks (e.g., discrete tasks 402, 404, 406, 408).

When processing 452 the complex task (e.g., complex task 400) to define a plurality of discrete tasks (e.g., discrete tasks 402, 404, 406, 408) each having a discrete goal, automation process 10 may optimize 458 the plurality of discrete tasks (e.g., discrete tasks 402, 404, 406, 408). For example, suppose that several complex tasks (e.g., complex tasks 400, 420) within defined goal 418 are simultaneously being processed by automation process 10, wherein website 100 is providing products in each of these complex tasks (e.g., surgical gloves for complex task 400 and syringes for complex task 420). Accordingly and to optimize 458 the plurality of discrete tasks (e.g., discrete tasks 402, 404, 406, 408), automation process 10 may combine these two orders (e.g., surgical gloves and syringes) to e.g., save on transportation costs.

When processing 452 the complex task (e.g., complex task 400) to define a plurality of discrete tasks (e.g., discrete tasks 402, 404, 406, 408) each having a discrete goal, automation process 10 may perform one or more of the following operations:

Process 460 the complex task (e.g., complex task 400) to define a plurality of discrete tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 460 the complex task (e.g., complex task 400) to define a plurality of discrete tasks (e.g., discrete tasks 402, 404, 406, 408).

Process 462 the complex task (e.g., complex task 400) to define a plurality of discrete tasks (e.g., discrete tasks 402, 404, 406, 408) each having a discrete goal via one or more ML-defined rules. For example, as orders are processed by automation process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 462 the complex task (e.g., complex task 400) to define a plurality of discrete tasks (e.g., discrete tasks 402, 404, 406, 408).

Process 464 the complex task (e.g., complex task 400) to define a plurality of discrete tasks (e.g., discrete tasks 402, 404, 406, 408) based, at least in part, upon human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 464 the complex task (e.g., complex task 400) to define a plurality of discrete tasks (e.g., discrete tasks 402, 404, 406, 408). Defining a plurality of discrete tasks (e.g., discrete tasks 402, 404, 406, 408) based, at least in part, upon human intervention may include determining that the one or more functions defined for the plurality of function description models for the plurality of websites are unable to perform one of the discrete tasks. Accordingly, automation process 10 may provide a request for human intervention for input regarding the discrete task. For example, automation process 10 may provide a request (e.g., using various communication applications) to a human (e.g., user 42) to perform a particular function on the website to supplement the function description model for that website. In this manner, automation process 10 may identify missing functionality in one or more function description models and may associate user interactions with missing functions to define or update a function description model for the website. In addition to performing functions of a website, automation process 10 may request that a human perform certain tasks that a machine cannot perform (e.g., prepare an electronic signature). In this manner, a machine and a human may collaborate to define and/or accomplish the plurality of discrete tasks of the complex task.

Once defined, automation process 10 may execute 466 the plurality of discrete tasks (e.g., discrete tasks 402, 404, 406, 408) on a plurality of machine-accessible public computing platforms (e.g., machine-accessible public computing platforms 370, 372, 374, 376), wherein examples of this plurality of machine-accessible public computing platforms (e.g., machine-accessible public computing platforms 370, 372, 374, 376) may include but is not limited to a plurality of ecommerce computing platforms coupled to the internet.

As discussed above, a data description model (e.g., data description model 58, 350, 354, 358) may be defined for at least one of the plurality of machine-accessible public computing platforms (e.g., machine-accessible public computing platforms 370, 372, 374, 376) and a function description model (e.g., function description model 66, 352, 356, 360) may be defined for at least one of the plurality of machine-accessible public computing platforms (e.g., machine-accessible public computing platforms 370, 372, 374, 376); wherein automation process 10 may navigate and/or effectuate the functionality of e.g., websites 100, 112, 114, 116 through the use of such data description models (e.g., data description models 58, 350, 354, 358) and function description models (e.g., function description models 66, 352, 356, 360). Accordingly, automation process 10 may execute the plurality of discrete tasks on a plurality of machine-accessible public computing platforms by executing the plurality of discrete tasks using a data description model (e.g., data description model 58, 350, 354, 358) and/or a function description model (e.g., function description model 66, 352, 356, 360) defined for the plurality of machine-accessible public computing platforms (e.g., machine-accessible public computing platforms 370, 372, 374, 376).

As discussed above, some of the discrete tasks (e.g., discrete tasks 404, 406, 408) may be conditional in nature and, therefore, may not be needed. For example, if the 1,000,000 pair of surgical gloves were obtained from website 100, discrete tasks 404, 406, 408 may not be needed. Additionally, if the 1,000,000 pair of surgical gloves were obtained from websites 100, 112 (cumulatively), discrete tasks 406, 408 may not be needed. Further, if the 1,000,000 pair of surgical gloves were obtained from websites 100, 112, 114 (cumulatively), discrete task 408 may not be needed. Accordingly, automation process 10 may monitor the discrete and cumulative progress of discrete tasks (e.g., discrete tasks 402, 404, 406, 408) to ensure that the complex task (e.g., complex task 400) is successfully effectuated.

Automation process 10 may determine 468 if any of the plurality of discrete tasks (e.g., discrete tasks 402, 404, 406, 408) failed to achieve its discrete goal, wherein "failing to achieve its discrete goal" may include one or more of:

An immediate total failure of the discrete goal: For example, if automation process 10 accesses website 100 to purchase the 1,000,000 pair of surgical gloves . . . only to find out that website 100 does not have any surgical gloves available, automation process 10 may consider this to be an immediate total failure of the discrete goal.

An immediate partial failure of the discrete goal: For example, if automation process 10 accesses website 100 to purchase the 1,000,000 pair of surgical gloves . . . only to find out that website 100 only has 500,000 pair of surgical gloves available, automation process 10 may consider this to be an immediate partial failure of the discrete goal.

A retroactive total failure of the discrete goal: For example, if automation process 10 accesses website 100 to purchase the 1,000,000 pair of surgical gloves and purchases the same . . . only to find out that website 100 fails to ship any surgical gloves (e.g., due to them being backordered or systemic failure), automation process 10 may consider this to be a retroactive total failure of the discrete goal.

A retroactive partial failure of the discrete goal: For example, if automation process 10 accesses website 100 to purchase the 1,000,000 pair of surgical gloves and purchases the same . . . only to find out that website 100 shipped only 500,000 surgical gloves (e.g., due to them being backordered or systemic failure), automation process 10 may consider this to be a retroactive partial failure of the discrete goal.

While the above examples refer to failures of discrete goals when performing discrete tasks on a website, it will be appreciated that failing to achieve a discrete goal may include failure of a discrete goal associated with non-website resources (e.g., an API or other external service).

As will be explained below in greater detail, if a specific discrete task (e.g., one or more of discrete tasks 402, 404, 406, 408) failed to achieve its discrete goal, automation process 10 may define 470 a substitute discrete task having a substitute discrete goal, wherein automation process 10 may execute 472 the substitute discrete task. As will be clear from the discussion below, a substitute discrete task may be any discrete task that is modified as a result of the previously-executed discrete task.

Continuing with the above-stated example in which user 42 wishes to purchase 1,000,000 pair of surgical gloves for less than $20 per hundred pair and they are needed by 1 Jan. 2022, this complex task (e.g., complex task 400) may include a plurality of discrete tasks (e.g., discrete tasks 402, 404, 406, 408). Assume that automation process 10 attends to the sequential execution of discrete tasks 402, 404, 406, 408 and the following operations occur:

Automation process 10 may effectuate discrete task 402 and attempt to purchase the 1,000,000 pair of surgical gloves from website 100. Assume that website 100 does not have any surgical gloves available. Accordingly, automation process 10 may consider this to be an immediate total failure of the discrete goal associated with discrete task 402. As complex task 400 is still not satisfied (i.e., 0 of the 1,000,000 pair have been purchased), automation process 10 may continue on to the next discrete task.

Automation process 10 may effectuate discrete task 404 and attempt to purchase the 1,000,000 pair of surgical gloves from website 112. Assume that website 112 has 500,000 pair of surgical gloves available (that satisfy the price and delivery requirements). Accordingly, automation process 10 may purchase this 500,000 pair of surgical glove but may consider this to be an immediate partial failure of the discrete goal associated with discrete task 404. As complex task 400 is still not satisfied (i.e., 500,000 of the 1,000,000 pair have been purchased), automation process 10 may continue on to the next discrete task.

Automation process 10 may effectuate discrete task 406 and attempt to purchase the remaining 500,000 pair of surgical gloves from website 114. Assume that website 114 has 200,000 pair of surgical gloves available (that satisfy the price and delivery requirements). Accordingly, automation process 10 may purchase this 200,000 pair of surgical glove but may consider this to be an immediate partial failure of the discrete goal associated with discrete task 406. As complex task 400 is still not satisfied (i.e., 700,000 of the 1,000,000 pair have been purchased), automation process 10 may continue on to the next discrete task.

Automation process 10 may effectuate discrete task 408 and attempt to purchase the remaining 300,000 pair of surgical gloves from website 116. Assume that website 112 has 300,000 pair of surgical gloves available (that satisfy the price and delivery requirements). Accordingly, automation process 10 may purchase this 300,000 pair of surgical glove and may consider this to not be a failure of the discrete goal associated with discrete task 408. As complex task 400 is now satisfied (i.e., 1,000,000 of the 1,000,000 pair have been purchased), automation process 10 may not continue on to the next discrete task.

Grokit System (General):

As will be discussed below in greater detail, the above-described discrete systems (e.g., DataFi, ParaLogue & ParaFlow) may be combined to form an end-to-end platform that enables the navigation of a plurality of websites (e.g., websites 100, 112, 114, 116) without the need for human intervention, thus enabling the automated & distributed execution of complex tasks (e.g., complex task 400). As discussed above, complex task 400 may include the purchase of 1,000,000 pair of surgical gloves for less than $20 per hundred pair and delivered by 1 Jan. 2022.

Figure 11:
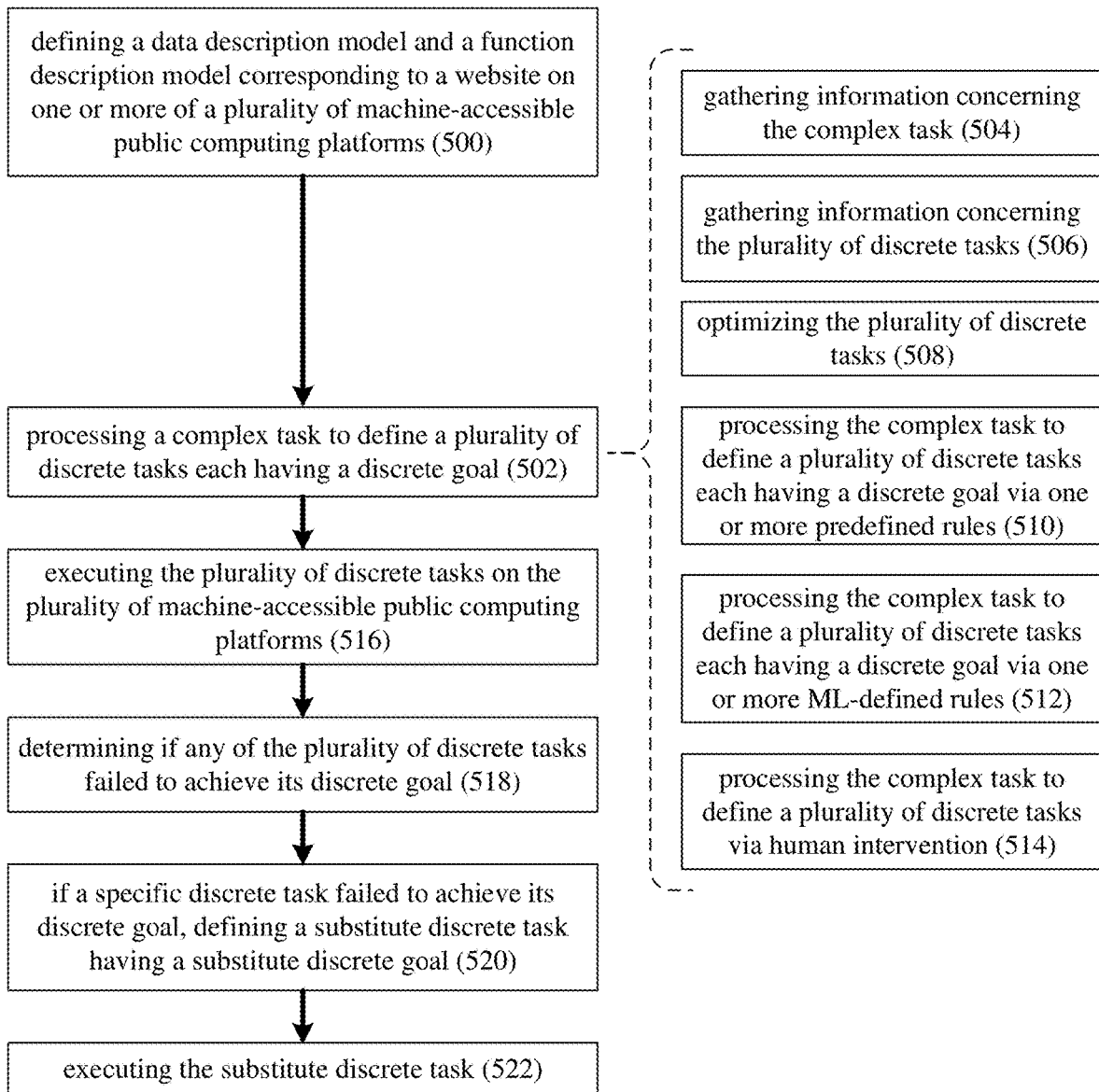
FIG. 11 is another flowchart of the automation process of FIG. 1 according to an embodiment of the present disclosure.

Referring also to FIG. 11 and as discussed above, automation process 10 may define 500 a data description model (e.g., data description models 58, 350, 354, 358) and a function description model (e.g., function description models 66, 352, 356, 360) corresponding to a website (e.g., websites 100, 112, 114, 116) on one or more of a plurality of machine-accessible public computing platforms (e.g., machine-accessible public computing platforms 370, 372, 374, 376). This plurality of machine-accessible public computing platforms (e.g., machine-accessible public computing platforms 370, 372, 374, 376) may include a plurality of ecommerce computing platforms coupled to the internet.

Automation process 10 may process 502 a complex task (e.g., complex task 400) to define a plurality of discrete tasks (e.g., discrete tasks 402, 404, 406, 408) each having a discrete goal, wherein this complex task (e.g., complex task 400) may be based upon a defined goal (e.g., defined goal 418).

As discussed above and when processing 502 the complex task (e.g., complex task 400) to define a plurality of discrete tasks (e.g., discrete tasks 402, 404, 406, 408) each having a discrete goal, automation process 10 may:

gather 504 information concerning the complex task (e.g., complex task 400), in the manner described above;

gather 506 information concerning the plurality of discrete tasks (e.g., discrete tasks 402, 404, 406, 408), in the manner described above; and/or optimize 508 the plurality of discrete tasks (e.g., discrete tasks 402, 404, 406, 408), in the manner described above.

Additionally/alternatively and when processing 502 the complex task (e.g., complex task 400) to define a plurality of discrete tasks (e.g., discrete tasks 402, 404, 406, 408) each having a discrete goal, automation process 10 may:

Process 510 the complex task (e.g., complex task 400) to define a plurality of discrete tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 510 the complex task (e.g., complex task 400) to define a plurality of discrete tasks (e.g., discrete tasks 402, 404, 406, 408).

Process 512 the complex task (e.g., complex task 400) to define a plurality of discrete tasks (e.g., discrete tasks 402, 404, 406, 408) each having a discrete goal via one or more ML-defined rules. For example, as orders are processed by automation process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 512 the complex task (e.g., complex task 400) to define a plurality of discrete tasks (e.g., discrete tasks 402, 404, 406, 408).

Process 514 the complex task (e.g., complex task 400) to define a plurality of discrete tasks (e.g., discrete tasks 402, 404, 406, 408) based, at least in part, upon human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 514 the complex task (e.g., complex task 400) to define a plurality of discrete tasks (e.g., discrete tasks 402, 404, 406, 408). As discussed above, defining a plurality of discrete tasks (e.g., discrete tasks 402, 404, 406, 408) based, at least in part, upon human intervention may include determining that the one or more functions defined for the plurality of function description models for the plurality of websites are unable to perform one of the discrete tasks. Accordingly, automation process 10 may provide a request for human intervention for input regarding the discrete task. For example, automation process 10 may provide a request to a human (e.g., user 42) to perform a particular function on the website to supplement the function description model for that website. In this manner, automation process 10 may identify missing functionality in one or more function description models and may associate user interactions with missing functions to define or update a function description model for the website. In addition to performing functions of a website, automation process 10 may request that a human perform certain tasks that a machine cannot perform (e.g., prepare an electronic signature). In this manner, a machine and a human may collaborate to define and/or accomplish the plurality of discrete tasks of the complex task.

As discussed above, automation process 10 may execute 516 the plurality of discrete tasks (e.g., discrete tasks 402, 404, 406, 408) on the plurality of machine-accessible public computing platforms (e.g., machine-accessible public computing platforms 370, 372, 374, 376) and may determine 518 if any of the plurality of discrete tasks (e.g., discrete tasks 402, 404, 406, 408) failed to achieve its discrete goal. As discussed above, "failing to achieve its discrete goal" may include one or more of:

An immediate total failure of the discrete goal: For example, if automation process 10 accesses website 100 to purchase the 1,000,000 pair of surgical gloves . . . only to find out that website 100 does not have any surgical gloves available, automation process 10 may consider this to be an immediate total failure of the discrete goal.

An immediate partial failure of the discrete goal: For example, if automation process 10 accesses website 100 to purchase the 1,000,000 pair of surgical gloves . . . only to find out that website 100 only has 500,000 pair of surgical gloves available, automation process 10 may consider this to be an immediate partial failure of the discrete goal.

A retroactive total failure of the discrete goal: For example, if automation process 10 accesses website 100 to purchase the 1,000,000 pair of surgical gloves and purchases the same . . . only to find out that website 100 fails to ship any surgical gloves (e.g., due to them being backordered or systemic failure), automation process 10 may consider this to be a retroactive total failure of the discrete goal.

A retroactive partial failure of the discrete goal: For example, if automation process 10 accesses website 100 to purchase the 1,000,000 pair of surgical gloves and purchases the same . . . only to find out that website 100 shipped only 500,000 surgical gloves (e.g., due to them being backordered or systemic failure), automation process 10 may consider this to be a retroactive partial failure of the discrete goal.

As discussed above, if a specific discrete task failed to achieve its discrete goal, automation process 10 may define 520 a substitute discrete task having a substitute discrete goal and may execute 522 the substitute discrete task.

Grokit System (SaaS):

As will be discussed below in greater detail, the above-described discrete systems (e.g., DataFi, ParaLogue & ParaFlow) may be combined to form an end-to-end Software-as-a-Service (SaaS) platform that enables the navigation of a plurality of websites (e.g., websites 100, 112, 114, 116) without requiring human intervention, thus enabling the automated & distributed execution of complex tasks (e.g., complex task 400). As discussed above, complex task 400 may include the purchase of 1,000,000 pair of surgical gloves for less than $20 per hundred pair and delivered by 1 Jan. 2022.

Figure 12:
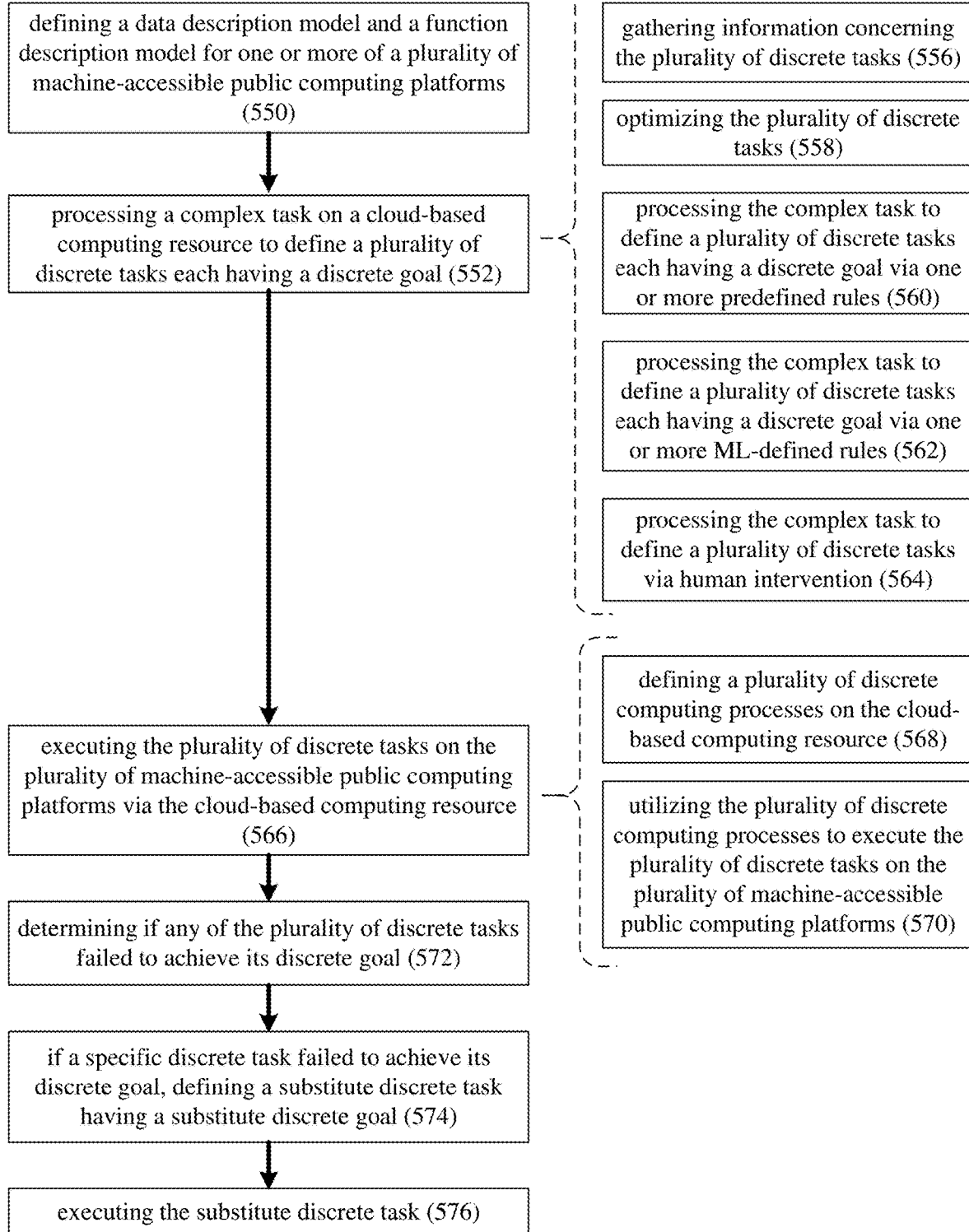
FIG. 12 is another flowchart of the automation process of FIG. 1 according to an embodiment of the present disclosure.
Figure 13:
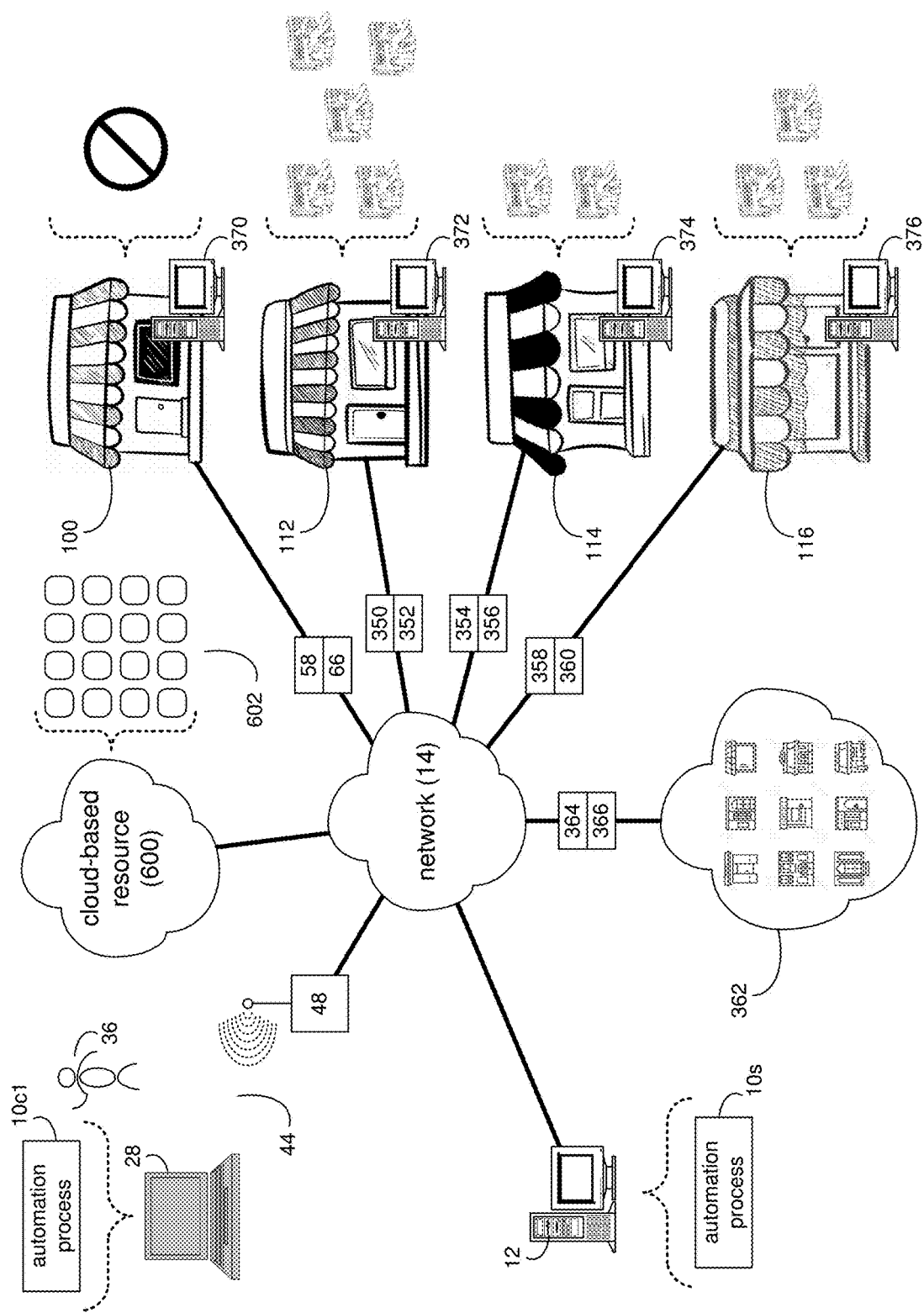
FIG. 13 is a diagrammatic view of a plurality of websites for processing by a cloud-based implementation of the automation process of FIG. 1 according to an embodiment of the present disclosure.

Referring also to FIGS. 12-13 and as discussed above, automation process 10 may define 550 a data description model (e.g., data description models 58, 350, 354, 358) and a function description model (e.g., function description models 66, 352, 356, 360) for one or more of a plurality of machine-accessible public computing platforms (e.g., machine-accessible public computing platforms 370, 372, 374, 376) on a cloud-based computing resource (e.g., cloud-based computing resource 600). The plurality of machine-accessible public computing platforms (e.g., machine-accessible public computing platforms 370, 372, 374, 376) may include a plurality of ecommerce computing platforms coupled to the internet.

An example of cloud-based computing resource 600 may include but is not limited to a system that provides on-demand availability of computer system resources, especially data storage (e.g., cloud storage) and computing power, without direct active management by the user. The term is generally used to describe data centers available to many users over the Internet. Large clouds often have functions distributed over multiple locations from central servers. If the connection to the user is relatively close, it may be designated an edge server. Clouds may be limited to a single organization (enterprise clouds), or be available to multiple organizations (public cloud). Cloud computing may rely on sharing of resources to achieve coherence and economies of scale. Benefits of public and hybrid clouds include allowing companies to avoid (or minimize) up-front IT infrastructure costs while getting applications up and running faster with improved manageability and less maintenance. Cloud computing may enable IT teams to more rapidly adjust resources to meet fluctuating and unpredictable demand, while providing burst computing capability (i.e., high computing power at certain periods of peak demand).

As discussed above, automation process 10 may process 552 the complex task (e.g., complex task 400) on the cloud-based computing resource (e.g., cloud-based computing resource 600) to define a plurality of discrete tasks (e.g., discrete tasks 402, 404, 406, 408) each having a discrete goal, wherein this complex task (e.g., complex task 400) may be based upon a defined goal (e.g., defined goal 418).

As discussed above and when processing 552 a complex task (e.g., complex task 400) on the cloud-based computing resource (e.g., cloud-based computing resource 600) to define a plurality of discrete tasks (e.g., discrete tasks 402, 404, 406, 408) each having a discrete goal, automation process 10 may:

gather 554 information concerning the complex task (e.g., complex task 400), in the manner described above;

gather 556 information concerning the plurality of discrete tasks (e.g., discrete tasks 402, 404, 406, 408), in the manner described above; and/or optimize 558 the plurality of discrete tasks (e.g., discrete tasks 402, 404, 406, 408), in the manner described above.

Additionally/alternatively and when processing 552 a complex task (e.g., complex task 400) on the cloud-based computing resource (e.g., cloud-based computing resource 600) to define a plurality of discrete tasks (e.g., discrete tasks 402, 404, 406, 408) each having a discrete goal, automation process 10 may:

Process 560 the complex task (e.g., complex task 400) to define a plurality of discrete tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 560 the complex task (e.g., complex task 400) to define a plurality of discrete tasks (e.g., discrete tasks 402, 404, 406, 408).

Process 562 the complex task (e.g., complex task 400) to define a plurality of discrete tasks (e.g., discrete tasks 402, 404, 406, 408) each having a discrete goal via one or more ML-defined rules. For example, as orders are processed by automation process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 562 the complex task (e.g., complex task 400) to define a plurality of discrete tasks (e.g., discrete tasks 402, 404, 406, 408).

Process 564 the complex task (e.g., complex task 400) to define a plurality of discrete tasks (e.g., discrete tasks 402, 404, 406, 408) based, at least in part, upon human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 564 the complex task (e.g., complex task 400) to define a plurality of discrete tasks (e.g., discrete tasks 402, 404, 406, 408). As discussed above, defining a plurality of discrete tasks (e.g., discrete tasks 402, 404, 406, 408) based, at least in part, upon human intervention may include determining that the one or more functions defined for the plurality of function description models for the plurality of websites are unable to perform one of the discrete tasks. Accordingly, automation process 10 may provide a request for human intervention for input regarding the discrete task. For example, automation process 10 may provide a request to a human (e.g., user 42) to perform a particular function on the website to supplement the function description model for that website. In this manner, automation process 10 may identify missing functionality in one or more function description models and may associate user interactions with missing functions to define or update a function description model for the website. In addition to performing functions of a website, automation process 10 may request that a human perform certain tasks that a machine cannot perform (e.g., prepare an electronic signature). In this manner, a machine and a human may collaborate to define and/or accomplish the plurality of discrete tasks of the complex task.

As discussed above, automation process 10 may execute 566 the plurality of discrete tasks (e.g., discrete tasks 402, 404, 406, 408) on the plurality of machine-accessible public computing platforms (e.g., machine-accessible public computing platforms 370, 372, 374, 376) via the cloud-based computing resource (e.g., cloud-based computing resource 600).

When executing 566 the plurality of discrete tasks (e.g., discrete tasks 402, 404, 406, 408) on the plurality of machine-accessible public computing platforms (e.g., machine-accessible public computing platforms 370, 372, 374, 376) via the cloud-based computing resource (e.g., cloud-based computing resource 600), automation process 10 may define 568 a plurality of discrete computing processes (e.g., computing processes 602) on the cloud-based computing resource (e.g., cloud-based computing resource 600).

Examples of the plurality of discrete computing processes (e.g., computing processes 602) may include: one or more virtual machines; one or more containers; and one or more unikernels.

Virtual Machines: As is known in the art, a virtual machine (VM) is the virtualization/emulation of a computer system. Virtual machines may be based on computer architectures and may provide functionality of a physical computer, wherein their implementations may involve specialized hardware, software, or a combination. Virtual machines may differ and are organized by their function. For example, system virtual machines (also termed full virtualization VMs) may provide a substitute for a real machine. System virtual machines may provide functionality needed to execute entire operating systems. A hypervisor may use native execution to share and manage hardware, allowing for multiple environments that are isolated from one another, yet exist on the same physical machine. Modern hypervisors may use hardware-assisted virtualization, virtualization-specific hardware, primarily from the host CPUs. Process virtual machines may be designed to execute computer programs in a platform-independent environment.

Containers: As is known in the art, virtualization is an operating system paradigm in which the kernel allows the existence of multiple isolated user space instances. Such instances (called containers, zones, virtual private servers, partitions, virtual environments, virtual kernels, or jails) may look like real computers from the point of view of programs running in them. A computer program running on an ordinary operating system may see all resources (e.g., connected devices, files and folders, network shares, CPU power, quantifiable hardware capabilities) of that computer. However, programs running inside of a container can only see the container's contents and devices assigned to the container.

Unikernels: As is known in the art, a unikernel is a specialized, single address space machine image constructed by using library operating systems. A developer selects, from a modular stack, the minimal set of libraries that correspond to the OS constructs required for the application to run. These libraries may then be compiled with the application and configuration code to build sealed, fixed-purpose images (unikernels) that run directly on a hypervisor or hardware without an intervening OS such as Linux or Windows. Thousands of unikernels may run on the same hardware, thus meeting the aspirational objective of the triple-order of magnitude (e.g., trillions of machines operating over the web versus the billions of machines that operate today). Unikernels have the security of a virtual machine and are stripped down to the bare essentials of running code inside processes without the overhead of an entire OS' device support. With a reduced memory footprint, a unikernal can startup in less than 125 milliseconds. Further, unikernels may be managed by Kubernetes (automatic orchestration).

When executing 566 the plurality of discrete tasks on the plurality of machine-accessible public computing platforms (e.g., machine-accessible public computing platforms 370, 372, 374, 376) via the cloud-based computing resource (e.g., cloud-based computing resource 600), automation process 10 may utilize 570 the plurality of discrete computing processes (e.g., computing processes 602) to execute the plurality of discrete tasks (e.g., discrete tasks 402, 404, 406, 408) on the plurality of machine-accessible public computing platforms (e.g., machine-accessible public computing platforms 370, 372, 374, 376).

As discussed above, automation process 10 may determine 572 if any of the plurality of discrete tasks (e.g., discrete tasks 402, 404, 406, 408) failed to achieve its discrete goal, wherein "failing to achieve its discrete goal" may include one or more of:

An immediate total failure of the discrete goal: For example, if automation process 10 accesses website 100 to purchase the 1,000,000 pair of surgical gloves . . . only to find out that website 100 does not have any surgical gloves available, automation process 10 may consider this to be an immediate total failure of the discrete goal.

An immediate partial failure of the discrete goal: For example, if automation process 10 accesses website 100 to purchase the 1,000,000 pair of surgical gloves . . . only to find out that website 100 only has 500,000 pair of surgical gloves available, automation process 10 may consider this to be an immediate partial failure of the discrete goal.

A retroactive total failure of the discrete goal: For example, if automation process 10 accesses website 100 to purchase the 1,000,000 pair of surgical gloves and purchases the same . . . only to find out that website 100 fails to ship any surgical gloves (e.g., due to them being backordered or systemic failure), automation process 10 may consider this to be a retroactive total failure of the discrete goal.

A retroactive partial failure of the discrete goal: For example, if automation process 10 accesses website 100 to purchase the 1,000,000 pair of surgical gloves and purchases the same . . . only to find out that website 100 shipped only 500,000 surgical gloves (e.g., due to them being backordered or systemic failure), automation process 10 may consider this to be a retroactive partial failure of the discrete goal.

As discussed above, if a specific discrete task failed to achieve its discrete goal, automation process 10 may define 574 a substitute discrete task having a substitute discrete goal and may execute 576 the substitute discrete task.

Grokit System (Supply Chain):

As will be discussed below in greater detail, the above-described discrete systems (e.g., DataFi, ParaLogue & ParaFlow) may be combined to form an end-to-end supply chain management platform that enables the navigation of a plurality of websites (e.g., websites 100, 112, 114, 116) without requiring human intervention, thus enabling the automated & distributed execution of complex tasks (e.g., complex task 400). For example, the end-to-end supply chain management platform may allow machines to do human work and for complex tasks to be interactively delegated between humans and machines. As discussed above, complex task 400 may include the purchase of 1,000,000 pair of surgical gloves for less than $20 per hundred pair and delivered by 1 Jan. 2022.

Figure 14:
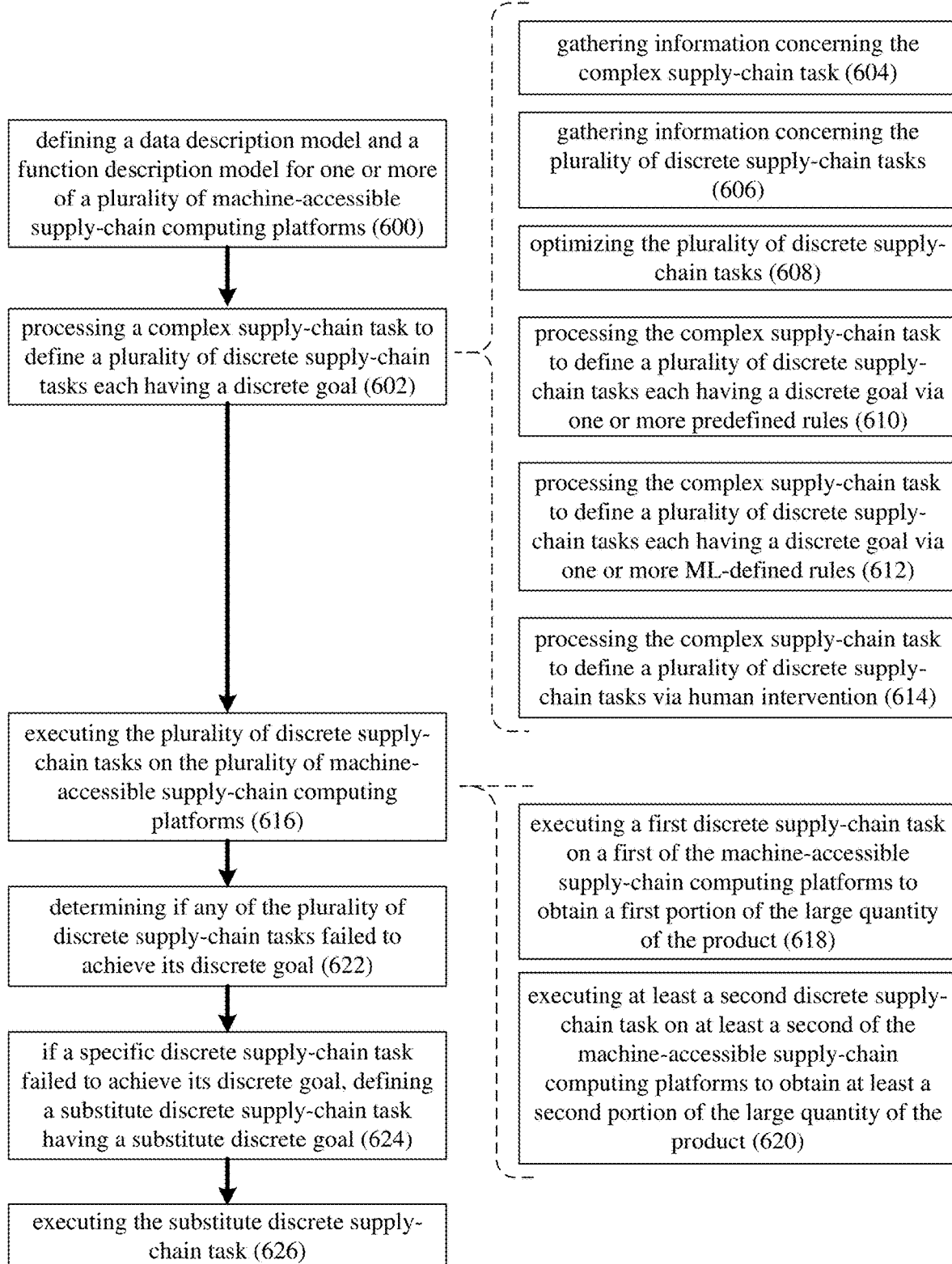
FIG. 14 is another flowchart of the automation process of FIG. 1 according to an embodiment of the present disclosure.

Referring also to FIG. 14 and as discussed above, automation process 10 may define 600 a data description model (e.g., data description models 58, 350, 354, 358) and a function description model (e.g., function description models 66, 352, 356, 360) for one or more of a plurality of machine-accessible supply-chain computing platforms (e.g., machine-accessible public computing platforms 370, 372, 374, 376). The plurality of machine-accessible supply-chain computing platforms (e.g., machine-accessible public computing platforms 370, 372, 374, 376) may include a plurality of ecommerce computing platforms coupled to the internet.

As discussed above, automation process 10 may process 602 a complex supply-chain task (e.g., complex task 400) to define a plurality of discrete supply-chain tasks (e.g., discrete tasks 402, 404, 406, 408) each having a discrete goal, wherein the complex supply-chain task (e.g., complex task 400) may be based upon a defined goal (e.g., defined goal 418). The complex supply-chain task (e.g. complex task 400) may concern one or more of obtaining a large quantity of a product; tracking a shipping status of the product; and processing one or more invoices. However, it will be appreciated that the complex supply-chain task (e.g. complex task 400) may concern any supply-chain-related task within the scope of the present disclosure.

As discussed above and when processing 602 the complex supply-chain task (e.g., complex task 400) to define a plurality of discrete supply-chain tasks (e.g., discrete tasks 402, 404, 406, 408) each having a discrete goal, automation process 10 may:

gather 604 information concerning the complex supply-chain task (e.g., complex task 400), in the manner described above;

gather 606 information concerning the plurality of discrete supply-chain tasks (e.g., discrete tasks 402, 404, 406, 408), in the manner described above; and/or optimize 608 the plurality of discrete supply-chain tasks (e.g., discrete tasks 402, 404, 406, 408), in the manner described above.

Additionally/alternatively and when processing 602 the complex supply-chain task (e.g., complex task 400) to define a plurality of discrete supply-chain tasks (e.g., discrete tasks 402, 404, 406, 408) each having a discrete goal, automation process 10 may:

Process 610 the complex supply-chain task (e.g., complex task 400) to define a plurality of discrete supply-chain tasks (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, inventory restocking, competitive pricing, country of origination/operation, etc., all of which may be applied when processing 610 the complex supply-chain task (e.g., complex task 400) to define a plurality of discrete supply-chain task (e.g., discrete tasks 402, 404, 406, 408).

Process 612 the complex supply-chain task (e.g., complex task 400) to define a plurality of discrete supply-chain tasks (e.g., discrete tasks 402, 404, 406, 408) each having a discrete goal via one or more ML-defined rules. For example, as orders are processed by automation process 10, information may be gathered concerning the processing of these orders. Machine learning process 122 may process this order information to define ML-defined rules concerning e.g., preferred vendors, blacklisted vendors, transportation requirements, country of manufacture, inventory restocking, competitive pricing, country of origination/operation, etc., all of which may be applied when processing 612 the complex supply-chain task (e.g., complex task 400) to define a plurality of discrete supply-chain task (e.g., discrete tasks 402, 404, 406, 408).

Process 614 the complex supply-chain task (e.g., complex task 400) to define a plurality of discrete supply-chain tasks (e.g., discrete tasks 402, 404, 406, 408) based, at least in part, upon human intervention. For example, the user (e.g., user 42) or a third-party may be consulted to define rules/preferences concerning e.g., preferred vendors, blacklisted vendors, transportation requirements, country of manufacture, inventory restocking, competitive pricing, country of origination/operation, etc., all of which may be applied when processing 614 the complex supply-chain task (e.g., complex task 400) to define a plurality of discrete supply-chain task (e.g., discrete tasks 402, 404, 406, 408). As discussed above, defining a plurality of discrete tasks (e.g., discrete tasks 402, 404, 406, 408) based, at least in part, upon human intervention may include determining that the one or more functions defined for the plurality of function description models for the plurality of websites are unable to perform one of the discrete tasks. Accordingly, automation process 10 may provide a request for human intervention for input regarding the discrete task. For example, automation process 10 may provide a request to a human (e.g., user 42) to perform a particular function on the website to supplement the function description model for that website. In this manner, automation process 10 may identify missing functionality in one or more function description models and may associate user interactions with missing functions to define or update a function description model for the website. In addition to performing functions of a website, automation process 10 may request that a human perform certain tasks that a machine cannot perform (e.g., prepare an electronic signature). In this manner, a machine and a human may collaborate to define and/or accomplish the plurality of discrete supply-chain tasks of the complex supply-chain task.

As discussed above, automation process 10 may execute 616 the plurality of discrete supply-chain task (e.g., discrete tasks 402, 404, 406, 408) on the plurality of machine-accessible supply-chain computing platforms (e.g., machine-accessible public computing platforms 370, 372, 374, 376).

When executing 616 the plurality of discrete supply-chain task (e.g., discrete tasks 402, 404, 406, 408) on the plurality of machine-accessible supply-chain computing platforms (e.g., machine-accessible public computing platforms 370, 372, 374, 376), automation process 10 may: execute 618 a first discrete supply-chain task (e.g., discrete task 402) on a first of the machine-accessible supply-chain computing platforms (e.g., machine-accessible public computing platforms 370) to obtain a first portion of the large quantity of the product (e.g., the 1,000,000 pair of surgical gloves); and execute 620 at least a second discrete supply-chain task (e.g., one or more of discrete task 404, 406, 408) on at least a second of the machine-accessible supply-chain computing platforms (e.g., machine-accessible public computing platforms 372, 374, 376) to obtain at least a second portion of the large quantity of the product (e.g., the 1,000,000 pair of surgical gloves).

Accordingly, the complex supply-chain task (e.g., complex task 400) may be broken down into a plurality of smaller tasks (e.g., discrete tasks 402, 404, 406, 408) that may be executed across a plurality of computers (e.g., machine-accessible public computing platforms 370, 372, 374, 376), thus enabling a task (e.g., the purchase of 1,000,000 pair of surgical gloves) that would likely not be executable on a single ecommerce website (e.g., website 100) to be executed in a distributed fashion across a plurality of ecommerce websites (e.g., websites 100, 112, 114, 116).

As discussed above, automation process 10 may determine 622 if any of the plurality of discrete supply-chain task (e.g., discrete tasks 402, 404, 406, 408) failed to achieve its discrete goal, wherein "failing to achieve its discrete goal" may include one or more of:

An immediate total failure of the discrete goal: For example, if automation process 10 accesses website 100 to purchase the 1,000,000 pair of surgical gloves . . . only to find out that website 100 does not have any surgical gloves available, automation process 10 may consider this to be an immediate total failure of the discrete goal.

An immediate partial failure of the discrete goal: For example, if automation process 10 accesses website 100 to purchase the 1,000,000 pair of surgical gloves . . . only to find out that website 100 only has 500,000 pair of surgical gloves available, automation process 10 may consider this to be an immediate partial failure of the discrete goal.

A retroactive total failure of the discrete goal: For example, if automation process 10 accesses website 100 to purchase the 1,000,000 pair of surgical gloves and purchases the same ... only to find out that website 100 fails to ship any surgical gloves (e.g., due to them being backordered or systemic failure), automation process 10 may consider this to be a retroactive total failure of the discrete goal.

A retroactive partial failure of the discrete goal: For example, if automation process 10 accesses website 100 to purchase the 1,000,000 pair of surgical gloves and purchases the same ... only to find out that website 100 shipped only 500,000 surgical gloves (e.g., due to them being backordered or systemic failure), automation process 10 may consider this to be a retroactive partial failure of the discrete goal.

As discussed above, if a specific discrete supply-chain task failed to achieve its discrete goal, automation process 10 may define 624 a substitute discrete supply-chain task having a substitute discrete goal and may execute 626 the substitute discrete supply-chain task.

Grokit System (Automated Navigation):

As will be discussed below in greater detail, the above-described discrete systems (e.g., DataFi, ParaLogue & ParaFlow) may be combined to form an end-to-end platform that enables the navigation of a plurality of websites (e.g., websites 100, 112, 114, 116) via an orchestrating computing system (i.e., removing the exclusive reliance on humans from the equation), thus enabling the automated & distributed execution of complex tasks (e.g., complex task 400). For example, this end-to-end platform may allow for automated orchestration of a complex task among machines and any number of humans (or without humans). As discussed above, complex task 400 may include the purchase of 1,000,000 pair of surgical gloves for less than $20 per hundred pair and delivered by 1 Jan. 2022.

Figure 15:
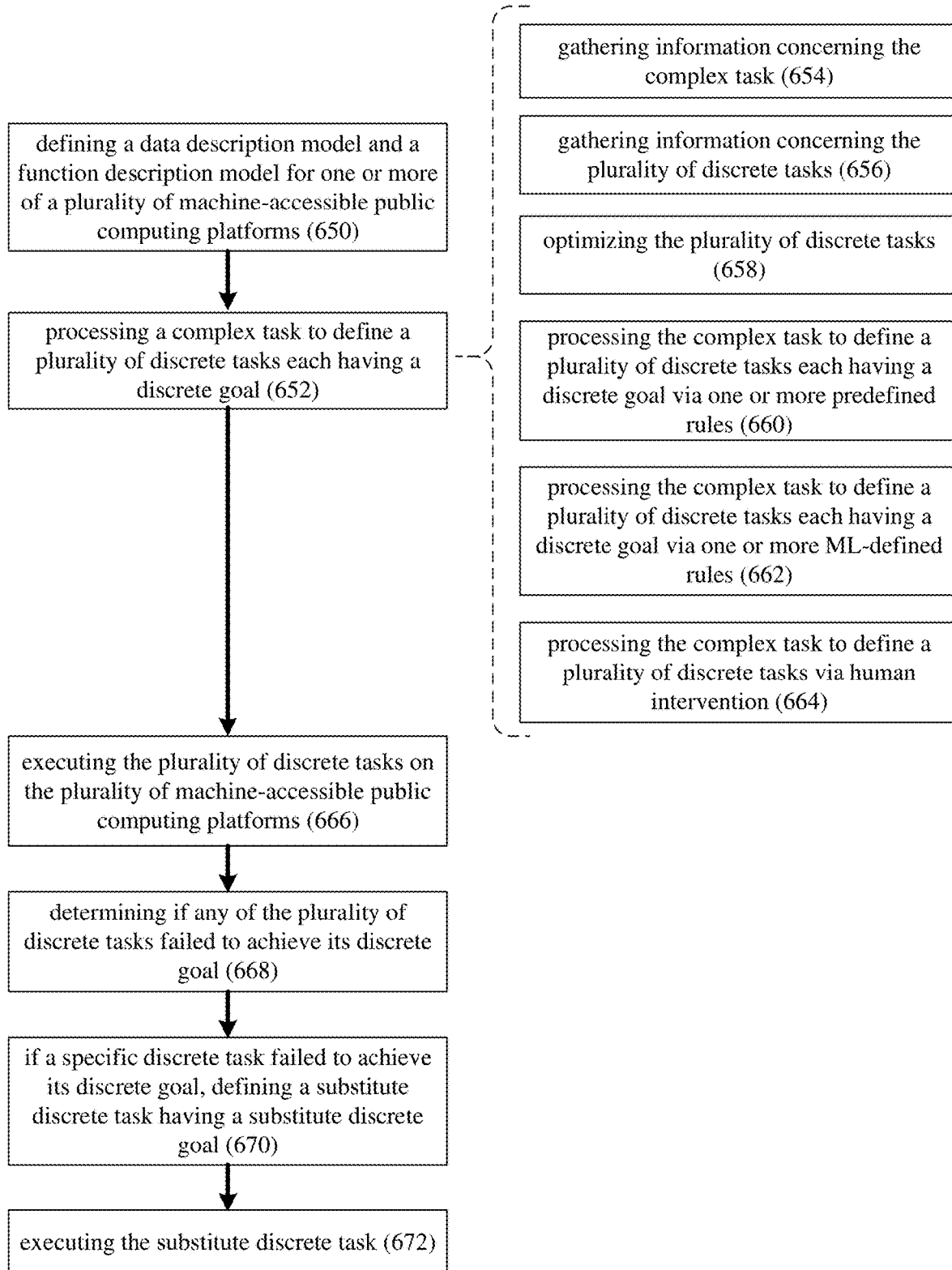
FIG. 15 is another flowchart of the automation process of FIG. 1 according to an embodiment of the present disclosure.

Referring also to FIG. 15 and as discussed above, automation process 10 may define 650 a data description model (e.g., data description models 58, 350, 354, 358) and a function description model (e.g., function description models 66, 352, 356, 360) for one or more of a plurality of machine-accessible computing platforms (e.g., machine-accessible public computing platforms 370, 372, 374, 376). The plurality of machine-accessible computing platforms (e.g., machine-accessible public computing platforms 370, 372, 374, 376) may include a plurality of ecommerce computing platforms coupled to the internet.

As discussed above, automation process 10 may process 652 a complex task (e.g., complex task 400) to define a plurality of discrete tasks (e.g., discrete tasks 402, 404, 406, 408) each having a discrete goal, wherein the complex task (e.g., complex task 400) may be based upon a defined goal (e.g., defined goal 418).

As discussed above and when processing 652 the complex task (e.g., complex task 400) to define a plurality of discrete tasks (e.g., discrete tasks 402, 404, 406, 408) each having a discrete goal, automation process 10 may:
- gather 654 information concerning the complex task (e.g., complex task 400), in the manner described above;
- gather 656 information concerning the plurality of discrete tasks (e.g., discrete tasks 402, 404, 406, 408), in the manner described above; and/or
- optimize 658 the plurality of discrete tasks (e.g., discrete tasks 402, 404, 406, 408), in the manner described above.

Additionally/alternatively and when processing 652 the complex task (e.g., complex task 400) to define a plurality of discrete tasks (e.g., discrete tasks 402, 404, 406, 408) each having a discrete goal, automation process 10 may:

- Process 660 the complex task (e.g., complex task 400) to define a plurality of discrete task (e.g., discrete tasks 402, 404, 406, 408) each having a discrete goal via one or more predefined rules. For example, one or more predefined rules may exist concerning e.g., preferred vendors, blacklisted vendors, transportation requirements, country of manufacture, country of origination/operation, etc., all of which may be applied when processing 660 the complex task (e.g., complex task 400) to define a plurality of discrete tasks (e.g., discrete tasks 402, 404, 406, 408).
- Process 662 the complex task (e.g., complex task 400) to define a plurality of discrete task (e.g., discrete tasks 402, 404, 406, 408) each having a discrete goal via one or more ML-defined rules. For example, as orders are processed by automation process 10, information may be gathered concerning the processing of these orders. Machine learning process 122 may process this order information to define ML-defined rules concerning e.g., preferred vendors, blacklisted vendors, transportation requirements, country of manufacture, country of origination/operation, etc., all of which may be applied when processing 662 the complex task (e.g., complex task 400) to define a plurality of discrete tasks (e.g., discrete tasks 402, 404, 406, 408).
- Process 664 the complex task (e.g., complex task 400) to define a plurality of discrete task (e.g., discrete tasks 402, 404, 406, 408) based, at least in part, upon human intervention. For example, the user (e.g., user 42) or a third-party may be consulted to define rules/preferences concerning e.g., preferred vendors, blacklisted vendors, transportation requirements, country of manufacture, country of origination/operation, etc., all of which may be applied when processing 664 the complex task (e.g., complex task 400) to define a plurality of discrete tasks (e.g., discrete tasks 402, 404, 406, 408). As discussed above, defining a plurality of discrete tasks (e.g., discrete tasks 402, 404, 406, 408) based, at least in part, upon human intervention may include determining that the one or more functions defined for the plurality of function description models for the plurality of websites are unable to perform one of the discrete tasks. Accordingly, automation process 10 may provide a request for human intervention for input regarding the discrete task. For example, automation process 10 may provide a request to a human (e.g., user 42) to perform a particular function on the website to supplement the function description model for that website. In this manner, automation process 10 may identify missing functionality in one or more function description models and may associate user interactions with missing functions to define or update a function description model for the website. In addition to performing functions of a website, automation process 10 may request that a human perform certain tasks that a machine cannot perform (e.g., prepare an electronic signature). In this manner, a machine and a human may collaborate to define and/or accomplish the plurality of discrete tasks of the complex task.

As discussed above, automation process 10 may execute 666 the plurality of discrete tasks (e.g., discrete tasks 402, 404, 406, 408) on the plurality of machine-accessible public computing platforms (e.g., machine-accessible public computing platforms 370, 372, 374, 376) and may determine 668 if any of the plurality of discrete tasks (e.g., discrete tasks

402, 404, 406, 408) failed to achieve its discrete goal. As discussed above, "failing to achieve its discrete goal" may include one or more of:

- An immediate total failure of the discrete goal: For example, if automation process 10 accesses website 100 to purchase the 1,000,000 pair of surgical gloves . . . only to find out that website 100 does not have any surgical gloves available, automation process 10 may consider this to be an immediate total failure of the discrete goal.
- An immediate partial failure of the discrete goal: For example, if automation process 10 accesses website 100 to purchase the 1,000,000 pair of surgical gloves . . . only to find out that website 100 only has 500,000 pair of surgical gloves available, automation process 10 may consider this to be an immediate partial failure of the discrete goal.
- A retroactive total failure of the discrete goal: For example, if automation process 10 accesses website 100 to purchase the 1,000,000 pair of surgical gloves and purchases the same . . . only to find out that website 100 fails to ship any surgical gloves (e.g., due to them being backordered or systemic failure), automation process 10 may consider this to be a retroactive total failure of the discrete goal.
- A retroactive partial failure of the discrete goal: For example, if automation process 10 accesses website 100 to purchase the 1,000,000 pair of surgical gloves and purchases the same . . . only to find out that website 100 shipped only 500,000 surgical gloves (e.g., due to them being backordered or systemic failure), automation process 10 may consider this to be a retroactive partial failure of the discrete goal.

As discussed above, if a specific discrete task failed to achieve its discrete goal, automation process 10 may define 670 a substitute discrete task having a substitute discrete goal and may execute 672 the substitute discrete task.

Grokit System Features:

As discussed above, the above-described discrete systems (e.g., DataFi, ParaLogue & ParaFlow) may be combined to form an end-to-end platform that enables the navigation of a plurality of websites (e.g., websites 100, 112, 114, 116) without the need for human intervention, thus enabling the automated & distributed execution of complex tasks (e.g., complex task 400).

As will be discussed below in greater detail, automation process 10 may include various additional features that may enhance the functionality of the platform discussed above.

Ontology:

Discussed below is the manner in which automation process 10 may generate the above-described ontology (e.g., ontology data 124).

As discussed above, being different webpages within a website may use different descriptors (e.g., descriptors 56), in order to properly utilize such data (e.g., descriptors 56), automation process 10 may process this data to transform it from raw information (e.g., descriptors 56 in their original disjointed form) into useable information 60 (in a normalized/homogenized form). Further and as discussed above, being different websites (e.g., websites 100, 112, 114, 116) may use different descriptors (e.g., descriptors 56) within their webpages, automation process 10 may process this data (e.g., descriptors) to transform it from its original disjointed form into useable (e.g., normalized/homogenized) information (e.g., ontology data 124). Accordingly and when generating ontology data 124, automation process 10 may process the useable information included within each of the plurality of data description models (e.g., plurality of data description models 118) to amend/normalize/homogenize this useable information across the plurality of websites (e.g., plurality of websites 120).

Figure 16:
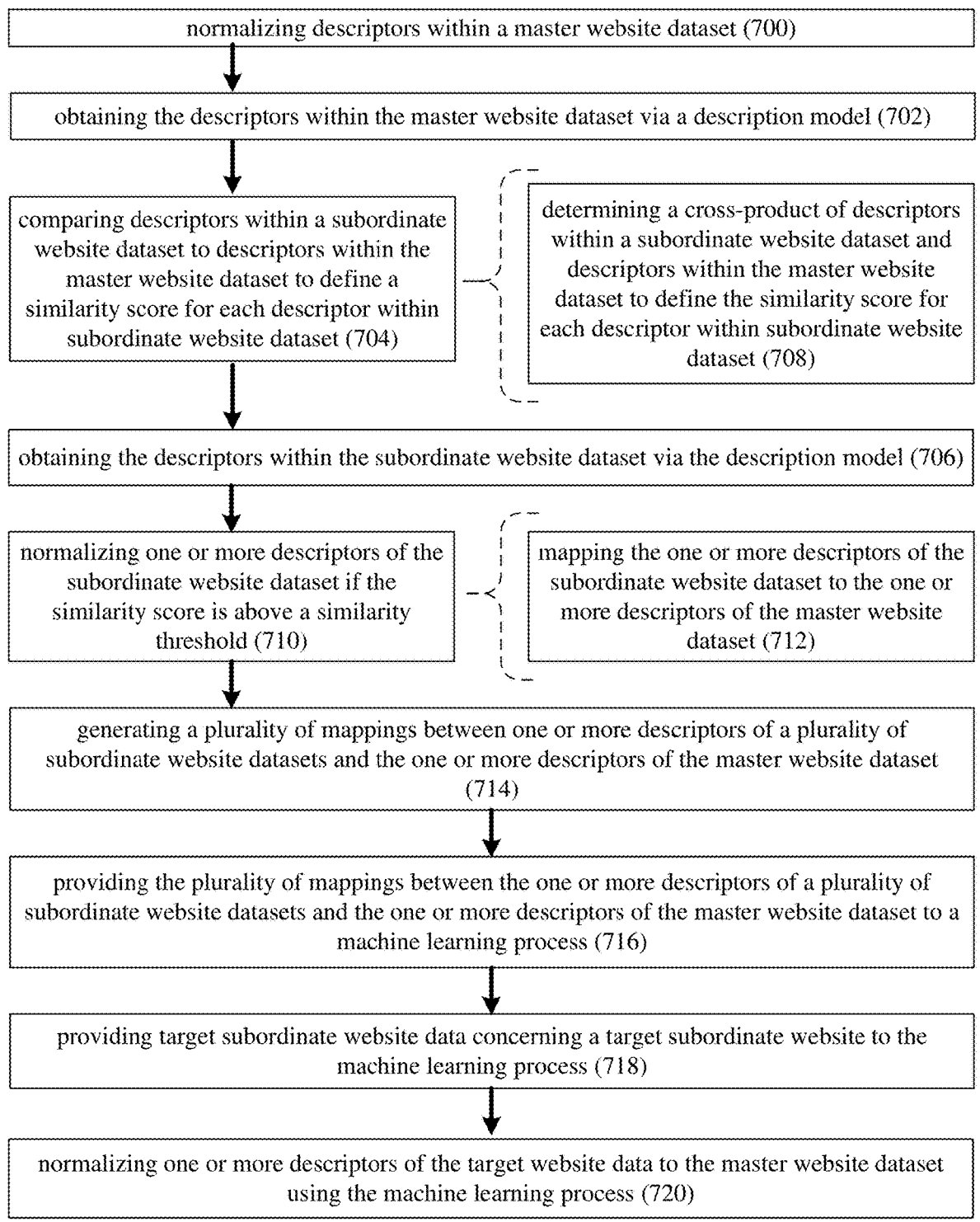
FIG. 16 is another flowchart of the automation process of FIG. 1 according to an embodiment of the present disclosure.

The following discussion concerns one particular example of the manner in which ontology data 124 may be generated. Referring also to FIG. 16, automation process 10 may normalize 700 descriptors (e.g., descriptors 56) within a master website dataset (e.g., a website dataset associated with website 100), wherein these descriptors (e.g., descriptors 56) within the master website dataset (e.g., a website dataset associated with website 100) may be obtained 702 via a description model (e.g., a data description model and/or a function description model).

As discussed above, the one or more descriptors (e.g., descriptors 56) may include one or more of: a property descriptor; an attribute descriptor; and a value descriptor.

- Property Descriptors: A property descriptor may identify the field/area/region name of highly pertinent portion of a website, wherein these fields/areas/regions are common on a particular type of website. Accordingly, if website 100 is an ecommerce website, examples of such property descriptors may include but are not limited to: a title field/area/region; a picture field/area/region; a description field/area/region; and a price field/area/region.
- Attribute Descriptors: An attribute descriptor may identify the field/area/region name of supplemental portion of a website, wherein these fields/areas/regions supplement the above-described property descriptors. Accordingly, if website 100 is an ecommerce website, examples of such attribute descriptors may include but are not limited to: a size field/area/region; a color field/area/region; a material field/area/region; and a brand field/area/region.
- Value Descriptors: A value descriptor may identify a value for one of the above-described property descriptors and/or attribute descriptors. For example and with respect to website 100, the value descriptor for the "size" attribute descriptor may be "Large"; the value descriptor for the "color" attribute descriptor may be "California Blue"; the value descriptor for the "price" property descriptor may be "$19.98"; and the value descriptor for the "title" property descriptor may be "Synthetic Nitrile Blue Disposable Gloves".

For the following example, assume that the master website dataset (e.g., a website dataset associated with website 100) includes useable information 60 stored within database 62 that is included within and/or associated with data description model 58 associated with website 100 (i.e., the master website), wherein useable information 60 was generated by automation process 10 normalizing 700 descriptors 56. As discussed above, being different websites may use different descriptors within their webpages, automation process 10 may process this data (e.g., descriptors) to transform it from its original disjointed form into useable (e.g., normalized/homogenized) information (e.g., ontology data 124) that is useable across a plurality of websites (e.g., plurality of websites 120). When normalizing 700 descriptors 56, automation process 10 may compare pairs of descriptors for similarity. For example, automation process 10 may generate a user interface configured to present a listing of the comparison of descriptors 56. The user interface may enable a user (e.g., user 36) to select which pairs of descriptors to normalize (e.g., based upon a similarity score or other comparison metric). In this example, a user may selectively approve or reject the normalization of descriptors within the master website dataset. In another example, automation process 10 may utilize one or more thresholds to determine when to and/or when to not automatically normalize descriptors 56 within website dataset associated with website 100.

Accordingly and in order to homogenize this data (e.g., descriptors) for use across multiple websites (e.g., plurality of websites 120), automation process 10 may compare 704 descriptors (e.g., descriptors 72) within a subordinate website dataset (e.g., a website dataset associated with website 112) to descriptors (e.g., useable information 60) within the master website dataset (e.g., a website dataset associated with website 100) to define a similarity score (e.g., similarity scores 74) for each descriptor (e.g., each of descriptors 72) within the subordinate website dataset (e.g., a website dataset associated with website 112). Each similarity score (e.g., each of similarity scores 74) may be one or more of: a value set similarity score (e.g., the similarity between values/value sets, wherein a value set is a domain of possible values); a type similarity score (e.g., integer versus character string); and a string similarity score (e.g., edit distance . . . how many characters would have to change to make one string identical to the second?). Automation process 10 may obtain 706 the descriptors (e.g., descriptors 72) within the subordinate website dataset (e.g., a website dataset associated with website 112) via a description model (e.g., a data description model and/or a function description model).

When comparing 704 descriptors (e.g., descriptors 72) within a subordinate website dataset (e.g., a website dataset associated with website 112) to descriptors (e.g., useable information 60) within the master website dataset (e.g., a website dataset associated with website 100) to define a similarity score (e.g., similarity score 74) for each descriptor (e.g., each of descriptors 72) within the subordinate website dataset (e.g., a website dataset associated with website 112), automation process 10 may determine 708 a Cartesian product of the descriptors (e.g., descriptors 72) within a subordinate website dataset (e.g., a website dataset associated with website 112) and the descriptors (e.g., useable information 60) within the master website dataset (e.g., a website dataset associated with website 100) to define the similarity score (e.g., similarity score 74) for each descriptor (e.g., each of descriptors 72) within the subordinate website dataset (e.g., a website dataset associated with website 112).

As is known in the art, a Cartesian product is a binary operation on two sets, denoted by the symbol "×", where a set is an unordered collection of unique elements. Given two sets A and B, the Cartesian product (read "A×B") is a set comprising all ordered pairs (a, b) where a is an element of A and b is an element of B. It has many applications in computer science and mathematics. A table can be created by taking the Cartesian product of a set of rows and a set of columns, where the rows and columns may represent values from different domains. The cells of the produced table will be ordered pairs of the form (row value, column value). Note, that the rows and columns need not be of the same length. As will be discussed in greater detail below, the Cartesian product may be used to produce a set of pairs of values of the form (subordinate website value, master website value), which automation process 10 may use to define a similarity score between the two values of each pair.

Automation process 10 may normalize 710 one of more descriptors (e.g., descriptors 72) of the subordinate website dataset (e.g., a website dataset associated with website 112) if the similarity score (e.g., similarity score 74) is above a similarity threshold (e.g., 95%). For example, the descriptor "Sz" and the descriptor "Size" may have a high similarity score (e.g., 96%); while the descriptor "Title" and the descriptor "Size" may have a low similarity score (e.g., 58%).

As discussed above, normalizing 710 one or more descriptors (e.g., descriptors 72) of the subordinate website dataset (e.g., a website dataset associated with website 112) may include transforming descriptors 72 by: amending descriptors 72; normalizing and/or homogenizing one or more property descriptors; normalizing and/or homogenizing one or more attribute descriptors; and/or normalizing and/or homogenizing one or more value descriptors. As discussed above, amending descriptors 72 may include performing various operations on the descriptors (e.g., removing extra spaces or uncommon characters).

When normalizing 710 one of more descriptors (e.g., descriptors 72) of the subordinate website dataset (e.g., a website dataset associated with website 112) if the similarity score (e.g., similarity score 74) is above a similarity threshold (e.g., 95%), automation process 10 may map 712 the one or more descriptors (e.g., descriptors 72) of the subordinate website dataset (e.g., a website dataset associated with website 112) to the one or more descriptors (e.g., descriptors 56) within the master website dataset (e.g., a website dataset associated with website 100). For example, as, the descriptor "Sz" and the descriptor "Size" has a high similarity score (e.g., 96%) that exceeds the similarity threshold (e.g., 95%), automation process 10 may map 712 the "Sz" descriptor of the subordinate website dataset (e.g., a website dataset associated with website 112) to the "Size" descriptor within the master website dataset (e.g., a website dataset associated with website 100), thus indicating that the two descriptors are synonymous.

Automation process 10 may generate 714 a plurality of mappings (e.g., plurality of mappings 76) between one or more descriptors of a plurality of subordinate website datasets (e.g., website datasets associated with websites 112, 114, 116) and the one or more descriptors of the master website dataset (e.g., a website dataset associated with website 100). Accordingly, automation process 10 may process the descriptors associated with (in this example) websites 100, 112, 114, 116 to generate 714 mappings (e.g., plurality of mappings 76) between the descriptors associated with websites 112, 114, 116) and the descriptors associated with website 100, thus forming an end-to-end platform that enables the navigation of websites 100, 112, 114, 116 without the need for human intervention and the automated & distributed execution of complex tasks (e.g., complex task 400).

The above-described normalization may be accomplished in an automated fashion via machine learning process 122. For example, automation process 10 may:

provide 716 the plurality of mappings (e.g., plurality of mappings 76) between one or more descriptors of a plurality of subordinate website datasets (e.g., website datasets associated with websites 112, 114, 116) and the one or more descriptors of the master website dataset (e.g., a website dataset associated with website 100) to a machine learning process (e.g., machine learning process 122);

provide 718 target subordinate website data (e.g., descriptors 78) concerning a target subordinate website (e.g., www.targetwebsite.com) to the machine learning process (e.g., machine learning process 122); and normalize 720 one or more descriptors of the target website data (e.g., descriptors 78) to the master website dataset (e.g., a website dataset associated with website 100) using the machine learning process (e.g., machine learning process 122).

ERR (Ephemeral Random Retry):

Discussed below is the manner in which automation process 10 may react in response to a failure associated with the execution of the description model (e.g., data description model 58 and/or function description model 66).

As discussed above and once initially defined (in the manner described above), automation process 10 may utilize data description model 58 and/or function description model 66 to automatically process the vast majority of webpages within e.g., website 100, as a website (especially an ecommerce website) may include hundreds of thousands of webpages that correspond to the hundreds of thousands of products they sell. As discussed above and once fully defined, data description model 58 and/or function description model 66 may enable automation process 10 to autonomously navigate and/or effectuate the functionality of e.g., website 100 without any human intervention, as data description model 58 and/or function description model 66 may (generally speaking) function as a roadmap that allows for automated navigation of (in this example) website 100. Additionally, automation process 10 may execute data description model 58 and/or function description model 66 to populate one or more databases with at least a portion of data from a website.

Unfortunately and as could be imagined, website 100 may change over time, wherein: existing webpages/products may be removed; existing webpages/products may be revised; and/or new webpages/products may be added. As could be imagined, such changes may complicate the ability of automation process 10 to autonomously navigate and effectuate e.g., website 100.

Figure 17:
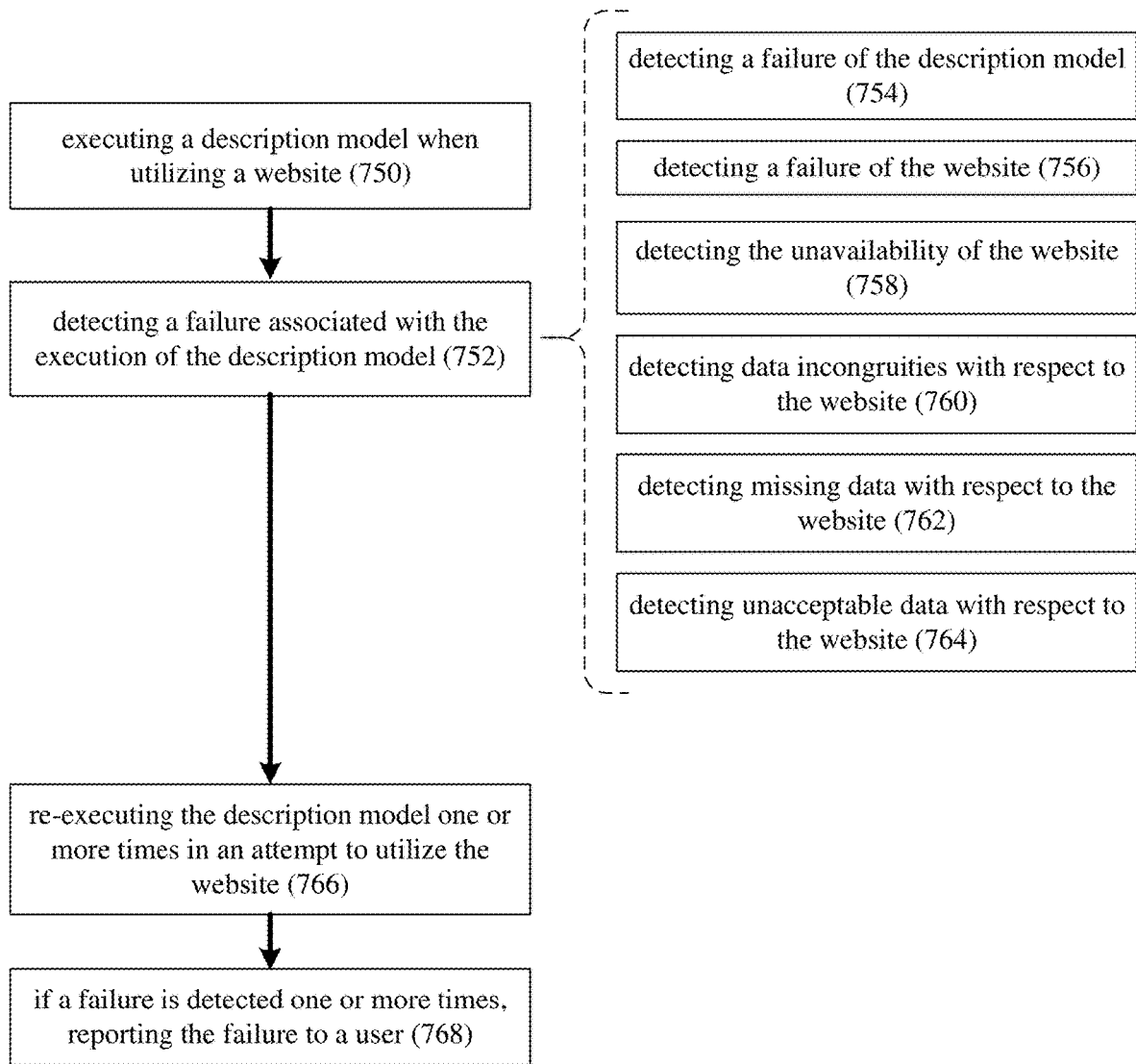
FIG. 17 is another flowchart of the automation process of FIG. 1 according to an embodiment of the present disclosure.

Referring also to FIG. 17, automation process 10 may execute 750 a description model (e.g., data description model 58 and/or function description model 66) when utilizing a website (e.g., website 100). As discussed above, ontology data (e.g., ontology data 124) may define acceptable values for data description model 58 and/or function description model 66. Specifically, useable data 60 within database 62 included within and/or associated with data description model 58 may define the descriptors of website 10, while useable data 68 within database 70 included within and/or associated with function description model 66 may define the functions of website 10.

Generally speaking, automation process 10 may utilize data description model 58 and/or function description model 66 to autonomously navigate and/or effectuate the functionality of e.g., website 100. Unfortunately and as would be expected, navigation failures may occur due to changes made to (in this example) website 100 (e.g., the adding/removing/modifying of webpages).

Accordingly, automation process 10 may detect 752 a failure associated with the execution of the description model (e.g., data description model 58 and/or function description model 66), which may include: detecting 754 a failure of the description model (e.g., data description model 58/function description model 66); detecting 756 a failure of the website (e.g., website 100); detecting 758 the unavailability of the website (e.g., website 100); detecting 760 data incongruities with respect to the website (e.g., website 100); detecting 762 missing data with respect to the website (e.g., website 100); and detecting 764 unacceptable data with respect to the website (e.g., website 100).

A failure of the description model may include but is not limited to a general/system failure of the description model (e.g., data description model 58/function description model 66). For example and for some unspecific reason, the description model (e.g., data description model 58/function description model 66) may no longer function properly or has been corrupted.

A failure of the website may include but is not limited to the website (e.g., website 100) no longer responding. For example, the website (e.g., website 100) may not be responding due to a technical issue with the website (e.g., website 100).

Unavailability of the website may include but is not limited to the website (e.g., website 100) no longer being available. For example, the website (e.g., website 100) may have been taken offline (due to e.g., a company ceasing operations) and/or the server effectuating website 100 (e.g., machine-accessible public computing platform 370) may have gone down.

Data incongruities with respect to the website may include but is not limited to various data inconsistencies/inaccuracies. For example, data inconsistences/inaccuracies may be detected between what is defined within the description model (e.g., data description model 58/function description model 66) and what is actually present/defined within the website (e.g., website 100). Data inconsistencies may also include descriptor anomalies (e.g., property descriptors, attribute descriptors, and/or value descriptors) between what is defined within the description model (e.g., data description model 58/function description model 66) and what is actually present/defined within the website (e.g., website 100). In another example, data inconsistencies may also include inconsistencies between different portions of the website. For example, suppose an ecommerce website includes various categories of products and a total number of products for a particular category is listed on the website. Now, suppose that after executing the description model (e.g., data description model 58/function description model 66), automation process 10 executes the description model on a different number of products (e.g., more or less than the displayed total number of products). As the number of products processed from the website and the listed number of products do not match (e.g., the listed number of products includes duplicate products that are only processed by the description model once), automation process 10 may detect 760 a data incongruity.

Missing data with respect to the website may include but is not limited to data that is no longer present within the website (e.g., website 100). For example and as discussed above, products/webpages may be removed/revised from the website (e.g., website 100), resulting in the description model (e.g., data description model 58/function description model 66) identifying data that is not currently present within the website (e.g., website 100).

Unacceptable data with respect to the website (e.g., website 100) may include but is not limited to data that is damaged/nonresponsive within the website (e.g., website 100). For example, some of the data and/or functionality within the website (e.g., website 100) may become corrupt, resulting in the website (e.g., website 100) not functioning/responding properly.

In the event that a failure is detected 752 concerning the execution of the description model (e.g., data description model 58 and/or function description model 66), automation process 10 may re-execute 766 the description model (e.g., data description model 58 and/or function description model 66) one or more times in an attempt to utilize the website (e.g., website 100). For example, automation process 10 may attempt to re-execute 766 data description model 58 and/or function description model 66 e.g., three more times in an attempt to utilize the website (e.g., website 100).

If a failure is detected for these (in this example) three additional times, automation process 10 may report 768 the failure to a user (e.g., user 42). When such a failure is reported, automation process 10 may reacquire data (e.g., descriptors 56 and functions 64) so that the description model (e.g., data description model 58 and/or function description model 66) may be updated to address such a failure.

Sleuth:

Discussed below is the manner in which automation process 10 may maintain the description model (e.g., data description model 58 and/or function description model 66).

As discussed above, being different webpages within a website may use different descriptors (e.g., descriptors 56), in order to properly utilize such data (e.g., descriptors 56), automation process 10 may process this data to transform it from raw information (e.g., descriptors 56 in their original disjointed form) into useable information 60 (in a normalized/homogenized form). Further and as discussed above, being different websites (e.g., websites 100, 112, 114, 116) may use different descriptors (e.g., descriptors 56) within their webpages, automation process 10 may process this data (e.g., descriptors) to transform it from its original disjointed form into useable (e.g., normalized/homogenized) information (e.g., ontology data 124). Accordingly and when generating ontology data 124, automation process 10 may process the useable information included within each of the plurality of data description models (e.g., plurality of data description models 118) to amend/normalize/homogenize this useable information across the plurality of websites (e.g., plurality of websites 120).

As also discussed above, websites (e.g., website 100) may change over time, wherein: existing webpages/products may be removed; existing webpages/products may be revised; and/or new webpages/products may be added. Accordingly and when such changes occur, the description model (e.g., data description model 58 and/or function description model 66) associated with the website may no longer be accurate, as the underlying data (e.g., descriptors 56 and functions 64) has changed.

Additionally and as discussed above, automation process 10 may execute data description model 58 and/or function description model 66 to populate one or more databases with at least a portion of data from a website. For example, with description models (e.g., data description model 58 and/or function description model 66) defined for website 100, automation process 10 may execute data description model 58 and/or function description model 66 to obtain useable information from website 100 and populate a database (e.g., database 62 and/or database 70) with at least a portion of this useable information. In an example where website 100 is an ecommerce website, website 100 may include hundreds of thousands of webpages to correspond to the hundreds of thousands of products they sell. As such, automation process 10 may populate database 62 and/or database 70 with useable information pertaining to the products from the hundreds of thousands of webpages by defining and executing data description model 58 and/or function description model 66 on the webpages of website 100. In this manner, automation process 10 may allow for the population of one or more databases representative of the useable information of the various webpages of a website.

Figure 18:
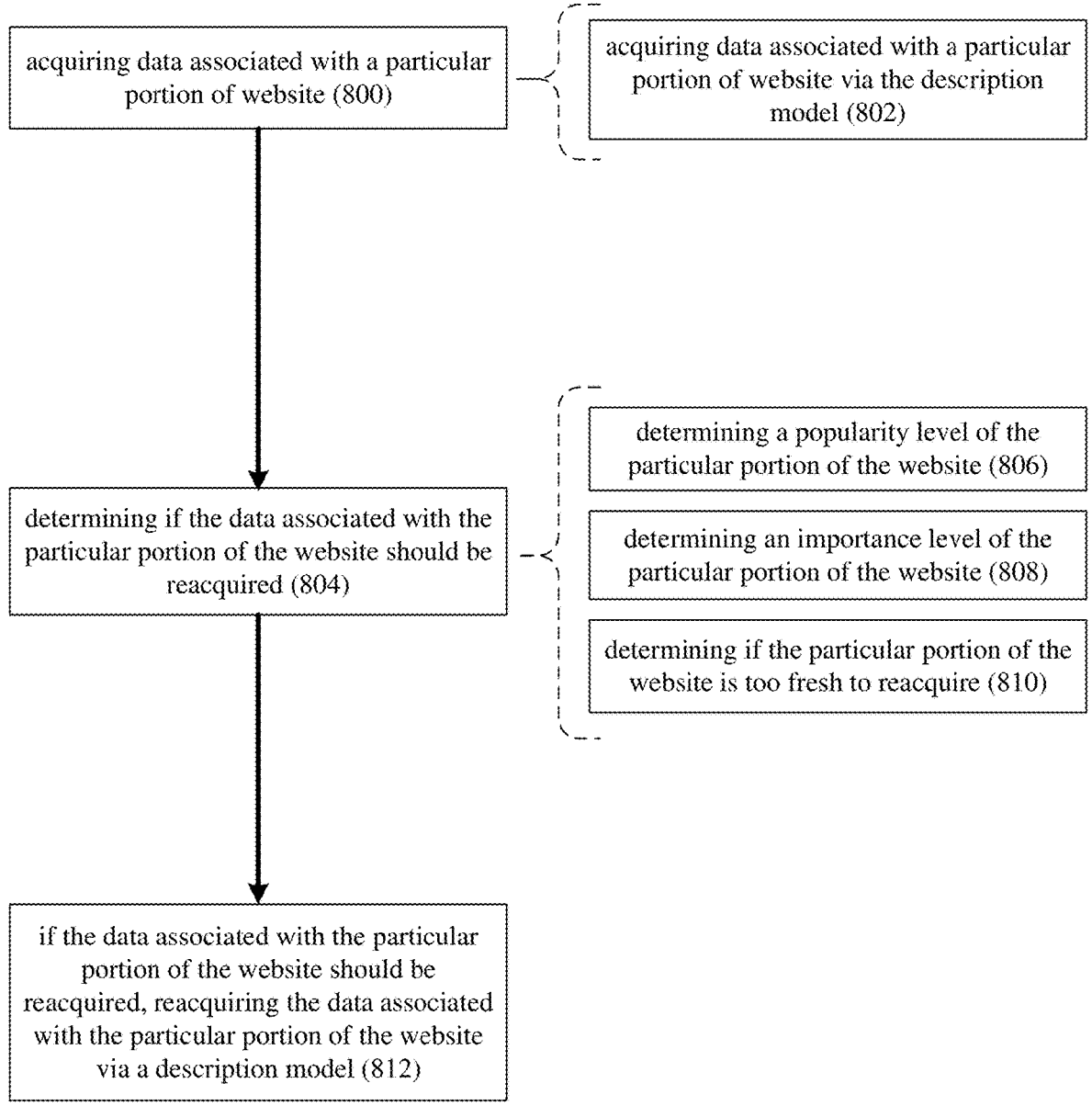
FIG. 18 is another flowchart of the automation process of FIG. 1 according to an embodiment of the present disclosure.

Accordingly and as will be discussed below in greater detail, automation process 10 may be configured to periodically refresh such underlying data (e.g., descriptors 56 and functions 64) so that the description model (e.g., data description model 58 and/or function description model 66) associated with the website (e.g., website 100) remains fresh and accurate. Referring also to FIG. 18 and as discussed above, automation process 10 may acquire 800 data (e.g., descriptors 56 and functions 64) associated with a particular portion of website (e.g., website 100), wherein the particular portion of website (e.g., website 100) may be associated with a product/service offered for sale. As discussed above, automation process 10 may systematically process the various webpages included within (in this example) website 100 to acquire 800 data (e.g., descriptors 56 and functions 64). As also discussed above, when acquiring 800 data (e.g., descriptors 56 and functions 64) associated with a particular portion of website (e.g., website 100), automation process 10 may acquire 802 data (e.g., descriptors 56 and functions 64) associated with a particular portion of website (e.g., website 100) via the description model (e.g., data description model 58 and/or function description model 66).

As stated above, over time this data (e.g., descriptors 56 and functions 64) may grow stale due to age. Accordingly, automation process 10 may determine 804 if the data (e.g., descriptors 56 and functions 64) associated with the particular portion of the website (e.g., website 100) should be reacquired. For example, automation process 10 may balance how often the underlying data (e.g., descriptors 56 and functions 64) should be reacquired. As discussed above, acquiring data associated with a website may include executing the description model (e.g., data description model 58 and/or function description model 66) defined for the website on hundreds or thousands of webpages. As this may consume significant computing resources and processing time for a website host and/or computing devices executing the description model (data description model 58 and/or function description model 66), automation process 10 may determine 804 when to reacquire the data (e.g., descriptors 56 and functions 64) associated with the particular portion of the website (e.g., website 100).

When determining 804 if the data (e.g., descriptors 56 and functions 64) associated with the particular portion of the website (e.g., website 100) should be reacquired, automation process 10 may: determine 806 a popularity level of the particular portion of the website (e.g., website 100); determine 808 an importance level of the particular portion of the website (e.g., website 100); and determine 810 if the particular portion of the website (e.g., website 100) is too fresh to reacquire.

When determining 806 a popularity level of the particular portion of the website (e.g., website 100), automation process 10 may monitor how often a portion of the website (e.g., website 100) is accessed. For example, automation process 10 may receive information indicating when and/or how often the particular portion of website 100 is accessed (e.g., how often users access particular portions of website 100). The information indicating when and/or how often the particular portion of website 100 is accessed may include a reference to a particular portion of the website as defined by the description model (e.g., data description model 58 and/or function description model 66) and/or a reference to the particular portion of website 100 as defined in a database (e.g., database 62 and/or database 70) populated with usable information from the particular portion of website 100. As discussed above, in the event that the data (e.g., descriptors 56 and functions 64) associated with the particular portion of the website (e.g., website 100) is inconsistent/inaccurate/missing/unacceptable, a failure will occur (as described above) and, if the failure is persistent, the inconsistent/inaccurate/missing/unacceptable will be reacquired. In another example, if a portion of the website (e.g., website 100) is popular and accessed often, the data (e.g., descriptors 56 and functions 64) associated with the particular portion of the website (e.g., website 100) may be reacquired more frequently to ensure consistent data. When determining a popularity level of the particular portion of the website, automation process 10 may define a weighting for the popularity level. The weighting for the popularity level may be user-defined and/or automatically defined by automation process 10. Accordingly, automation process 10 may determine if the data (e.g., descriptors 56 and functions 64) associated with the particular portion of the website (e.g., website 100) should be reacquired based upon the weighting defined for the popularity level.

When determining 808 an importance level of the particular portion of the website (e.g., website 100), automation process 10 may monitor how important a portion of the website (e.g., website 100) is. For example and as would be expected, website 100 may offer several products that are their best sellers, wherein these best seller may have a higher level of important assigned to them. Accordingly and when a higher level of importance is assigned to a particular product, automation process 10 may more frequently reacquire the data (e.g., descriptors 56 and functions 64) associated with that particular portion of the website (e.g., website 100). When determining an importance level of the particular portion of the website, automation process 10 may define a weighting for the importance level. The weighting for the importance level may be user-defined and/or automatically defined by automation process 10. Accordingly, automation process 10 may determine if the data (e.g., descriptors 56 and functions 64) associated with the particular portion of the website (e.g., website 100) should be reacquired based upon the weighting defined for the importance level.

When determining 810 if the particular portion of the website (e.g., website 100) is too fresh to reacquire, automation process 10 may not reacquire data (e.g., descriptors 56 and functions 64) if that data has been recently acquired. For example and when data (e.g., descriptors 56 and functions 64) is acquired, information (e.g., metadata) may be defined for the acquired data (e.g., descriptors 56 and functions 64) that identifies when the data (e.g., descriptors 56 and functions 64) was last acquired. For example, if the data (e.g., descriptors 56 and functions 64) associated with the particular portion of the website (e.g., website 100) was last acquired 10 minutes ago, automation process 10 may determine 804 that the data (e.g., descriptors 56 and functions 64) should not be reacquired. Conversely, if the data (e.g., descriptors 56 and functions 64) associated with the particular portion of the website (e.g., website 100) was last acquired 10 days ago, automation process 10 may determine 804 that the data (e.g., descriptors 56 and functions 64) should be reacquired. Automation process 10 may receive a time-based threshold for reacquiring data from a particular portion of the website and/or may automatically define the time-based threshold for reacquiring data from the particular portion of the website. Accordingly, automation process 10 may determine 810 if the particular portion of the website (e.g., website 100) is too fresh to reacquire based, at least in part, upon the time-based threshold.

Accordingly and if the data (e.g., descriptors 56 and functions 64) associated with the particular portion of the website (e.g., website 100) should be reacquired, automation process 10 may reacquire 812 the data (e.g., descriptors 56 and functions 64) associated with the particular portion of the website (e.g., website 100) via a description model (e.g., data description model 58 and/or function description model 66) in the fashion described above.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

obtaining descriptors within a master website dataset using one or more of a data description model associated with a first website and a function description model associated with the first website, wherein the data description model includes a description of a plurality of structure portions of the first website and how to navigate between the plurality of structure portions of the first website, wherein the function description model includes one or more actions that are performable on the first website;

normalizing the descriptors within the master website dataset;

obtaining descriptors within a subordinate website dataset using one or more of a data description model associated with a second website and a function description model associated with the second website, wherein the data description model includes a description of a plurality of structure portions of the second website and how to navigate between the plurality of structure portions of the second website, wherein the function description model includes one or more actions that are performable on the second website;

comparing the descriptors within the subordinate website dataset to descriptors within the master website dataset to define a similarity score for each descriptor within subordinate website dataset; and normalizing one or more descriptors of the subordinate website dataset if the similarity score is above a similarity threshold.

2. The computer-implemented method of claim 1 wherein the one or more descriptors includes one or more of:

a property descriptor;

an attribute descriptor; and a value descriptor.

3. The computer-implemented method of claim 1 wherein comparing descriptors within a subordinate website dataset to descriptors within the master website dataset to define a similarity score for each descriptor within subordinate website dataset includes:

determining a Cartesian product of descriptors within a subordinate website dataset and descriptors within the master website dataset to define the similarity score for each descriptor within subordinate website dataset.

4. The computer-implemented method of claim 1 further comprising one or more of:
obtaining the descriptors within the master website dataset via a description model; and
obtaining the descriptors within the subordinate website dataset via the description model.

5. The computer-implemented method of claim 4 wherein the description model includes a data description model.

6. The computer-implemented method of claim 4 wherein the description model includes a function description model.

7. The computer-implemented method of claim 1 wherein the similarity score is one or more of:
a value set similarity score;
a type similarity score; and
a string similarity score.

8. The computer-implemented method of claim 1 wherein normalizing one or more descriptors of the subordinate website dataset if the similarity score is above a similarity threshold includes:
mapping the one or more descriptors of the subordinate website dataset to the one or more descriptors of the master website dataset.

9. The computer-implemented method of claim 1 further comprising:
generating a plurality of mappings between one or more descriptors of a plurality of subordinate website datasets and the one or more descriptors of the master website dataset.

10. The computer-implemented method of claim 9 further comprising:
providing the plurality of mappings between the one or more descriptors of a plurality of subordinate website datasets and the one or more descriptors of the master website dataset to a machine learning process;
providing target subordinate website data concerning a target subordinate website to the machine learning process; and
normalizing one or more descriptors of the target website data to the master website dataset using the machine learning process.

11. A computer program product residing on a non-transitory computer readable medium having a plurality of instructions stored thereon which, when executed by a processor, cause the processor to perform operations comprising:
obtaining descriptors within a master website dataset using one or more of a data description model associated with a first website and a function description model associated with the first website, wherein the data description model includes a description of a plurality of structure portions of the first website and how to navigate between the plurality of structure portions of the first website, wherein the function description model includes one or more actions that are performable on the first website;
normalizing the descriptors within the master website dataset;
obtaining descriptors within a subordinate website dataset using one or more of a data description model associated with a second website and a function description model associated with the second website, wherein the data description model includes a description of a plurality of structure portions of the second website and how to navigate between the plurality of structure portions of the second website, wherein the function description model includes one or more actions that are performable on the second website;
comparing the descriptors within the subordinate website dataset to descriptors within the master website dataset to define a similarity score for each descriptor within subordinate website dataset; and
normalizing one or more descriptors of the subordinate website dataset if the similarity score is above a similarity threshold.

12. The computer program product of claim 11 wherein the one or more descriptors includes one or more of:
a property descriptor;
an attribute descriptor; and
a value descriptor.

13. The computer program product of claim 11 wherein comparing descriptors within a subordinate website dataset to descriptors within the master website dataset to define a similarity score for each descriptor within subordinate website dataset includes:
determining a Cartesian product of descriptors within a subordinate website dataset and descriptors within the master website dataset to define the similarity score for each descriptor within subordinate website dataset.

14. The computer program product of claim 11 further comprising one or more of:
obtaining the descriptors within the master website dataset via a description model; and
obtaining the descriptors within the subordinate website dataset via the description model.

15. The computer program product of claim 14 wherein the description model includes a data description model.

16. The computer program product of claim 14 wherein the description model includes a function description model.

17. The computer program product of claim 11 wherein the similarity score is one or more of:
a value set similarity score;
a type similarity score; and
a string similarity score.

18. The computer program product of claim 11 wherein normalizing one or more descriptors of the subordinate website dataset if the similarity score is above a similarity threshold includes:
mapping the one or more descriptors of the subordinate website dataset to the one or more descriptors of the master website dataset.

19. The computer program product of claim 11 further comprising:
generating a plurality of mappings between one or more descriptors of a plurality of subordinate website datasets and the one or more descriptors of the master website dataset.

20. The computer program product of claim 19 further comprising:
providing the plurality of mappings between the one or more descriptors of a plurality of subordinate website datasets and the one or more descriptors of the master website dataset to a machine learning process;
providing target subordinate website data concerning a target subordinate website to the machine learning process; and
normalizing one or more descriptors of the target website data to the master website dataset using the machine learning process.

21. A computing system including a processor and memory configured to perform operations comprising:
- obtaining descriptors within a master website dataset using one or more of a data description model associated with a first website and a function description model associated with the first website, wherein the data description model includes a description of a plurality of structure portions of the first website and how to navigate between the plurality of structure portions of the first website, wherein the function description model includes one or more actions that are performable on the first website;
- normalizing the descriptors within the master website dataset;
- obtaining descriptors within a subordinate website dataset using one or more of a data description model associated with a second website and a function description model associated with the second website, wherein the data description model includes a description of a plurality of structure portions of the second website and how to navigate between the plurality of structure portions of the second website, wherein the function description model includes one or more actions that are performable on the second website;
- comparing the descriptors within the subordinate website dataset to descriptors within the master website dataset to define a similarity score for each descriptor within subordinate website dataset; and
- normalizing one or more descriptors of the subordinate website dataset if the similarity score is above a similarity threshold.

22. The computing system of claim 21 wherein the one or more descriptors includes one or more of:
- a property descriptor;
- an attribute descriptor; and
- a value descriptor.

23. The computing system of claim 21 wherein comparing descriptors within a subordinate website dataset to descriptors within the master website dataset to define a similarity score for each descriptor within subordinate website dataset includes:
- determining a Cartesian product of descriptors within a subordinate website dataset and descriptors within the master website dataset to define the similarity score for each descriptor within subordinate website dataset.

24. The computing system of claim 21 further comprising one or more of:
- obtaining the descriptors within the master website dataset via a description model; and
- obtaining the descriptors within the subordinate website dataset via the description model.

25. The computing system of claim 24 wherein the description model includes a data description model.

26. The computing system of claim 24 wherein the description model includes a function description model.

27. The computing system of claim 21 wherein the similarity score is one or more of:
- a value set similarity score;
- a type similarity score; and
- a string similarity score.

28. The computing system of claim 21 wherein normalizing one or more descriptors of the subordinate website dataset if the similarity score is above a similarity threshold includes:
- mapping the one or more descriptors of the subordinate website dataset to the one or more descriptors of the master website dataset.

29. The computing system of claim 21 further comprising:
- generating a plurality of mappings between one or more descriptors of a plurality of subordinate website datasets and the one or more descriptors of the master website dataset.

30. The computing system of claim 29 further comprising:
- providing the plurality of mappings between the one or more descriptors of a plurality of subordinate website datasets and the one or more descriptors of the master website dataset to a machine learning process;
- providing target subordinate website data concerning a target subordinate website to the machine learning process; and
- normalizing one or more descriptors of the target website data to the master website dataset using the machine learning process.

* * * * *